US011837750B2

(12) United States Patent
Zhang et al.

(10) Patent No.: US 11,837,750 B2
(45) Date of Patent: Dec. 5, 2023

(54) LITHIUM ION BATTERY USING CROSSLINKABLE SEPARATOR

(71) Applicant: Asahi Kasei Kabushiki Kaisha, Tokyo (JP)

(72) Inventors: Xun Zhang, Tokyo (JP); Ryo Kuroki, Tokyo (JP); Yuki Fukunaga, Tokyo (JP); Hiromi Kobayashi, Tokyo (JP); Mitsuko Saito, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/966,990

(22) Filed: Oct. 17, 2022

(65) Prior Publication Data

US 2023/0120715 A1 Apr. 20, 2023

Related U.S. Application Data

(63) Continuation of application No. 16/957,421, filed as application No. PCT/JP2019/040343 on Oct. 11, 2019.

(30) Foreign Application Priority Data

Oct. 11, 2018 (JP) ................................ 2018-192975
Oct. 11, 2018 (JP) ................................ 2018-192978
(Continued)

(51) Int. Cl.
*H01M 4/02* (2006.01)
*H01M 50/446* (2021.01)
(Continued)

(52) U.S. Cl.
CPC ............ *H01M 50/446* (2021.01); *C08J 3/24* (2013.01); *H01M 10/0568* (2013.01);
(Continued)

(58) Field of Classification Search
CPC ...................................................... H01M 4/02
See application file for complete search history.

(56) References Cited

U.S. PATENT DOCUMENTS 5,998,065 A 12/1999 Tsutsumi et al.
2006/0093786 A1 5/2006 Ohashi et al.
(Continued)

FOREIGN PATENT DOCUMENTS

CN 1738711 A 2/2006
CN 101595168 A 12/2009
(Continued)

OTHER PUBLICATIONS

Extended European Search Report issued in related European Patent Application No. 22169036.5 dated Oct. 27, 2022.
(Continued)

*Primary Examiner* — Lucas J. O'Donnell
(74) *Attorney, Agent, or Firm* — Morgan, Lewis & Bockius LLP

(57) ABSTRACT

A separator for an electricity storage device comprising a silane-modified polyolefin, wherein silane crosslinking reaction of the silane-modified polyolefin is initiated when it contacts with the electrolyte solution, as well as a method for producing the separator.

19 Claims, 10 Drawing Sheets

(30) Foreign Application Priority Data

| | | |
|---|---|---|
| Nov. 1, 2018 | (JP) | 2018-206944 |
| Apr. 23, 2019 | (JP) | 2019-082084 |
| Jul. 31, 2019 | (JP) | 2019-141211 |
| Jul. 31, 2019 | (JP) | 2019-141513 |

(51) Int. Cl.

| | |
|---|---|
| ***C08J 3/24*** | (2006.01) |
| ***H01M 10/0568*** | (2010.01) |
| ***H01M 50/403*** | (2021.01) |
| ***H01M 50/494*** | (2021.01) |
| ***H01M 50/491*** | (2021.01) |
| ***H01M 50/417*** | (2021.01) |
| ***H01M 50/406*** | (2021.01) |
| ***H01M 50/489*** | (2021.01) |

(52) U.S. Cl.

CPC ....... *H01M 50/403* (2021.01); *H01M 50/406* (2021.01); *H01M 50/417* (2021.01); *H01M 50/489* (2021.01); *H01M 50/491* (2021.01); *H01M 50/494* (2021.01)

(56) References Cited

U.S. PATENT DOCUMENTS

| | | | | |
|---|---|---|---|---|
| 2007/0184340 | A1 | 8/2007 | Ichikawa et al. | |
| 2008/0118827 | A1 | 5/2008 | Call et al. | |
| 2009/0148762 | A1 | 6/2009 | Kasamatsu et al. | |
| 2009/0246635 | A1 | 10/2009 | Takano et al. | |
| 2010/0087552 | A1 | 4/2010 | Shiomi et al. | |
| 2010/0221965 | A1 | 9/2010 | Katayama et al. | |
| 2011/0159346 | A1 | 6/2011 | Yamamoto et al. | |
| 2011/0232836 | A1 | 9/2011 | Uetani et al. | |
| 2011/0311878 | A1 | 12/2011 | Inagaki et al. | |
| 2012/0141859 | A1 | 6/2012 | Murata et al. | |
| 2013/0236793 | A1 | 9/2013 | Takagi et al. | |
| 2014/0272532 | A1 | 9/2014 | Park et al. | |
| 2015/0030933 | A1 | 1/2015 | Goetzen et al. | |
| 2016/0126518 | A1 | 5/2016 | Park et al. | |
| 2017/0077473 | A1 | 3/2017 | Zhao et al. | |
| 2017/0263907 | A1 | 9/2017 | Ameyama et al. | |
| 2017/0342232 | A1 | 11/2017 | Haruta et al. | |
| 2019/0198839 | A1* | 6/2019 | Iwamuro | H01M 50/414 |
| 2020/0035972 | A1 | 1/2020 | Ahn et al. | |
| 2020/0067054 | A1 | 2/2020 | Kim et al. | |

FOREIGN PATENT DOCUMENTS

| | | | |
|---|---|---|---|
| CN | 102888016 | A | 1/2013 |
| CN | 103328209 | A | 9/2013 |
| CN | 104538576 | A | 4/2015 |
| CN | 106104850 | A | 11/2016 |
| CN | 106328862 | A | 1/2017 |
| CN | 108198986 | A | 6/2018 |
| DE | 102012000910 | A1 | 7/2013 |
| EP | 2562767 | A1 | 2/2013 |
| EP | 2908364 | A1 | 8/2015 |
| EP | 3340342 | A1 | 6/2018 |
| EP | 3719061 | A1 | 10/2020 |
| JP | S64-75005 | A | 3/1989 |
| JP | H09-216964 | A | 8/1997 |
| JP | H10-261435 | A | 9/1998 |
| JP | H11-144700 | A | 5/1999 |
| JP | H11-172036 | A | 6/1999 |
| JP | 2000-319441 | A | 11/2000 |
| JP | 2001-176484 | A | 6/2001 |
| JP | 2003-187777 | A | 7/2003 |
| JP | 2005-008813 | A | 1/2005 |
| JP | 2006-092848 | A | 4/2006 |
| JP | 2006-179279 | A | 7/2006 |
| JP | 2007-299612 | A | 11/2007 |
| JP | 2009-070620 | A | 4/2009 |
| JP | 2011-005670 | A | 1/2011 |
| JP | 2011-071128 | A | 4/2011 |
| JP | 2012-076370 | A | 4/2012 |
| JP | 2012-521615 | A | 9/2012 |
| JP | 2013-008690 | A | 1/2013 |
| JP | 2014-056843 | A | 3/2014 |
| JP | 2014-179321 | A | 9/2014 |
| JP | 2015-079588 | A | 4/2015 |
| JP | 2016-072150 | A | 5/2016 |
| JP | 2016-219358 | A | 12/2016 |
| JP | 2017-103206 | A | 6/2017 |
| JP | 2017-203145 | A | 11/2017 |
| JP | 2018-101613 | A | 6/2018 |
| JP | 2020-31047 | A | 2/2020 |
| KR | 10-2011-0063656 | A | 6/2011 |
| KR | 10-2013-0075790 | A | 7/2013 |
| KR | 10-2016-0129580 | A | 11/2016 |
| KR | 10-2016-0129583 | A | 11/2016 |
| KR | 10-2016-0146134 | A | 12/2016 |
| KR | 10-2017-0019345 | A | 2/2017 |
| KR | 10-2017-0044996 | A | 4/2017 |
| KR | 10-2017-0101230 | A | 9/2017 |
| KR | 10-2018-0033487 | A | 4/2018 |
| KR | 10-2018-0102408 | A | 9/2018 |
| WO | 97/44839 | A1 | 11/1997 |
| WO | 2010/108148 | A1 | 9/2010 |
| WO | 2010/134585 | A1 | 11/2010 |
| WO | 2014/057993 | A1 | 4/2014 |
| WO | 2014/192862 | A1 | 12/2014 |
| WO | 2015/176480 | A1 | 11/2015 |

OTHER PUBLICATIONS

Extended European Search Report issued in related European Patent Application No. 22169052.2 dated Oct. 27, 2022.

Toshitake Chino, "Development of new electrode materials," Lithium Ion Secondary Batteries (2nd Edition), p. 28-30 (Mar. 29, 1996) (see partial English translation).

Minako Ozawa, "Crystallization Phenomena," Kiso Kobunshi Kagaku, The Society of Polymer Science, p. 173 (Jul. 1, 2006) (see partial English translation).

Van der Weij, "The Action of Tin Compounds in Condensation-type RTV Silicone Rubbers," Macromolecular Chemistry Physics, 181, 2541-2548 (1980).

International Search Report issued in corresponding International Patent Application No. PCT/JP2019/040343 dated Jan. 7, 2020.

Koyama, "Measurement of Physical Properties of Polymeric Materials under High Pressure," The review of high pressure science and technology, 5 (4): 224-231 Sep. 30, 1996 (see English abstract).

International Preliminary Report on Patentability and Written Opinion issued in corresponding International Patent Application No. PCT/JP2019/040343 dated Apr. 8, 2021.

Partial European Search Report issued in related Europea Patent Application No. 22169052.2 dated Aug. 4, 2022.

Partial European Search Report issued in related European Patent Application No. 22169036.5 dated Aug. 16, 2022.

Extended European Search Report issued in related European Patent Application No. 22169029.0 dated Aug. 18, 2022.

Extended European Search Report issued in related European Patent Application No. 22169042.3 dated Aug. 18, 2022.

Supplementary European Search Report issued in corresponding European Patent Application No. 19871776.1 dated Nov. 15, 2021.

Supplementary European Search Report issued in corresponding European Patent Application No. 19870116.1 dated Nov. 29, 2021.

Extended European Search Report issued in related European Patent Application No. 23157951.7 dated Aug. 2, 2023.

Extended European Search Report issued in related European Patent Application No. 23161865.3 dated Aug. 1, 2023.

Extended European Search Report issued in European Patent Application No. 23166690.0 dated Oct. 9, 2023.

Extended European Search Report issued in European Patent Application No. 23176156.0 dated Sep. 28, 2023.

Extended European Search Report issued in European Patent Application No. 23176142.9 dated Oct. 9, 2023.

(56) References Cited

OTHER PUBLICATIONS

Extended European Search Report issued in European Patent Application No. 23176153.7 dated Sep. 28, 2023.
Extended European Search Report issued in European Patent Application No. 23176183.4 dated Sep. 26, 2023.

* cited by examiner (a)

(b)

(a)

(b)

LITHIUM ION BATTERY USING CROSSLINKABLE SEPARATOR

RELATED APPLICATION DATA

This application is a continuation application of U.S. patent application Ser. No. 16/957,421, filed Jun. 24, 2020, which is a § 371 national stage application of PCT/JP2019/040343, filed Oct. 11, 2019, and is based on and claims priority to JP Application No. 2019-141513, filed Jul. 31, 2019; JP Application No. 2019-141211, filed Jul. 31, 2019; JP Application No. 2019-082084, filed Apr. 23, 2019; JP Application No. 2018-206944, filed Nov. 1, 2018; JP Application No. 2018-192978, filed Oct. 11, 2018; and JP Application No. 2018-192975, filed Oct. 11, 2018, the entire contents of each of these applications are incorporated herein by reference.

FIELD

The present invention relates to a separator for an electricity storage device and to a crosslinking method for it, and to an electricity storage device assembly kit and a method for producing the electricity storage device.

BACKGROUND

Microporous membranes are widely used as membranes for separation or selective permeation and selection of various substances and as isolating materials, and some examples of their uses include as microfiltration membranes, as fuel cell and condenser separators, or as matrices for functional membranes or separators for electricity storage devices, that exhibit new functions by having functional materials packed into their pores. Polyolefin microporous membranes, specifically, are preferred for use as separators for lithium ion batteries that are widely utilized in PC laptops, cellular phones and digital cameras.

In order to ensure battery safety, separators must have both an active shutdown function and high membrane rupture temperature. PTL 1, for example, describes adjustment of the higher physical properties of a polyolefin resin as an essential component of a separator for a lithium ion battery. In addition, as described in PTL 2, it is known that heat release due to interior battery short circuiting is inhibited by a shutdown function when the degree of crystallinity and gel fraction are in specific ranges, and that the safety of a battery can be ensured if it has performance such that a membrane rupture does not occur in the battery cell at partial high temperature sections (i.e. breakdown at 170° C. or higher). More specifically, in regard to PTLs 1 and 2, it has gradually come to light by experimentation that high-temperature membrane rupture properties can be exhibited by constructing silane crosslinked sections (a gel structure) in a polyolefin separator.

PTLs 1 to 6, for example, describe a silane crosslinking structure formed by contact between a silane-modified polyolefin-containing separator and water. PTL 8 describes a crosslinked structure formed from ring-opening of norbornane by irradiation with ultraviolet rays or an electron beam. PTL 9 describes a separator insulating layer having a (meth) acrylic acid copolymer with a crosslinked structure, and a styrene-butadiene rubber binder. A separator has also been proposed that has a layer A having a shutdown property and a layer B comprising an aramid resin and an inorganic material, with the ratio of their thicknesses adjusted to within a prescribed range (see PTL 11).

The members used in a lithium ion battery are a positive electrode, a negative electrode material, an electrolyte solution and a separator. Among these members, the separator must be inactive from the standpoint of electrochemical reaction and with respect to the peripheral members, because of its role as an insulating material. Since development of the first negative electrode materials for lithium ion batteries, a method has been established for inhibiting decomposition of the electrolyte solution on the negative electrode surface, wherein a solid electrolyte interface (SEI) is formed by chemical reaction during initial charge (NPL 1). Even when a polyolefin resin is used as the separator, some cases have been reported in which oxidation reaction is induced on the positive electrode surface at high voltage, resulting in blackening or surface degradation of the separator.

For this reason, the materials used for electricity storage device separators are designed with chemical structures that are inert in electrochemical reactions or other chemical reactions, and as a result, polyolefin microporous membranes have become widely developed and implemented. When a polyolefin is used as the resin, however, the improvement in performance has been limited even when the mechanical micropore structure of the separator is modified. For example, when the performance is insufficient in terms of the heat-resistant stability of the separator at above the melting point of the polyolefin, or in terms of the affinity with the electrolyte solution or the liquid retention due to electronegativity of the olefin units, it is not possible to obtain satisfactory permeability of Li ions or their solvated ion clusters in the separator.

Because of such limitations, therefore, by current means it is not possible to satisfy the high-speed charge-discharge or heat stability required for modern battery development.

CITATION LIST

Patent Literature

[PTL 1] Japanese Unexamined Patent Publication No. H09(1997)-216964
[PTL 2] International Patent Publication No. WO97/44839
[PTL 3] Japanese Unexamined Patent Publication No. H11(1999)-144700
[PTL 4] Japanese Unexamined Patent Publication No. H11(1999)-172036
[PTL 5] Japanese Unexamined Patent Publication No. 2001-176484
[PTL 6] Japanese Unexamined Patent Publication No. 2000-319441
[PTL 7] Japanese Unexamined Patent Publication No. 2017-203145
[PTL 8] Japanese Unexamined Patent Publication No. 2011-071128
[PTL 9] Japanese Unexamined Patent Publication No. 2014-056843
[PTL 10] Japanese Unexamined Patent Publication No. H10(1998)-261435
[PTL 11] Japanese Unexamined Patent Publication No. 2007-299612
[PTL 12] International Patent Publication No. WO2010/134585
[PTL 13] Japanese Unexamined Patent Publication No. 2016-072150

Non Patent Literature

[NPL 1] Lithium Ion Secondary Batteries (2nd Edition) Nikkan Kogyo Shimbun, Ltd.
[NPL 2] Kiso Kobunshi Kagaku, Tokyo Kagaku Dojin

SUMMARY

Technical Problem

With the increasing high outputs and high energy densities of lithium ion secondary batteries for mobile devices and vehicles in recent years, there is ongoing demand for smaller battery cell sizes and for stable cycle charge-discharge performance during long periods of use. It is therefore considered necessary for the separators used to be thin-membranes (for example, 15 μm or smaller) with high quality (for example, homogeneous physical properties and free of resin aggregates). Standards have also become more rigorous for battery safety, and as also described in PTLs 1 and 2, there is a need for shutdown functions and high-temperature membrane rupture properties, while expectations are also high for development of separator resin compositions that can be stably produced, and production methods for them. In this regard, the level for shutdown temperature is preferably as far below 150° C. as possible, while the membrane rupture temperature is preferably as high a temperature as possible.

In the method described in PTL 3, for example, a crosslinking catalyst master batch is used during the extrusion step to promote silane-modified polyethylene crosslinking reaction in the extruder, but this results in generation of resin aggregates and lowers the homogeneity of the physical properties of the separator. As a solution for this problem, the methods described in PTLs 4, 5 and 6 propose providing a plasticizer extraction step or silane gel crosslinking step, or controlling the gel fraction of the resin membrane, or dewatering after casting of the uncrosslinked resin through hot water. In addition, PTL 7 proposes a polyolefin microporous membrane with modification of the gel fraction, the storage modulus at 40° C. to 250° C. based on dynamic viscoelasticity (DMA) measurement, the maximum shrinkage factor based on thermomechanical analysis (TMA) and amount of radicals as measured by electron spin resonance (ESR), to provide a heat-resistant resin microporous membrane with low heat shrinkage, low fluidity and excellent meltdown resistance.

In addition, from the viewpoint of dimensional stability, and of both maintaining the shutdown function and increasing the membrane rupture temperature for separators for electricity storage devices, it has been proposed to provide an inorganic porous layer containing inorganic particles such as calcined kaolin or boehmite and a resin binder on at least one surface of a polyolefin microporous membrane (PTLs 12 and 13).

However, the method disclosed in PTL 4 is not able to sufficiently promote silane crosslinking reaction, and it is difficult to obtain high-temperature membrane rupture resistance. Crosslinking reaction can be promoted in the plasticizer extraction steps described in PTLs 3 and 4 since they employ a tin(II)-based crosslinking catalyst, but there are concerns regarding post-residue of the crosslinking catalyst.

The heat-resistant resin microporous membrane described in PTL 7 is merely obtained by coating a photopolymerizable coating solution onto a dry porous membrane. In Example 5 of PTL 7 a low-molecular-weight silane coupling agent such as γ-methacryloxypropyltrimethoxysilane is added to the porous membrane, but when a low-molecular-weight silane coupling agent is used in a wet porous method, it is expected that the low-molecular-weight silane coupling agent does not bond with the resin of the porous membrane since it tends to react or bond with the pore-forming plasticizer. A battery comprising a heat-resistant resin microporous membrane such as described in PTL 7 as the separator has poor cycle characteristics, and when used for prolonged periods, unpredictable secondary reactions may be induced in the battery, potentially lowering the battery safety.

Moreover, the skin layer described in PTL 7 is formed by coating a compound with a polymerizable functional group onto a resin porous membrane followed by crosslinking reaction by external stimulation, and therefore some infiltration into the resin porous membrane is expected to occur during coating of the skin layer, and a mixed region is expected to form near the interface between the skin layer and in the resin porous membrane after the crosslinking reaction has proceeded. This allows satisfactory TMA heat shrinkage performance to be obtained, but is also expected to lead to lower battery cycle characteristics due to blockage of the resin porous membrane, or reduced fuse (shutdown) performance as the resin porous membrane undergoes melting. In addition, small amounts of radical species are detected by ESR and remain in the composite microporous membrane obtained by the method described in PTL 7, and when such a composite microporous membrane has been incorporated into a battery, radical reaction would be expected to take place with the other members and particularly the electrolyte solution, resulting in chain reaction that would decompose the electrolyte solution and thus potentially resulting in notable impairment of the battery performance.

Furthermore, the microporous membranes and separators described in PTLs 1, 2 and 7 have been poorly studied in terms of placing inorganic porous layers comprising inorganic particles and a resin binder on their surfaces. A conventional separator comprising an inorganic porous layer on a microporous membrane will appear to have an improved membrane rupture temperature in the temperature-resistance curve of an electricity storage device. In practice, however, since the resin often elutes from the microporous membrane into the inorganic porous layer, loss of the membrane and a resulting reduction in stress resistance are to be expected for the separator as a whole. The multilayer porous membranes described in PTLs 12 and 13 are therefore provided with a polyolefin microporous membrane and an inorganic porous layer, but there is still room for investigation regarding both the low temperature shutdown function and high-temperature membrane rupture properties as a separator for an electricity storage device, and regarding improved electricity storage device cycle characteristics and battery nail penetration safety.

A battery using a separator such as described in PTLs 3 to 7 has poor cycle characteristics, and when used for prolonged periods, unpredictable secondary reactions may be induced in the battery, potentially lowering the battery safety.

With common molded articles such as hot water pipes, a tin (Sn)-based catalyst is loaded into the extruder during the extrusion step. A wet production process for a separator for an electricity storage device, on the other hand, usually includes steps such as extrusion and sheet forming, stretching, plasticizer extraction (pore formation), heat treatment, and winding, and therefore when silane crosslinking is accelerated in the extruder during the sheet-forming step, it can lead to production defects in the gelled portions and difficult stretching of the silane-crosslinked polyolefin in the subsequent stretching step. More study is therefore necessary to obtain a novel separator for an electricity storage device suited for the production process.

Moreover, the crosslinking methods described in PTLs 1 to 6, 8 and 9 are all in-processes for separator membrane formation, or are carried out in a batch process immediately after separator membrane formation. After formation of a crosslinked structure as described in PTLs 1 to 6, 8 and 9, therefore, it is necessary to coat or to form slits in the separator, which increases the internal stress during the subsequent layering and winding steps with the electrodes and can lead to deformation of the fabricated battery. For example, when a crosslinked structure is formed by heating, internal stress in the separator with the crosslinked structure often increases at ordinary temperature or room temperature.

When a crosslinked structure is formed by photoirradiation of ultraviolet rays or an electron beam, the light irradiation may be non-uniform and the crosslinked structure may become nonhomogeneous. This is believed to occur because the peripheries of the crystals of the resin forming the separator tend to become crosslinked by an electron beam.

Incidentally, PTL 10 describes a technique for improving the cycle characteristics of a lithium ion secondary battery by addition of a succinimide or the like to the electrolyte solution. However, the technique described in PTL 10 is not one that improves the cycle characteristics by specifying the structure of the separator.

With the separators for electricity storage devices described in PTLs 1, 2 and 11, there is still room for improvement from the viewpoint of improving their electricity storage device performance.

In light of the problems described above, it is an object of the present invention to provide a separator for an electricity storage device that can exhibit both a shutdown function and high-temperature membrane rupture, while ensuring electricity storage device safety, output and/or cycle stability, as well as a novel crosslinking method suitable for its production, and an assembly kit or production method for the electricity storage device.

Solution to Problem

The aforementioned problems are solved by the following technical means.

[1]

A separator for an electricity storage device comprising a silane-modified polyolefin, wherein silane crosslinking reaction of the silane-modified polyolefin is initiated when the separator for an electricity storage device contacts with an electrolyte solution.

[2]

The separator for an electricity storage device according to [1] above, wherein the silane-modified polyolefin is not a master batch resin containing a dehydrating condensation catalyst that crosslinks the silane-modified polyolefin.

[3]

The separator for an electricity storage device according to [1] or [2] above, wherein the separator for an electricity storage device comprises polyethylene in addition to the silane-modified polyolefin.

[4]

The method for producing a separator for an electricity storage device according to [3] above, wherein the weight ratio of the silane-modified polyolefin and the polyethylene (silane-modified polyolefin weight/polyethylene weight) is 0.05/0.95 to 0.40/0.60.

[5]

A separator for an electricity storage device, comprising 5 to 40 weight % of a silane-modified polyolefin and 60 to 95 weight % of a polyolefin other than the silane-modified polyolefin, wherein the storage modulus change ratio ($R_{\Delta E'}$) is 1.5 to 20, as defined by the following formula (1):

$$R_{\Delta E'}=E'_S/E'_j \tag{1}$$

where $E'_j$ is the storage modulus measured at 160° C. to 220° C. for the separator for an electricity storage device before crosslinking reaction of the silane-modified polyolefin, $E'_S$ is the storage modulus measured at 160° C. to 220° C. for the separator for an electricity storage device after crosslinking reaction of the silane-modified polyolefin, and the measuring conditions for the storage modulus E'($E'_j$ or $E'_S$) are specified by the following (i) to (iv):

(i) the dynamic viscoelasticity measurement is carried out under the following conditions:
 Measuring apparatus: RSA-G2 (TA Instruments)
 Sample thickness: from 5 μm to 50 μm
 Measuring temperature range: −50 to 225° C.
 Temperature-elevating rate: 10° C./min
 Measuring frequency: 1 Hz
 Transform mode: sine wave tension mode (linear tension)
 Initial static tensile load: 0.5 N
 Initial gap distance (at 25° C.): 25 mm
 Auto strain adjustment: Enabled (range: 0.05 to 25% amplitude, 0.02 to 5 N sine wave load);

(ii) the static tensile load is the median value of the maximum stress and minimum stress for each periodic motion, and the sine wave load is the vibrational stress centered on the static tensile load.

(iii) the sine wave tension mode is measurement of the vibrational stress while carrying out periodic motion at a fixed amplitude of 0.2%, wherein in sine wave tension mode, the vibrational stress is measured while varying the gap distance and static tensile load so that the difference between the static tensile load and the sine wave load is within 20%, and when the sine wave load is 0.02 N or lower, the vibrational stress is measured while amplifying the amplitude value so that the sine wave load is no greater than 5 N and the increase in the amplitude value is no greater than 25%, and (iv) the storage modulus E' is calculated from the relationship between the obtained sine wave load and amplitude value, and the following formulas:

$$\sigma^*=\sigma_0\cdot\mathrm{Exp}[i(\omega t+\delta)],$$

$$\varepsilon^*=\varepsilon_0\cdot\mathrm{Exp}(i\omega t),$$

$$\sigma^*=E^*\cdot\varepsilon^*$$

$$E^*=E'+iE''$$

where σ*: vibrational stress, ε*: strain, i: imaginary number unit, ω: angular frequency, t: time, δ: phase difference between vibrational stress and strain, E*: complex modulus, E': storage modulus, E": loss modulus, vibrational stress: sine wave load/initial cross-sectional area static tensile load: load at minimum point of vibrational stress for each period (minimum point of gap distance for each period), and sine wave load: difference between measured vibrational stress and static tensile load.

[6]

A separator for an electricity storage device, comprising 5 to 40 weight % of a silane-modified polyolefin and 60 to 95 weight % of a polyolefin other than the silane-modified polyolefin, wherein the loss modulus change ratio ($R_{\Delta E''}$) is 1.5 to 20, as defined by the following formula (3):

$$R_{\Delta E''}=E''_S/E''_j \quad (3)$$

where $E''_j$ is the loss modulus measured at 160° C. to 220° C. for the separator for an electricity storage device before crosslinking reaction of the silane-modified polyolefin, $E''_S$ is the loss modulus measured at 160° C. to 220° C. for the separator for an electricity storage device after crosslinking reaction of the silane-modified polyolefin, and the measuring conditions for the loss modulus E" ($E''_j$ or $E''_S$) are specified by the following (i) to (iv):

(i) the dynamic viscoelasticity measurement is carried out under the following conditions:
Measuring apparatus: RSA-G2 (TA Instruments)
Sample thickness: from 5 μm to 50 μm
Measuring temperature range: −50 to 225° C.
Temperature-elevating rate: 10° C./min
Measuring frequency: 1 Hz
Transform mode: sine wave tension mode (linear tension)
Initial static tensile load: 0.5 N
Initial gap distance (at 25° C.): 25 mm
Auto strain adjustment: Enabled (range: 0.05 to 25% amplitude, 0.02 to 5 N sine wave load);

(ii) the static tensile load is the median value of the maximum stress and minimum stress for each periodic motion, and the sine wave load is the vibrational stress centered on the static tensile load;

(iii) the sine wave tension mode is measurement of the vibrational stress while carrying out periodic motion at a fixed amplitude of 0.2%, wherein in sine wave tension mode, the vibrational stress is measured while varying the gap distance and static tensile load so that the difference between the static tensile load and the sine wave load is within 20%, and when the sine wave load is 0.02 N or lower, the vibrational stress is measured while amplifying the amplitude value so that the sine wave load is no greater than 5 N and the increase in the amplitude value is no greater than 25%; and (iv) the loss modulus E" is calculated from the obtained sine wave load and amplitude value, and the following formulas:

$$\sigma^*=\sigma_0\cdot \mathrm{Exp}[i(\omega t+\delta)],$$

$$\varepsilon^*=\varepsilon_0\cdot \mathrm{Exp}(i\omega t),$$

$$\sigma^*=E^*\cdot\varepsilon^*$$

$$E^*=E'+iE''$$

where σ*: vibrational stress, ε*: strain, i: imaginary number unit, ω: angular frequency, t: time, δ: phase difference between vibrational stress and strain, E*: complex modulus, E": storage modulus, E": loss modulus, vibrational stress: sine wave load/initial cross-sectional area static tensile load: load at minimum point of vibrational stress for each period (minimum point of gap distance for each period), and sine wave load: difference between measured vibrational stress and static tensile load.

[7]

A separator for an electricity storage device comprising a silane-modified polyolefin, wherein silane crosslinking reaction of the silane-modified polyolefin takes place when the separator for an electricity storage device contacts with an electrolyte solution.

[8]

A separator for an electricity storage device, comprising 5 to 40 weight % of a silane-modified polyolefin and 60 to 95 weight % of a polyolefin other than the silane-modified polyolefin, wherein the mixed storage modulus ratio ($R_{E'mix}$) is 1.5 to 20, as defined by the following formula (2):

$$R_{E'mix}=E'_a/E'_0 \quad (2)$$

where $E'_a$ is the storage modulus measured at 160° C. to 220° C. for the separator for an electricity storage device, $E'_0$ is the storage modulus measured at 160° C. to 220° C. for a separator for an electricity storage device not containing the silane-modified polyolefin, and the measuring conditions for the storage modulus E' ($E'_a$ or $E'_0$) are specified by the following (i) to (iv):

(i) the dynamic viscoelasticity measurement is carried out under the following conditions:
Measuring apparatus: RSA-G2 (TA Instruments)
Sample thickness: from 5 μm to 50 μm
Measuring temperature range: −50 to 225° C.
Temperature-elevating rate: 10° C./min
Measuring frequency: 1 Hz
Transform mode: sine wave tension mode (linear tension)
Initial static tensile load: 0.5 N
Initial gap distance (at 25° C.): 25 mm
Auto strain adjustment: Enabled (range: 0.05 to 25% amplitude, 0.02 to 5 N sine wave load);

(ii) the static tensile load is the median value of the maximum stress and minimum stress for each periodic motion, and the sine wave load is the vibrational stress centered on the static tensile load;

(iii) the sine wave tension mode is measurement of the vibrational stress while carrying out periodic motion at a fixed amplitude of 0.2%, wherein in sine wave tension mode, the vibrational stress is measured while varying the gap distance and static tensile load so that the difference between the static tensile load and the sine wave load is within 20%, and when the sine wave load is 0.02 N or lower, the vibrational stress is measured while amplifying the amplitude value so that the sine wave load is no greater than 5 N and the increase in the amplitude value is no greater than 25%; and (iv) the storage modulus E' is calculated from the relationship between the obtained sine wave load and amplitude value, and the following formulas:

$$\sigma^*=\sigma_0\cdot \mathrm{Exp}[i(\omega t+\delta)],$$

$$\varepsilon^*=\varepsilon_0\cdot \mathrm{Exp}(i\omega t),$$

$$\sigma^*=E^*\cdot\varepsilon^*$$

$$E^*=E'+iE''$$

where σ*: vibrational stress, ε*: strain, i: imaginary number unit, ω: angular frequency, t: time, δ: phase difference between vibrational stress and strain, E*: complex modulus, E': storage modulus, E": loss modulus, vibrational stress: sine wave load/initial cross-sectional area static tensile load: load at minimum point of vibrational stress for each period (minimum point of gap distance for each period), and sine wave load: difference between measured vibrational stress and static tensile load.

[9]

A separator for an electricity storage device, comprising 5 to 40 weight % of a silane-modified polyolefin and 60 to 95 weight % of a polyolefin other than the silane-modified polyolefin, wherein the mixed loss modulus ratio ($R_{E''mix}$) is 1.5 to 20.0, as defined by the following formula (4):

$$R_{E''mix}=E''_a/E''_0 \quad (4)$$

where $E''_a$ is the loss modulus measured at 160° C. to 220° C. for the separator for an electricity storage device, $E''_0$ is the loss modulus measured at 160° C. to 220° C. for a separator for an electricity storage device not containing the silane-modified polyolefin, and the measuring conditions for the loss modulus E" ($E''_a$ or $E''_0$) are specified by the following (i) to (iv):

(i) the dynamic viscoelasticity measurement is carried out under the following conditions:
- Measuring apparatus: RSA-G2 (TA Instruments)
- Sample thickness: from 5 μm to 50 μm
- Measuring temperature range: −50 to 225° C.
- Temperature-elevating rate: 10° C./min
- Measuring frequency: 1 Hz
- Transform mode: sine wave tension mode (linear tension)
- Initial static tensile load: 0.5 N
- Initial gap distance (at 25° C.): 25 mm
- Auto strain adjustment: Enabled (range: 0.05 to 25% amplitude, 0.02 to 5 N sine wave load);

(ii) the static tensile load is the median value of the maximum stress and minimum stress for each periodic motion, and the sine wave load is the vibrational stress centered on the static tensile load;

(iii) the sine wave tension mode is measurement of the vibrational stress while carrying out periodic motion at a fixed amplitude of 0.2%, wherein in sine wave tension mode, the vibrational stress is measured while varying the gap distance and static tensile load so that the difference between the static tensile load and the sine wave load is within 20%, and when the sine wave load is 0.02 N or lower, the vibrational stress is measured while amplifying the amplitude value so that the sine wave load is no greater than 5 N and the increase in the amplitude value is no greater than 25%; and (iv) the loss modulus E' is calculated from the obtained sine wave load and amplitude value, and the following formulas:

$$\sigma^*=\sigma_0\cdot\mathrm{Exp}[i(\omega t+\delta)],$$

$$\varepsilon^*=\varepsilon_0\cdot\mathrm{Exp}(i\omega t),$$

$$\sigma^*=E^*\cdot\varepsilon^*$$

$$E^*=E'+iE''$$

where σ*: vibrational stress, ε*: strain, i: imaginary number unit, ω: angular frequency, t: time, δ: phase difference between vibrational stress and strain, E*: complex modulus, E": storage modulus, E": loss modulus, vibrational stress: sine wave load/initial cross-sectional area static tensile load: load at minimum point of vibrational stress for each period (minimum point of gap distance for each period), and sine wave load: difference between measured vibrational stress and static tensile load.

[10]

The separator for an electricity storage device according to [8] or [9] above, wherein the separator for an electricity storage device not containing a silane-modified polyolefin is a non-silane-modified polyolefin microporous membrane with a gelation degree of 0% to 10%.

[11]

A separator for an electricity storage device comprising 5 to 40 weight % of a silane-modified polyolefin and 60 to 95 weight % of a polyolefin other than the silane-modified polyolefin, wherein the transition temperature is 135° C. to 150° C. for the rubber plateau and the crystal melt flow region, in the temperature-dependent change of the storage modulus of the separator for an electricity storage device.

[12]

A separator for an electricity storage device comprising a polyolefin microporous membrane, wherein:

in solid viscoelasticity measurement of the separator for an electricity storage device at a temperature of −50° C. to 250° C., the minimum value of the storage modulus is 1.0 MPa to 10 MPa, the maximum of the storage modulus is 100 MPa to 10,000 MPa, and the minimum of the loss modulus is 0.1 MPa to 10 MPa and the maximum of the loss modulus is 10 MPa to 10,000 MPa, the conditions for the solid viscoelasticity measurement to measure the storage modulus and loss modulus being specified by the following (i) to (iv):

(i) the dynamic viscoelasticity measurement is carried out under the following conditions:
- Measuring apparatus: RSA-G2 (TA Instruments)
- Sample thickness: 200 μm to 400 μm (with the proviso that when the membrane thickness of the sample alone is less than 200 μm, the dynamic viscoelasticity measurement is carried out by stacking multiple samples so that their total thickness is 200 μm to 400 μm)
- Measuring temperature range: −50° C. to 250° C.
- Temperature-elevating rate: 10° C./min
- Measuring frequency: 1 Hz
- Transform mode: sine wave tension mode (linear tension)
- Initial static tensile load: 0.2 N
- Initial gap distance (at 25° C.): 10 mm
- Auto strain adjustment: Disabled;

(ii) the static tensile load is the median value of the maximum stress and minimum stress for each periodic motion, and the sine wave load is the vibrational stress centered on the static tensile load;

(iii) the sine wave tension mode is measurement of the vibrational stress while carrying out periodic motion at a fixed amplitude of 0.1%, wherein in sine wave tension mode, the vibrational stress is measured while varying the gap distance and static tensile load so that the difference between the static tensile load and the sine wave load is within 5%, and when the sine wave load is 0.1 N or lower, the vibrational stress is measured with the static tensile load fixed at 0.1 N; and (iv) the storage modulus and loss modulus are calculated from the relationship between the obtained sine wave load and amplitude value, and the following formulas:

$$\sigma^*=\sigma_0\cdot\mathrm{Exp}[i(\omega t+\delta)],$$

$$\varepsilon^*=\varepsilon_0\cdot\mathrm{Exp}(i\omega t),$$

$$\sigma^*=E^*\cdot\varepsilon^*$$

$$E^*=E'+iE''$$

where $\sigma^*$: vibrational stress, $\varepsilon^*$: strain, i: imaginary number unit, $\omega$: angular frequency, t: time, $\delta$: phase difference between vibrational stress and strain, $E^*$: complex modulus, E': storage modulus, E": loss modulus, vibrational stress: sine wave load/initial cross-sectional area static tensile load: load at minimum point of vibrational stress for each period (minimum point of gap distance for each period), and sine wave load: difference between measured vibrational stress and static tensile load.

[13]

A separator for an electricity storage device, consisting of a polyolefin microporous membrane, wherein in solid viscoelasticity measurement of the separator for an electricity storage device from the membrane softening transition temperature to the membrane rupture temperature, the mean storage modulus is 1.0 MPa to 12 MPa and the mean loss modulus is 0.5 MPa to 10 MPa.

[14]

The separator for an electricity storage device according to [13] above, wherein in the solid viscoelasticity measurement, the membrane softening transition temperature is 140° C. to 150° C. and the membrane rupture temperature is 180° C. or higher.

[15]

The separator for an electricity storage device according to any one of [12] to [14] above, which comprises a silane-modified polyolefin and a polyolefin other than the silane-modified polyolefin.

[16]

The separator for an electricity storage device according to [15] above, which comprises 5 weight % to 40 weight % of the silane-modified polyolefin and 60 weight % to 95 weight % of the polyolefin other than the silane-modified polyolefin.

[17]

A separator for an electricity storage device comprising a polyolefin, wherein:

the polyolefin has one or more types of functional groups, and after housing the separator in the electricity storage device, (1) the functional groups undergo mutual condensation reaction, or (2) the functional groups react with chemical substances inside the electricity storage device or (3) the functional groups react with other types of functional groups, whereby a crosslinked structure is formed.

[18]

The separator for an electricity storage device according to [17] above, wherein the chemical substance is an electrolyte, electrolyte solution, electrode active material or additive contained in the electricity storage device, or a decomposition product thereof.

[19]

A separator for an electricity storage device comprising a polyolefin, which has an amorphous crosslinked structure in which the amorphous portion of the polyolefin is crosslinked.

[20]

The separator for an electricity storage device according to [19] above, wherein the separator for an electricity storage device has a mixed storage modulus ratio ($R_{E'x}$) of 1.5 to 20 as defined by the following formula (1):

$$R_{E'X}=E'_Z/E'_{Z0} \quad (1)$$

where $E'_Z$ is the storage modulus measured in the temperature range of 160° C. to 300° C. after crosslinking reaction of the separator for an electricity storage device has proceeded in the electricity storage device, and $E'_{Z0}$ is the storage modulus measured in the temperature range of 160° C. to 300° C. before the separator for an electricity storage device has been incorporated into the electricity storage device.

[21]

The separator for an electricity storage device according to [19] or [20] above, wherein the separator for an electricity storage device has a mixed loss modulus ratio ($R_{E''x}$) of 1.5 to 20 as defined by the following formula (3):

$$R_{E''X}=E''_Z/E''_{Z0} \quad (3)$$

where $E''_Z$ is the loss modulus measured in the temperature range of 160° C. to 300° C. after crosslinking reaction of the separator for an electricity storage device has proceeded in the electricity storage device, and $E''_{Z0}$ is the loss modulus measured in the temperature range of 160° C. to 300° C. before the separator for an electricity storage device has been incorporated into the electricity storage device.

[22]

The separator for an electricity storage device according to any one of [19] to [21] above, wherein the amorphous portion is selectively crosslinked.

[23]

The separator for an electricity storage device according to any one of [17] to [22] above, wherein the separator for an electricity storage device has a mixed storage modulus ratio ($R_{E'mix}$) of 1.5 to 20 as defined by the following formula (2):

$$R_{E'mix}=E'/E'_0 \quad (2)$$

where E' is the storage modulus measured at 160° C. to 300° C. when the separator for an electricity storage device has an amorphous crosslinked structure, and E'0 is the storage modulus measured at 160° C. to 300° C. for the separator for an electricity storage device without an amorphous crosslinked structure.

[24]

The separator for an electricity storage device according to any one of [17] to [23] above, wherein the separator for an electricity storage device has a mixed loss modulus ratio ($R_{E''mix}$) of 1.5 to 20 as defined by the following formula (4):

$$R_{E''mix}=E''/E''_0 \quad (4)$$

where E" is the loss modulus measured at 160° C. to 300° C. when the separator for an electricity storage device has an amorphous crosslinked structure, and $E''_0$ is the loss modulus measured at 160° C. to 300° C. for the separator for an electricity storage device without an amorphous crosslinked structure.

[25]

The separator for an electricity storage device according to any one of [17] to [24] above, wherein the polyolefin is polyethylene.

[26]

The separator for an electricity storage device according to any one of [17] to [25] above, wherein the polyolefin is a functional group-modified polyolefin or a polyolefin obtained by copolymerization of monomers with a functional group.

[27]

The separator for an electricity storage device according to any one of [17] to [26] above, wherein the crosslinked structure is formed by reaction via covalent bonding, hydrogen bonding or coordination bonding.

[28]

The separator for an electricity storage device according to [27] above, wherein the reaction by covalent bonding is one or more selected from the group consisting of the following reactions (I) to (IV):

(I) condensation reaction of a plurality of the same functional groups;

(II) reaction between a plurality of different functional groups;

(III) chain condensation reaction between a functional group and an electrolyte solution; and (IV) reaction between a functional group and an additive.

[29]

The separator for an electricity storage device according to [27] above, wherein the reaction by coordination bonding is the following reaction (V):

(V) reaction in which a plurality of the same functional groups crosslink via coordination bonding with metal ions.

[30]

The separator for an electricity storage device according to [28] above, wherein reactions (I) and/or (II) are catalytically accelerated by a chemical substance inside the electricity storage device.

[31]

The separator for an electricity storage device according to [28] above, wherein reaction (I) is condensation reaction of a plurality of silanol groups.

The separator for an electricity storage device according to [28] above, wherein reaction (IV) is nucleophilic substitution reaction, nucleophilic addition reaction or ring-opening reaction between compound Rx of the separator for an electricity storage device and compound Ry of the additive, the compound Rx having a functional group x and the compound Ry having a linking reaction unit $y_1$.

[33]

The separator for an electricity storage device according to [32] above, wherein:

reaction (IV) is nucleophilic substitution reaction, the functional group x of compound Rx is one or more selected from the group consisting of —OH, —$NH_2$, —NH—, —COOH and —SH, and the linking reaction unit $y_1$ of compound Ry consists of two or more selected from the group consisting of $CH_3SO_2$—, $CF_3SO_2$—, $ArSO_2$—, $CH_3SO_3$—, $CF_3SO_3$—, $ArSO_3$— and monovalent groups represented by the following formulas ($y_1$-1) to ($y_1$-6):

[Chemical formula 1]

($y_1$-1)

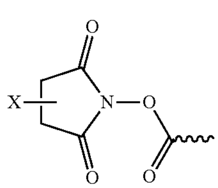

where X is hydrogen or a monovalent substituent,

[Chemical Formula 2]

($y_1$-2)

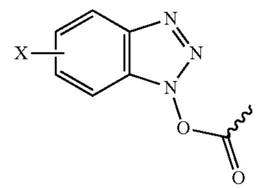

where X is hydrogen or a monovalent substituent,

[Chemical Formula 3]

($y_1$-3)

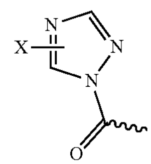

where X is hydrogen or a monovalent substituent,

[Chemical Formula 4]

($y_1$-4)

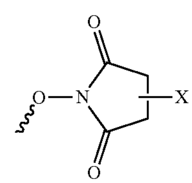

where X is hydrogen or a monovalent substituent,

[Chemical Formula 5]

($y_1$-5)

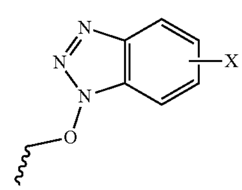

where X is hydrogen or a monovalent substituent, and

[Chemical Formula 6]

($y_1$-6)

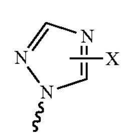

where X is hydrogen or a monovalent substituent.

[34]

The separator for an electricity storage device according to [32] or [33] above, wherein:

reaction (IV) is nucleophilic substitution reaction, compound Ry has a straight-chain unit $y_2$ in addition to the linking reaction unit $y_1$, and the straight-chain unit $y_2$ is one or more selected from the group consisting of divalent groups represented by the following formulas ($y_2$-1) to ($y_2$-6):

[Chemical Formula 7]

($y_2$-1)

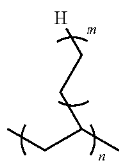

where m is an integer of 0 to 20, and n is an integer of 1 to 20,

[Chemical Formula 8]

($y_2$-2)

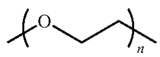

where n is an integer of 1 to 20,

[Chemical Formula 9]

($y_2$-3)

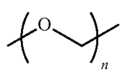

where n is an integer of 1 to 20,

[Chemical Formula 10]

($y_2$-4)

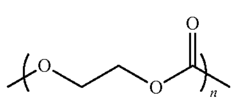

where n is an integer of 1 to 20,

[Chemical Formula 11]

($y_2$-5)

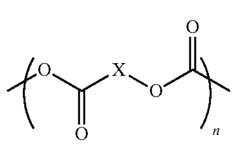

where X is an alkylene or arylene group of 1 to 20 carbon atoms, and n is an integer of 1 to 20, and

[Chemical Formula 12]

($y_2$-6)

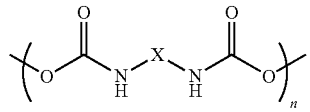

where X is an alkylene or arylene group of 1 to 20 carbon atoms, and n is an integer of 1 to 20.

[35]

The separator for an electricity storage device according to [32] above, wherein:

the reaction (IV) is nucleophilic addition reaction, the functional group x of compound Rx is one or more selected from the group consisting of —OH, —$NH_2$, —NH—, —COOH and —SH, and the linking reaction unit $y_1$ of compound Ry is one or more selected from the group consisting of groups represented by the following formulas ($Ay_1$-1) to ($Ay_1$-6):

[Chemical Formula 13]

($Ay_1$-1)

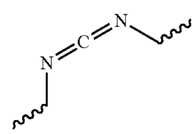

[Chemical Formula 14]

($Ay_1$-2)

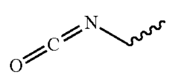

[Chemical Formula 15]

($Ay_1$-3)

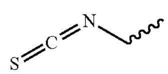

[Chemical Formula 16]

($Ay_1$-4)

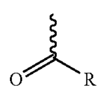

where R is hydrogen or a monovalent organic group,

[Chemical Formula 17]

($Ay_1$-5)

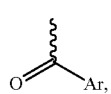

and

[Chemical Formula 18]

($Ay_1$-6)

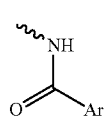

[36]

The separator for an electricity storage device according to [32] above, wherein:

the reaction (IV) is ring-opening reaction, the functional group x of compound Rx is one or more selected from the group consisting of —OH, —$NH_2$, —NH—, —COOH and —SH, and the linking reaction unit $y_1$ of compound Ry consists of two or more groups represented by the following formula ($ROy_1$-1):

[Chemical Formula 19]

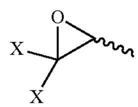

($ROy_1$-1)

where the multiple X groups are each independently a hydrogen atom or a monovalent substituent.

[37]

The separator for an electricity storage device according to [29] above, wherein in reaction (V), the metal ion is one or more selected from the group consisting of $Zn^{2+}$, $Mn^{2+}$, $Co^{3+}$, $Ni^{2+}$, $Li^{+}$.

[38]

A separator for an electricity storage device comprising a first porous layer (layer A) that includes a silane-modified polyolefin and is capable of forming a crosslinked structure, and a second porous layer (layer B) that includes inorganic particles, wherein the heat shrinkage factor at 150° C. after formation of the crosslinked structure is 0.02 to 0.91 times the heat shrinkage factor at 150° C. before formation of the crosslinked structure.

[39]

The separator for an electricity storage device according to [38] above, wherein the crosslinked structure in layer A is formed by an acid, a base, swelling, or a compound generated inside the electricity storage device.

[40]

A separator for an electricity storage device, which comprises:

a microporous membrane that includes a silane-modified polyolefin and an inorganic porous layer that includes inorganic particles and a resin binder, disposed on at least one surface of the microporous membrane.

[41]

The separator for an electricity storage device according to [40] above, wherein the content of the inorganic particles in the inorganic porous layer is 5 wt % to 99 wt %.

[42]

The separator for an electricity storage device according to [40] or [41] above, wherein the content of the silane-modified polyolefin in the microporous membrane is 0.5 wt % to 40 wt %.

[43]

The separator for an electricity storage device according to any one of [40] to [42] above, wherein the inorganic particles are one or more selected from the group consisting of alumina ($Al_2O_3$), silica, titania, zirconia, magnesia, ceria, yttria, zinc oxide, iron oxide, silicon nitride, titanium nitride, boron nitride, silicon carbide, aluminum hydroxide oxide (AlO(OH)), talc, kaolinite, dickite, nacrite, halloysite, pyrophyllite, montmorillonite, sericite, mica, amesite, bentonite, asbestos, zeolite, diatomaceous earth, quartz sand and glass fibers.

[44]

The separator for an electricity storage device according to any one of [40] to [43] above, wherein the glass transition temperature (Tg) of the resin binder is −50° C. to 100° C.

[45]

The separator for an electricity storage device according to any one of [40] to [44], wherein silane crosslinking reaction of the silane-modified polyolefin is initiated when the separator for an electricity storage device contacts with an electrolyte solution.

[46]

The separator for an electricity storage device according to any one of [40] to [45], wherein the separator for an electricity storage device has:

a storage modulus change ratio ($R_{\Delta E'}$) of 1.5 to 20 as defined by the following formula (1A):

$$R_{\Delta E'}=E'_S/E'_j \tag{1A}$$

where $E'_j$ is the storage modulus measured at 160° C. to 220° C. for the separator for an electricity storage device before crosslinking reaction of the silane-modified polyolefin, and $E'_S$ is the storage modulus measured at 160° C. to 220° C. for the separator for an electricity storage device after crosslinking reaction of the silane-modified polyolefin, and/or a loss modulus change ratio ($R_{\Delta E''}$) of 1.5 to 20 as defined by the following formula (1B):

$$R_{\Delta E''}=E''_S/E''_j \tag{1B}$$

where $E''_j$ is the loss modulus measured at 160° C. to 220° C. for the separator for an electricity storage device before crosslinking reaction of the silane-modified polyolefin, and $E''_S$ is the loss modulus measured at 160° C. to 220° C. for the separator for an electricity storage device after crosslinking reaction of the silane-modified polyolefin, when measured after the inorganic porous layer has been removed.

[47]

The separator for an electricity storage device according to any one of [40] to [46], wherein the separator for an electricity storage device has:

a mixed storage modulus ratio ($R_{E'mix}$) of 1.5 to 20 as defined by the following formula (2A):

$$R_{E'mix}=E'/E'_0 \tag{2A}$$

where E' is the storage modulus measured at 160° C. to 220° C. for the separator for an electricity storage device and $E'_0$ is the storage modulus measured at 160° C. to 220° C. for a separator for an electricity storage device not containing the silane-modified polyolefin, and/or a mixed loss modulus ratio ($R_{E''mix}$) of 1.5 to 20 as defined by the following formula (2B):

$$R_{E''mix}=E''/E''_0 \tag{2B}$$

where E" is the loss modulus measured at 160° C. to 220° C. for the separator for an electricity storage device, and $E''_0$ is the loss modulus measured at 160° C. to 220° C. for as separator for an electricity storage device not containing the silane-modified polyolefin, when measured after the inorganic porous layer has been removed.

[48]

The separator for an electricity storage device according to any one of [40] to [47] above, wherein, in the temperature-dependent change of the storage modulus of the separator for an electricity storage device, the transition temperature of the rubber plateau and the crystal melt flow region is 135° C. to 150° C.

[49]

An electricity storage device comprising an electrode, the separator for an electricity storage device according to any one of [1] to [48] above, and a nonaqueous electrolyte solution.

[50]

An electricity storage device comprising a separator that includes polyethylene, and an electrolyte solution or additive, wherein a functional group-modified polyethylene or functional group graft copolymerized polyethylene reacts with a chemical substance in the electrolyte solution or additive, forming a crosslinked structure.

[51]

A method for producing the separator for an electricity storage device according to any one of [1] to [50] above, wherein the method comprises the following steps:

(1) a sheet-forming step in which a mixture of a silane-modified polyolefin, polyethylene and a plasticizer is extruded, cooled to solidification and cast into a sheet to obtain a sheet;

(2) a stretching step in which the sheet is stretched at least in a uniaxial direction to obtain a stretched sheet;

(3) a porous body-forming step in which the plasticizer is extracted from the stretched sheet in the presence of an extraction solvent, forming pores in the stretched sheet to form a porous body; and (4) a heat treatment step in which the porous body is subjected to heat treatment.

[52]

A method for producing a separator for an electricity storage device, which comprises the following steps:

(1) a sheet-forming step in which a silane-modified polyolefin, polyethylene and a plasticizer are extruded into a sheet using an extruder, cooled to solidification and shaped into a molded sheet;

(2) a stretching step in which the molded sheet is subjected to biaxial stretching to a 20-fold to 250-fold area increase to form a stretched sheet;

(3) a porous body-forming step in which the plasticizer is extracted from the stretched sheet to form a porous body;

(4) a heat treatment step in which the porous body is subjected to heat treatment and subjected to stretching and relaxation in the transverse direction to obtain a heat-treated porous body;

(8B) a coating step in which an inorganic porous layer including inorganic particles and a resin binder is formed on at least one surface of the heat-treated porous body to form a silane-crosslinking precursor; and (9) an assembly step in which a laminated stack or wound body of electrodes and the silane-crosslinking precursor, and a nonaqueous electrolyte solution, are housed in an exterior body, contacting the silane-crosslinking precursor with the nonaqueous electrolyte solution.

[53]

An electricity storage device assembly kit comprising the following two elements:

(1) an exterior body housing a laminated stack or wound body of electrodes and the separator for an electricity storage device according to any one of [1] to [48] above; and (2) a container housing a nonaqueous electrolyte solution.

[54]

The electricity storage device assembly kit according to [53] above, wherein the nonaqueous electrolyte solution includes a fluorine (F)-containing lithium salt.

[55]

The electricity storage device assembly kit according to [53] or [54], wherein the nonaqueous electrolyte solution includes lithium hexafluorophosphate ($LiPF_6$).

[56]

The electricity storage device assembly kit according to any one of [53] to [55], wherein the nonaqueous electrolyte solution is an acid solution and/or a base solution.

[57]

A method for producing an electricity storage device comprising the following steps:

a step of preparing the electricity storage device assembly kit according to any one of [53] to [56] above, and a step of contacting the separator for an electricity storage device in element (1) of the electricity storage device assembly kit with the nonaqueous electrolyte solution in element (2), to initiate silane crosslinking reaction of the silane-modified polyolefin.

[58]

The method for producing an electricity storage device according to [57], which further comprises the following steps:

a step of connecting lead terminals to the electrodes of element (1), and a step of carrying out at least one cycle of charge-discharge.

[59]

A method for producing an electricity storage device using a separator that includes a polyolefin, wherein:

the polyolefin comprises one functional group or two or more different functional groups, and the method for producing an electricity storage device comprises the following step:

a crosslinking step in which (1) condensation reaction is carried out between the functional groups, (2) the functional groups are reacted with a chemical substance inside the electricity storage device, or (3) the functional groups are reacted with different types of functional groups, to form a crosslinked structure.

[60]

The method for producing an electricity storage device according to [59] above, wherein the crosslinking step is carried out at a temperature of 5° C. to 90° C.

Advantageous Effects of Invention

According to the invention it is possible to provide an electricity storage device which has a separator for an electricity storage device with both a low temperature shutdown function and high-temperature membrane rupture, and inhibited generation of non-molten resin aggregates during the production process, thus contributing to productivity and economy, while also having satisfactory cycle characteristics and high safety, as well as an assembly kit for the same.

Moreover, since it is not necessary to form the crosslinked structure during the membrane formation process or immediately afterwards for the present invention, it is also possible to inhibit increase in internal stress of the separator or its deformation immediately after fabrication of the electricity storage device, and/or to impart a crosslinked structure to the separator without using the relatively high energy of photoirradiation or heating, and to thus reduce crosslinking unevenness. Furthermore, according to the invention it is possible to form a crosslinked structure not only within the separator but also between the separator and the electrodes and between the separator and the solid electrolyte interface (SEI), thus improving the strength between the different members of the electricity storage device, and also to reduce gaps formed between the electrodes and the separator caused by their expansion/contraction during charge-discharge of the electricity storage device, thereby notably improving cycle stability during prolonged use.

DESCRIPTION OF EMBODIMENTS

Figure 1:
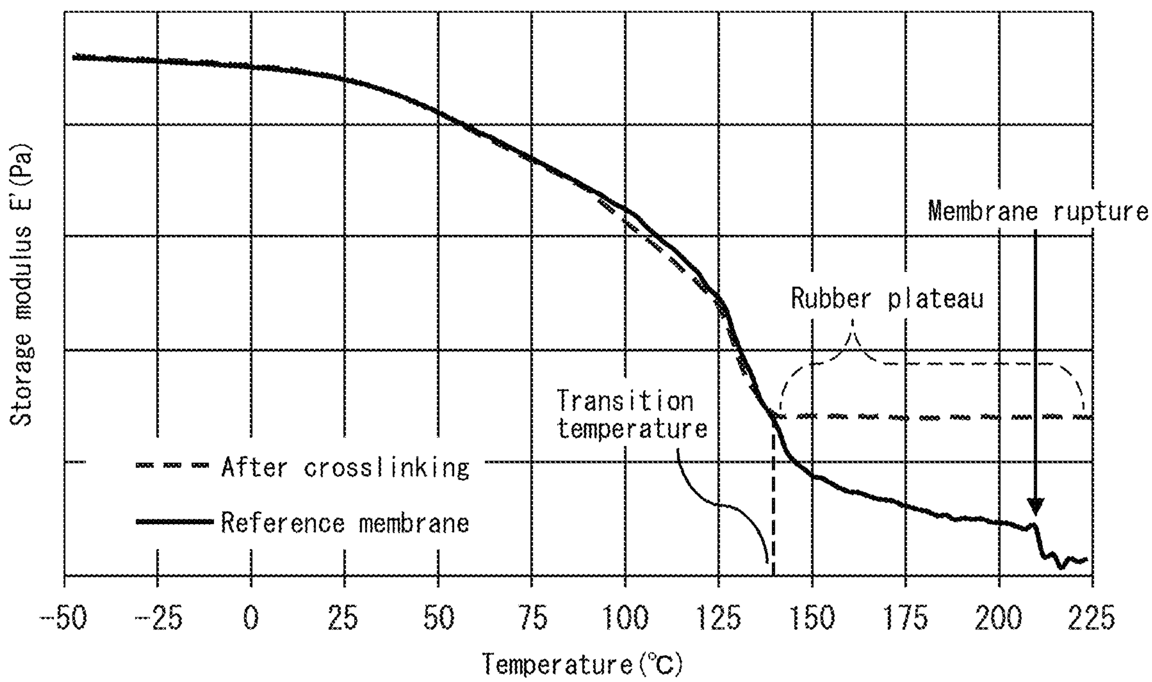
FIG. 1 shows an example of a graph illustrating the relationship between temperature and storage modulus, contrasting the storage modulus of a reference membrane and a crosslinked membrane in a temperature range of −50° C. to 225° C., and showing the transition temperature of the rubber plateau and crystal melt flow region.

Embodiments for carrying out the invention (hereunder referred to as "embodiments") will now be explained in detail. The present invention is not limited to the embodiments described below, and various modifications may be implemented within the scope of the gist thereof.

Throughout the present specification, the "to" in a numerical range means that the numerical values on either side are included as the upper limit and lower limit. The upper limits and lower limits for the numerical ranges throughout the present specification may be combined as desired. For example, the upper limit of a preferred numerical range may be combined with the lower limit of a more preferred numerical range, or conversely, the upper limit of a more preferred numerical range may be combined with the lower limit of a preferred range.

Throughout the present specification, "above", "upper" and "formed on the side" do not mean that the positional relationship of the respective members is "directly above". For example, the expressions "layer B formed on layer A" and "layer B formed on the surface of layer A" do not exclude the case where an arbitrary layer not qualifying as either is included between layer A and layer B.

The properties of the microporous membrane alone that are described below may be measured after removing layers other than the microporous membrane (for example, an inorganic porous layer) from the separator for an electricity storage device.

<Separator for Electricity Storage Device>

One aspect of the invention is a separator for an electricity storage device (hereunder also referred to simply as "separator"). The separator, which must have an insulating property and ion permeability, will usually comprise an insulating material sheet with a porous body structure, a polyolefin nonwoven fabric or a resin microporous membrane. Particularly suited for a lithium ion battery is a polyolefin microporous membrane that allows construction of a compact homogeneous porous body structure with redox degradation resistance of the separator.

A microporous membrane is a membrane composed of a porous body, and its mean pore size is preferably 10 nm to 500 nm and more preferably 30 nm to 100 nm.

When the separator is included in an electricity storage device, the separator can be removed from the electricity storage device.

First, Second, Third, Fourth and Fifth Embodiments

The separator of the first embodiment comprises a silane-modified polyolefin, and optionally another polyolefin as well. When the separator of the first embodiment contacts with the electrolyte solution, silane crosslinking reaction of the silane-modified polyolefin in the separator is initiated. Since the separator of the first embodiment is able to crosslink the silane-modified polyolefin during contact with the electrolyte solution, it allows timing of crosslinking to be controlled so that crosslinking reaction can be carried out during the production process for the electricity storage device, instead of crosslinking reaction during the separator production process.

It is a feature of the separator of the second embodiment that silane crosslinking reaction of the silane-modified polyolefin takes place when it contacts with the electrolyte solution. According to the second embodiment, it is sufficient for silane crosslinking reaction to be observed during contact between the separator and electrolyte solution, regardless of whether or not the silane-modified polyolefin is present in the separator, or where the residual silane-modified polyolefin is, or whether the silane crosslinking reaction is first initiated at contact with the electrolyte solution, or whether it takes place sequentially or continuously. The silane crosslinking reaction of the silane-modified polyolefin that takes place during contact between the separator and electrolyte solution according to the second embodiment allows the timing of crosslinking to be controlled without depending on the process of production or use of the separator.

Since the separator of the first and second embodiments can accelerate crosslinking reaction when the electrolyte solution is injected into the exterior body that is to house the separator, it is possible to avoid production defects during its production process and to increase the safety and output of the electricity storage device during the production process for the electricity storage device. From the viewpoint of timing of crosslinking reaction with the components of the separator, it is preferred for the silane crosslinking reaction of the silane-modified polyolefin to be initiated at the time of mixing or contact between the separator and electrolyte solution.

The separator according to the third embodiment comprises 5 to 40 weight % of a silane-modified polyolefin and 60 to 95 weight % of a polyolefin other than the silane-modified polyolefin, and in the viscoelasticity measurement (version 1) described in the Examples, it has:

a storage modulus change ratio (RAF) of 1.5 to 20 as defined by the following formula (1):

$$R_{\Delta E'}=E'_S/E'_j \quad (1)$$

{where $E'_j$ is the storage modulus measured at 160° C. to 220° C. for the separator for an electricity storage device before crosslinking reaction of the silane-modified polyolefin, and $E'_S$ is the storage modulus measured at 160° C. to 220° C. for the separator for an electricity storage device after crosslinking reaction of the silane-modified polyolefin}, and/or a loss modulus change ratio ($R_{\Delta E''}$) of 1.5 to 20 as defined by the following formula (3):

$$R_{\Delta E''}=E''_S/E''_j \quad (3)$$

{where $E''_j$ is the loss modulus measured at 160° C. to 220° C. for the separator for an electricity storage device before crosslinking reaction of the silane-modified polyolefin, and $E''_S$ is the loss modulus measured at 160° C. to 220° C. for the separator for an electricity storage device after crosslinking reaction of the silane-modified polyolefin}. Since the storage modulus change ratio ($R_{\Delta E'}$) and/or the loss modulus change ratio ($R_{\Delta E''}$) are within the range of 1.5 to 20 according to the third embodiment, it is possible to obtain both a shutdown function and high-temperature membrane rupture resistance. The storage modulus change ratio (RAF) and/or loss modulus change ratio ($R_{\Delta E''}$) are preferably between 2 and 18. Incidentally, $E'_j$ and $E'_S$, and $E''_j$ and $E''_S$, are the average values for the storage modulus or loss modulus measured in the preset temperature range of the measuring apparatus, with 160 to 220° C. set as the widest temperature range for each. When the separator is in the form of a laminated membrane, the silane-modified polyolefin-containing porous membrane alone is removed from the laminated membrane and the storage modulus $E'_j$ and $E'_S$ and the loss modulus $E''_j$ and $E''_S$ are measured.

The separator according to the fourth embodiment comprises 5 to 40 weight % of a silane-modified polyolefin and 60 to 95 weight % of a polyolefin other than the silane-modified polyolefin, and in the viscoelasticity measurement (version 1) described in the Examples, it has:

a mixed storage modulus ratio ($R_{E'mix}$) of 1.5 to 20 as defined by the following formula (2):

$$R_{E'mix}=E'_a/E'_0 \quad (2)$$

{where $E'_a$ is the storage modulus measured at 160° C. to 220° C. for the separator for an electricity storage device, and $E'_0$ is the storage modulus measured at 160° C. to 220° C. for a separator for an electricity storage device not containing the silane-modified polyolefin}, and/or a mixed loss modulus ratio ($R_{E''mix}$) of 1.5 to 20.0 as defined by the following formula (4):

$$R_{E''mix}=E''_a/E''_0 \quad (4)$$

{where $E''_a$ is the loss modulus measured at 160° C. to 220° C. for the separator for an electricity storage device, and $E''_0$ is the loss modulus measured at 160° C. to 220° C. for a separator for an electricity storage device not containing the silane-modified polyolefin}. Since the mixed storage modulus ratio ($R_{E'mix}$) and/or the mixed loss modulus ratio ($R_{E''mix}$) are within the range of 1.5 to 20.0 according to the fourth embodiment, it is possible to obtain both a shutdown function and high-temperature membrane rupture resistance. The mixed storage modulus ratio ($R_{E'mix}$) and/or mixed loss modulus ratio ($R_{E''mix}$) are preferably between 2 and 18. Incidentally, $E'_a$ and $E'_0$, and $E''_a$ and $E''_0$, are the average values for the storage modulus or loss modulus measured in the preset temperature range of the measuring apparatus, with 160 to 220° C. set as the widest temperature range for each. When the separator is in the form of a laminated membrane, the silane-modified polyolefin-containing porous membrane alone is removed from the laminated membrane and the storage modulus $E'_a$ and $E'_0$ and the loss modulus $E''_a$ and $E''_0$ are measured.

The separator of the fifth embodiment comprises 5 to 40 weight % of a silane-modified polyolefin and 60 to 95 weight % of a polyolefin other than the silane-modified polyolefin, wherein the transition temperature is 135° C. to 150° C. for the rubber plateau and the crystal melt flow region for the temperature-dependent change of the storage modulus or loss modulus, in the viscoelasticity measurement (version 1) described in the Examples. Since the transition temperature of the rubber plateau and crystal melt flow region is in the range of 135° C. to 150° C. according to the fifth embodiment, it is possible to obtain both a shutdown function and high-temperature membrane rupture resistance. The transition temperature of the rubber plateau and crystal melt flow region is preferably 137° C. to 147° C., more preferably 140° C. to 145° C. and even more preferably 140° C. to 143° C. When the separator is in the form of a laminated membrane, the silane-modified polyolefin-containing porous membrane alone is removed from the laminated stack and the transition temperature of the rubber plateau and crystal melt flow region is measured.

Sixth and Seventh Embodiments

The separator according to the sixth embodiment comprises a polyolefin having one or more types of functional groups, and after being housed in an electricity storage device, (1) the functional groups of the polyolefin undergo mutual condensation reaction, or (2) the functional groups of the polyolefin react with chemical substances inside the electricity storage device or (3) the functional groups of the polyolefin react with other types of functional groups, thus forming a crosslinked structure. Since it is thought that the functional groups in the polyolefin composing the separator are not incorporated into the crystal portion of the polyolefin but are crosslinked at the amorphous portion, then after the separator of the sixth embodiment has been housed in an electricity storage device, chemical substances in the surrounding environment or inside the electricity storage device can be utilized to form a crosslinked structure, thereby inhibiting increase in internal stress or deformation of the fabricated electricity storage device.

However, when crosslinking reaction is carried out before housing in the electricity storage device and steps such as winding up and slitting are carried out, this leaves effects of the stress produced by the tensile force generated during the steps. This is undesirable because when such stress is released after assembly of the electricity storage device it can potentially damage the wound electrodes by deformation or concentration of stress.

According to the sixth embodiment, the condensation reaction between the functional groups of the polyolefin (1) may be reaction by covalent bonding of two or more functional groups A in the polyolefin, for example. The reaction between the functional groups of the polyolefin and other types of functional groups (3) may be reaction by covalent bonding of a functional group A and a functional group B in the polyolefin, for example.

In the reaction between functional groups of the polyolefin and chemical substances inside the electricity storage device (2), for example, a functional group A in the polyolefin may form covalent bonds or coordination bonds with the electrolyte, electrolyte solution, electrode active material, electrode active material, additive or their decomposition products in the electricity storage device. In reaction (2), a crosslinked structure may be formed not only within the separator but also between the separator and the electrodes or between the separator and the solid electrolyte interface (SEI), thus increasing the strength between multiple members of the electricity storage device.

The separator of the seventh embodiment comprises a polyolefin and has an amorphous crosslinked structure in which the amorphous portion of the polyolefin is crosslinked. Since it is believed that the functional groups in the polyolefin composing the separator are not incorporated into the crystal portion of the polyolefin but are instead crosslinked in the amorphous portion, the separator of the seventh embodiment can provide both a shutdown function and high-temperature membrane rupture resistance while inhibiting increase in internal stress or deformation of the fabricated electricity storage device, as compared to a conventional crosslinked separator in which the crystal portion and its periphery are easily crosslinked, and can therefore ensure the safety of the electricity storage device. From the same viewpoint, the amorphous portion of the polyolefin in the separator of the seventh embodiment is preferably selectively crosslinked, and more preferably it is significantly more crosslinked than the crystal portion.

The crosslinking reaction mechanism and crosslinked structure of the seventh embodiment are not fully understood, but are conjectured by the present inventors to be as follows.

(1) Crystal Structure of High-Density Polyethylene Microporous Membrane

Figure 6:
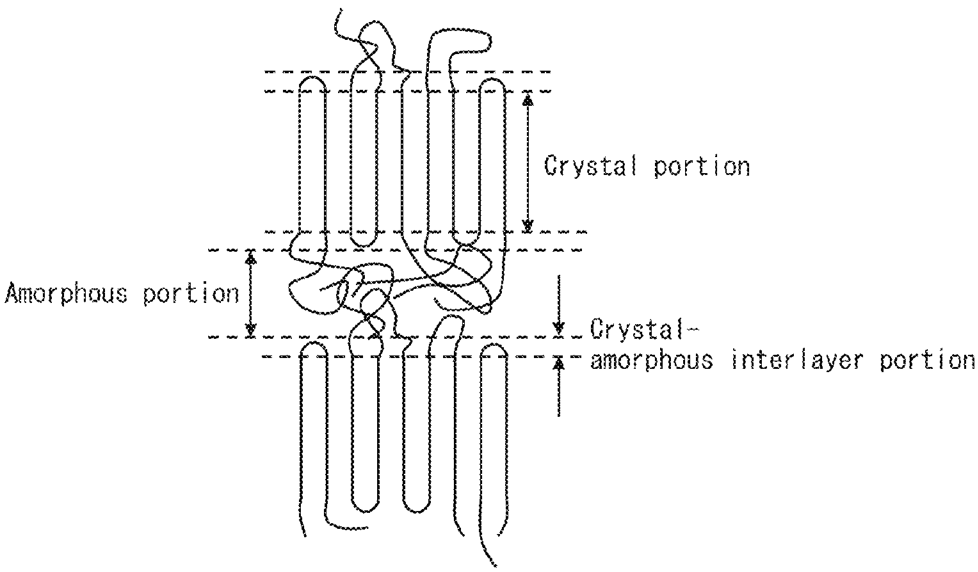
FIG. 6 is a schematic diagram illustrating a crystalline polymer with a higher-order structure, with the crystal structure divided into the lamella (crystal portion), the amorphous portion and the interlayer portion between them.

A polyolefin resin, which is typically high-density polyethylene, is generally a crystalline polymer, and as shown in FIG. 6, it has a higher-order structure divided into the lamella of the crystal structure (crystal portion), an amorphous portion and an interlayer portion between them. The polymer chain mobility is low in the crystal portion and in the interlayer portion between the crystal portion and amorphous portion, making it difficult to separate, but in solid viscoelasticity measurement it is possible to observe a relaxation phenomenon in the range of 0 to 120° C. The amorphous portion, on the other hand, has very high polymer chain mobility, with the phenomenon being observed in the range of −150 to −100° C. in solid viscoelasticity measurement. This is closely related to the radical relaxation or radical transfer reaction or crosslinking reaction described below.

Figure 7:
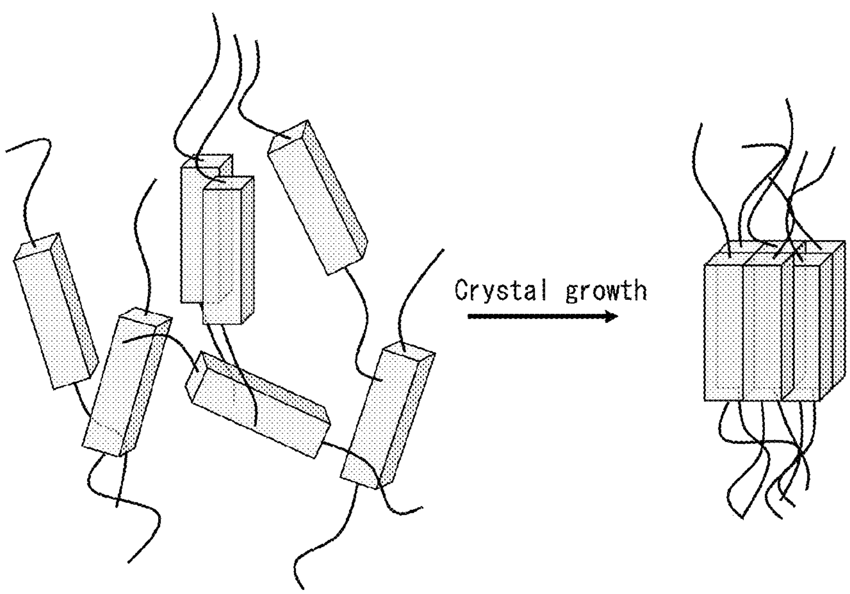
FIG. 7 is a schematic diagram illustrating crystal growth of a polyolefin molecule.

Moreover, the polyolefin molecules composing the crystals are not simple but rather, as shown in FIG. 7, multiple polymer chains form small lamella which then aggregate, forming crystals. It is difficult to observe this phenomenon directly. It has become evident, however, as recent simulations have advanced academic research in the field. For the purpose described herein, a "crystal" is the minimum crystal unit measured by X-ray structural analysis, being a unit that can be calculated as crystallite size. Thus, even the crystal portion (lamella interior) is partially unconstrained during crystallization, so that portions with somewhat high mobility are predicted to be present.

(2) Crosslinking Reaction Mechanism by Electron Beam

The reaction mechanism of electron beam crosslinking (hereunder abbreviated as EB crosslinking) of polymers is as follows. (I) Irradiation of an electron beam of several tens of kGy to several hundred kGy, (ii) permeation of the electron beam into the reaction target (polymer) and secondary electron generation, (iii) hydrogen withdrawal reaction and radical generation in the polymer chains by the secondary electrons, (iv) withdrawal of adjacent hydrogens by radicals and migration of the active sites, and (v) crosslinking reaction or polyene formation by recombination between radicals. Because radicals generated in the crystal portion have poor mobility they are present for long periods, while impurities and the like are unable to infiltrate into the crystals, and therefore the probability of reaction or quenching is low. Such radical species are known as stable radicals, and they remain for long periods of several months, their lifetimes having been elucidated by ESR measurement. This is thought to result in poor crosslinking reaction within the crystals. However, in the unconstrained molecular chains or the peripheral crystal-amorphous interlayer portions which are present in small amounts inside the crystals, the generated radicals have somewhat longer lifetimes. These radical species are known as persistent radicals, and in mobile environments they are thought to promote crosslinking reaction between molecular chains with high probability. The amorphous portions have very high mobility, and therefore generated radical species have a short lifetime and are thought to promote not only crosslinking reaction between molecular chains but also polyene reaction within individual molecular chains, with high probability.

In a micro visual field on the level of crystals, therefore, crosslinking reaction by EB crosslinking can be assumed to be localized within the crystals or at their peripheries.

(3) Crosslinking Reaction Mechanism by Chemical Reaction

According to the seventh embodiment of the invention, the functional groups in the polyolefin resin and the chemical substances in the electricity storage device, or the chemical substances in the electricity storage device, are preferably used as catalysts.

As mentioned above, crystal portions and amorphous portions are present in a polyolefin resin. Due to steric hindrance however, the functional groups are not present in the crystals and are localized in the amorphous portions. This is generally known, and even though units such as methyl groups that are present in small amounts in polyethylene chains are incorporated into the crystals, grafts that are bulkier than ethyl groups are not incorporated (NPL 2). Therefore, crosslinking points due to different reactions than the electron beam crosslinking are only localized at the amorphous portions.

(4) Relationship Between Differences in Crosslinked Structure and their Effects

As mentioned above, the reaction products in the crosslinking reactions by chemical reactions within the battery used for the seventh embodiment of the invention have different morphologies. In the research leading to the present invention, the following experimentation was carried out in order to elucidate crosslinked structures and to characterize the changes in physical properties of microporous membranes that result from structural changes.

Figure 8:
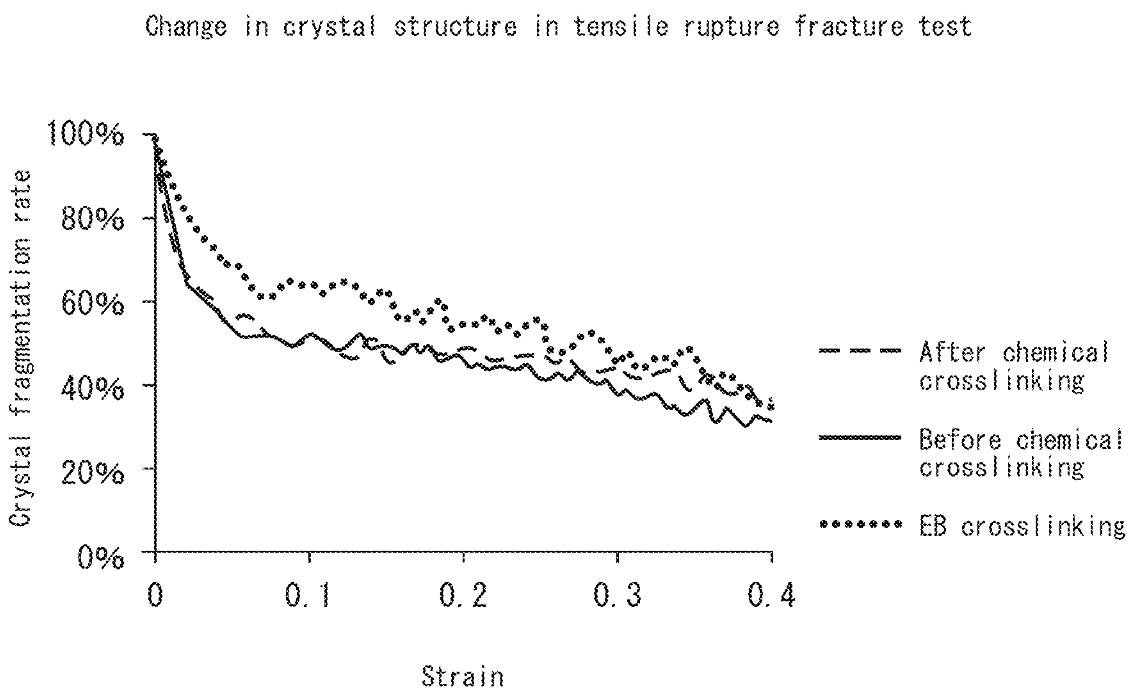
FIG. 8 is a strain-crystal fragmentation rate graph showing the change in X-ray crystal structure during a tensile rupture fracture test, for a membrane according to one embodiment of the invention.

First, the mechanical properties of a membrane were examined by a tensile rupture test. Simultaneously with the tensile rupture test, in-situ X-ray structural analysis was carried out using emitted light to analyze changes in crystal structure. As shown in FIG. 8, compared to a membrane without EB crosslinking or chemical crosslinking (before), the EB crosslinked membrane had reduced fragmentation of the crystal portion as the strain increased. This is because the crystal interiors or peripheries had been selectively crosslinked. The Young's modulus and breaking strength markedly increased during this time, allowing high mechanical strength to be exhibited. The chemical crosslinked membrane, on the other hand, showed no difference in fragmentation of the crystals before and after crosslinking reaction, thus suggesting that the amorphous portion has been selectively crosslinked. There was also no change in mechanical strength before and after crosslinking reaction.

The crystal melt behavior of both was then examined in a fuse/meltdown property test. As a result, the EB crosslinked membrane had a notably higher fuse temperature, and the meltdown temperature increased to 200° C. or higher. The chemical crosslinked membrane, on the other hand, showed no change in fuse temperature before and after crosslinking treatment, and the meltdown temperature was confirmed to have increased to 200° C. or higher. This suggests that the fuse (shutdown) properties resulting from crystal melting had resulted from a higher melting temperature and lower melting speed due to crosslinking of the EB crosslinked membrane at the peripheries of the crystal portions. It was also concluded that no change was caused in the shutdown property because the chemical crosslinked membrane had no crosslinked structure at the crystal portions. In the high temperature range of around 200° C., both had a crosslinked structure after crystal melting, and therefore the resin as a whole was stabilized in a gel state and a satisfactory meltdown property was obtained.

These findings are summarized in the following table.

TABLE 1

| | Electron beam crosslinking | Chemical reactive crosslinking |
|---|---|---|
| Crosslinking site | Within crystals and at crystal-amorphous interlayer portions | Amorphous portions |
| Film strength | Increased | No change |
| Fuse function | Function impaired or lost | No change |
| Meltdown resistance | Gradual increase with dose | Definitely improved |

From the viewpoint of formation of an amorphous crosslinked structure, and obtaining both a shutdown function and high-temperature membrane rupture resistance, the separator of the seventh embodiment has, in the viscoelasticity measurement (version 2) described in the Examples:

a mixed storage modulus ratio ($R_{E'x}$) defined by the following formula (1):

$$R_{E'X}=E'_Z/E'_{Z0} \quad (1)$$

{where $E'_Z$ is the storage modulus measured in the temperature range of 160° C. to 300° C. after crosslinking reaction of the separator for an electricity storage device has proceeded in the electricity storage device, and $E'_{Z0}$ is the storage modulus measured in the temperature range of 160° C. to 300° C. before the separator for an electricity storage device has been incorporated into the electricity storage device}, and/or a mixed loss modulus ratio ($R_{E''x}$) of preferably 1.5 to 20 and more preferably 3 to 18, defined by the following formula (3):

$$R_{E''X}=E''_Z/E''_{Z0} \quad (3)$$

{where $E''_Z$ is the loss modulus measured in the temperature range of 160° C. to 300° C. after crosslinking reaction of the separator for an electricity storage device has proceeded in the electricity storage device, and $E''_{Z0}$ is the loss modulus measured in the temperature range of 160° C. to 300° C. before the separator for an electricity storage device has been incorporated into the electricity storage device}. Incidentally, $E'_Z$, $E'_{Z0}$ and $E''_Z$, $E''_{Z0}$ are the average values for the storage modulus or loss modulus measured in the preset temperature range of the measuring apparatus, with 160° C. to 300° C. set as the widest temperature range for each. When the separator is in the form of a laminated membrane, the polyolefin porous membrane alone is removed from the laminated membrane and the storage modulus $E'_Z$ and $E'_{Z0}$ and the loss modulus $E''_Z$ and $E''_{Z0}$ are measured.

From the viewpoint of formation of an amorphous crosslinked structure, and obtaining both a shutdown function and high-temperature membrane rupture resistance, the separators according to the sixth and seventh embodiments have, in the viscoelasticity measurement (version 2) described in the Examples:

a mixed storage modulus ratio ($R_{E'mix}$) defined by the following formula (2):

$$R_{E'mix}=E'/E'_0 \quad (2)$$

{where E' is the storage modulus measured in the temperature range of 160° C. to 300° C. for the separator for an electricity storage device having an amorphous crosslinked structure, and $E'_0$ is the storage modulus measured at 160° C. to 300° C. for the separator for an electricity storage device without an amorphous crosslinked structure}, and/or a mixed loss modulus ratio ($R_{E''mix}$) of preferably 1.5 to 20, more preferably 3 to 19 and even more preferably 5 to 18, defined by the following formula (4):

$$R_{E''mix}=E''/E''_0 \quad (4)$$

{where E" is the loss modulus measured at 160° C. to 300° C. when the separator for an electricity storage device has an amorphous crosslinked structure, and $E''_0$ is the loss modulus measured at 160° C. to 300° C. for the separator for an electricity storage device without an amorphous crosslinked structure}. Incidentally, E, $E'_0$ and E", $E''_0$ are the average values for the storage modulus or loss modulus measured in the preset temperature range of the measuring apparatus, with 160° C.

to 300° C. set as the widest temperature range for each. When the separator is in the form of a laminated membrane, the polyolefin porous membrane alone is removed from the laminated membrane and the storage modulus E and $E'_0$ and the loss modulus E" and $E''_0$ are measured.

Eighth Embodiment

[Viscoelastic Behavior (Viscoelasticity Measurement (Version 3) Described in the Examples)]

The separator according to the eighth embodiment comprises a polyolefin microporous membrane, and in viscoelasticity measurement (version 3) described in the Examples, by solid viscoelasticity measurement at a temperature of −50° C. to 250° C., the minimum of the storage modulus (E') ($E'_{min}$) is 1.0 MPa to 10 MPa, the maximum of E' ($E'_{max}$) is 100 MPa to 10,000 MPa, and/or the minimum of the loss modulus (E") ($E''_{min}$) is 0.1 MPa to 10 MPa and the maximum of E" ($E''_{max}$) is 10 MPa to 10,000 MPa. If the ranges of 1.0 MPa≤$E'_{min}$≤10 MPa and 100 MPa≤$E'_{max}$≤10,000 MPa and/or 0.1 MPa≤$E''_{min}$≤10 MPa and 10 MPa≤$E''_{max}$ 10,000 MPa are satisfied, then not only will the separator tend to have both a shutdown function and high-temperature membrane rupture resistance, but production defects can be avoided during the production process for the separator or electricity storage device, and stability and safety can be achieved for the electricity storage device. From this viewpoint, the ranges are preferably 1.1 MPa≤$E'_{min}$≤9.0 MPa and/or 150 MPa≤$E'_{max}$≤9,500 MPa, and more preferably 1.2 MPa $E'_{min}$≤8.0 MPa and/or 233 MPa≤E'max 9,000 MPa. Also, the ranges 0.2 MPa≤$E''_{min}$≤9.0 MPa and/or 56 MPa≤$E''_{max}$≤9,000 MPa are preferred, and 0.4 MPa≤$E''_{min}$≤8.0 MPa and/or 74 MPa≤$E''_{max}$≤8,000 MPa are more preferred.

In solid viscoelasticity measurement (version 3) at temperatures from the membrane softening transition temperature to the membrane rupture temperature of the separator comprising a polyolefin microporous membrane, the average E ($E'_{ave}$) is preferably 1.0 MPa to 12 MPa, more preferably 1.2 MPa to 10 MPa and even more preferably 1.8 MPa to 8.2 MPa, and/or the average E" ($E''_{ave}$) is preferably 0.5 MPa to 10 MPa, more preferably 0.8 MPa to 8.2 MPa or 0.9 MPa to 3.2 MPa. If E' and/or E" are within these numerical ranges at temperatures from the membrane softening transition temperature to the membrane rupture temperature, the cycle stability and safety of an electricity storage device comprising the separator will tend to be improved.

In solid viscoelasticity measurement (version 3), from the viewpoint of both the shutdown function and high-temperature membrane rupture resistance, the membrane softening transition temperature of the separator comprising a polyolefin microporous membrane is preferably 140° C. to 150° C., more preferably 141° C. to 149° C. or 146° C. to 149° C., and/or the membrane rupture temperature is preferably 180° C. or higher, more preferably 190° C. or higher, 200° C. or higher, 210° C. or higher, 220° C. or higher, 230° C. or higher or 240° C. or higher, and even more preferably 250° C. or higher. The upper limit for the membrane rupture temperature is not limited, but it is understood in the technical field that the same membrane rupture phenomenon may occur even at temperatures higher than 250° C.

The conditions for measuring E' and E" in solid viscoelasticity measurement (version 3) of the separator are described in the Examples. When the separator is in the form of a laminated membrane, the polyolefin microporous membrane alone is removed from the laminated membrane and the E' and E" values of the removed polyolefin microporous membrane are measured. Moreover, when the membrane thickness of the polyolefin microporous membrane alone is less than 200 μm, the dynamic viscoelasticity measurement (version 3) may be carried out with multiple polyolefin microporous membranes stacked, or a single polyolefin microporous membrane folded, so that their total thickness is in the range of 200 μm to 400 μm.

From the viewpoint of both a shutdown function at relatively low temperature and membrane rupture properties at relatively high temperature, as well as improved cycle characteristics and safety of the electricity storage device, the separators of the first to eighth embodiments may also comprise a microporous membrane; and an inorganic porous layer including inorganic particles and a resin binder, disposed on at least one surface of the microporous membrane. The separator may also employ the microporous membrane as a base material, and may consist of a composite of the base material and an inorganic coating layer.

Ninth Embodiment

The separator according to the ninth embodiment comprises:

- a microporous membrane that includes a silane-modified polyolefin and
- an inorganic porous layer that includes inorganic particles and a resin binder, disposed on at least one surface of the microporous membrane. The separator of the ninth embodiment may also optionally include a layer other than the microporous membrane and inorganic porous layer.

For the ninth embodiment, a combination of a silane-modified polyolefin-containing microporous membrane and an inorganic porous layer will tend to provide both a shutdown function at lower temperatures than 150° C. and membrane rupture properties at relatively high temperature, and to improve the electricity storage device cycle characteristics and battery nail penetration safety. Since the silane-modified polyolefin in the microporous membrane has a silane crosslinking property, presumably silane crosslinking can result in increased viscosity of the resin in the microporous membrane, and therefore when compressive force is applied between the electrodes during a period of abnormal high temperature of an electricity storage device comprising a separator of the ninth embodiment, the crosslinked high-viscosity resin is less likely to flow into the inorganic layer (that is, integration is less likely), and the clearance between the electrodes can be adequately ensured and shorting of the battery can be inhibited.

Silane crosslinking reaction of the silane-modified polyolefin in the separator is preferably initiated when the separator of the ninth embodiment contacts with the electrolyte solution. More preferably, silane crosslinking reaction is observed during contact between the separator and electrolyte solution, regardless of whether silane crosslinking reaction is first initiated at contact with the electrolyte solution, or takes place sequentially or continuously. The silane crosslinking reaction of the silane-modified polyolefin that takes place during contact between the separator and the electrolyte solution controls the timing of crosslinking of the separator, not only avoiding production defects during the separator production process but also allowing safety and high output to be achieved in the production process for the electricity storage device. Moreover, causing contact between the separator and electrolyte solution can produce crosslinking reactions other than the silane crosslinking reaction.

The separator according to the ninth embodiment has:

a storage modulus change ratio ($R_{\Delta E'}$) of preferably 1.5 to 20 as defined by the following formula (1A):

$$R_{\Delta E'}=E'_S/E'_j \tag{1A}$$

{where $E'_j$ is the storage modulus measured at 160° C. to 220° C. for the separator for an electricity storage device before crosslinking reaction of the silane-modified polyolefin, and $E'_S$ is the storage modulus measured at 160° C. to 220° C. for the separator for an electricity storage device after crosslinking reaction of the silane-modified polyolefin}, and/or a loss modulus change ratio ($R_{\Delta E''}$) of preferably 1.5 to 20 as defined by the following formula (1B):

$$R_{\Delta E''}=E''_S/E''_j \tag{1B}$$

{where $E''_j$ is the loss modulus measured at 160° C. to 220° C. for the separator for an electricity storage device before crosslinking reaction of the silane-modified polyolefin, and $E''_S$ is the loss modulus measured at 160° C. to 220° C. for the separator for an electricity storage device after crosslinking reaction of the silane-modified polyolefin}, when measured after the inorganic porous layer has been removed from the separator, in the viscoelasticity measurement (version 1) described in the Examples. Since the storage modulus change ratio ($R_{\Delta E'}$) and/or the loss modulus change ratio ($R_{\Delta E''}$) are within the range of 1.5 to 20, it is easy to obtain both a shutdown function and high-temperature membrane rupture resistance. The storage modulus change ratio ($R_{\Delta E'}$) and/or loss modulus change ratio ($R_{\Delta E''}$) are more preferably between 2 and 18. Incidentally, $E'_j$, $E'_S$ and $E''_j$, $E''_S$ are the average values for the storage modulus or loss modulus measured in the preset temperature range of the measuring apparatus, with 160 to 220° C. set as the widest temperature range for each. When the separator is in the form of a laminated membrane or in the form of a composite membrane comprising a microporous membrane and an inorganic porous layer, the silane-modified polyolefin-containing microporous membrane alone is removed from the laminated membrane or the composite membrane and the storage modulus $E'_j$ and $E'_S$ and the loss modulus $E''_j$ and $E''_S$ of the silane-modified polyolefin-containing microporous membrane are measured.

The separator according to the ninth embodiment has:

a mixed storage modulus ratio ($R_{E'mix}$) of preferably 1.5 to 20 as defined by the following formula (2A):

$$R_{E'mix}=E'/E'_0 \tag{2A}$$

{where E is the storage modulus measured at 160° C. to 220° C. for the separator for an electricity storage device and $E'_0$ is the storage modulus measured at 160° C. to 220° C. for a separator for an electricity storage device not containing the silane-modified polyolefin}, and/or a mixed loss modulus ratio ($R_{E''mix}$) of preferably 1.5 to 20 as defined by the following formula (2B):

$$R_{E''mix}=E''/E''_0 \tag{2B}$$

{where E" is the loss modulus measured at 160° C. to 220° C. for the separator for an electricity storage device, and $E''_0$ is the loss modulus measured at 160° C. to 220° C. for a separator for an electricity storage device not containing the silane-modified polyolefin}, when measured after the inorganic porous layer has been removed from the separator, in the viscoelasticity measurement (version 1) described in the Examples. Since the mixed storage modulus ratio ($R_{E'mix}$) and/or the mixed loss modulus ratio ($R_{E''mix}$) are within the range of 1.5 to 20, it is easy to obtain both a shutdown function and high-temperature membrane rupture resistance. The mixed storage modulus ratio ($R_{E'mix}$) and/or mixed loss modulus ratio ($R_{E''mix}$) are more preferably between 2 and 18. Incidentally, E' and $E'_0$, and E" and $E''_0$, are the average values for the storage modulus or loss modulus measured in the preset temperature range of the measuring apparatus, with 160 to 220° C. set as the widest temperature range for each. When the separator is in the form of a laminated membrane or in the form of a composite membrane comprising a microporous membrane and an inorganic porous layer, the silane-modified polyolefin-containing microporous membrane alone is removed from the laminated membrane or the composite membrane and the storage modulus E' and $E'_0$ and the loss modulus E" and $E''_0$ of the silane-modified polyolefin-containing microporous membrane are measured. A separator for an electricity storage device not containing a silane-modified polyolefin will be described in detail in the Examples.

From the viewpoint of obtaining both a shutdown function and high-temperature membrane rupture resistance, the separator according to the ninth embodiment preferably has a transition temperature of 135° C. to 150° C. for the rubber plateau and the crystal melt flow region, for the temperature-dependent change of the storage modulus. The transition temperature of the rubber plateau and crystal melt flow region is preferably 137° C. to 147° C., more preferably 140° C. to 145° C. and even more preferably 140° C. to 143° C. When the separator is in the form of a laminated stack or in the form of a composite membrane comprising a microporous membrane and an inorganic porous layer, the silane-modified polyolefin-containing microporous membrane alone is removed from the laminated membrane or the composite membrane and transition temperature of the silane-modified polyolefin-containing microporous membrane are measured.

Tenth Embodiment

The separator for an electricity storage device according to a tenth embodiment of the invention (hereunder referred to simply as "separator") comprises a first porous layer (layer A) that includes a silane-modified polyolefin and is able to form a crosslinked structure, and a second porous layer (layer B) that includes inorganic particles. Layer A and layer B are both either single layers or multiple layers. Layer B is formed on only one side or on both sides of layer A.

In a LIB, as a typical electricity storage device, lithium (Li) ions reciprocate between positive and negative electrodes. By situating a separator comprising layer A and layer B between the positive and negative electrodes, therefore, it is possible to cause relatively rapid movement of Li ions between the positive and negative electrodes, while avoiding contact between the positive and negative electrodes.

(Thickness Ratio)

Layer A functions as a crosslinkable microporous membrane, while layer B functions as an inorganic porous layer to be formed on the microporous membrane.

The ratio of the thickness (TA) of layer A with respect to the thickness (TB) of layer B (TA/TB) is preferably 0.22 to 14. If the ratio (TA/TB) is 0.22 or greater it will be possible to adequately ensure the presence of layer A in the separator and to thus exhibit the function of layer A. If the ratio (TA/TB) is 14 or lower, it will be possible to adequately ensure the presence of layer B in the separator and to thus exhibit the function of layer B.

By forming layer A and layer B with their respective specific structures and setting the ratio (TA/TB) to be within this range, it is possible to provide a separator that can improve cycle characteristics and safety in an electricity storage device. The separator can be suitably used as a constituent material of a LIB for mounting in a mobile device or a vehicle.

From the viewpoint of this effect, the ratio (TA/TB) is preferably 0.8 or greater and more preferably 1.0 or greater. The ratio (TA/TB) is also preferably no higher than 5.5 and more preferably no higher than 3.2.

The ratio (TA/TB) may be set to be lower than 2.5, 2.0 or lower, or 1.0 or lower, for example. In this case, the thickness (TA) of layer A is less than 2.5 times the thickness (TB) of layer B, or even smaller than the thickness (TB) of layer B, thus allowing the layer A to be provided as a thinner membrane so that the separator thickness can be reduced.

The total thickness of layer A and layer B (TA+TB) is preferably 3.0 μm to 22 μm. If the total thickness (TA+TB) is 3.0 μm or greater the membrane strength of the separator will tend to be increased. If the total thickness (TA+TB) is 22 μm or smaller, on the other hand, the ion permeability of the separator will tend to be increased.

From the viewpoint of this effect, the total thickness (TA+TB) is more preferably 3.5 μm or greater and even more preferably 4.0 μm or greater. The total thickness (TA+TB) is also more preferably no greater than 20 μm and even more preferably no greater than 18 μm.

The total thickness (TA+TB) may be set to less than 11 μm, 10 μm or smaller or 8 or smaller, for example. Even with such a thin separator it is still possible to improve the cycle characteristics and safety of an electricity storage device, so long as the ranges of the invention are satisfied.

The ratio (TA/TB) and the total thickness (TA+TB) may each be measured by the methods described in the Examples, and they can be controlled by adjusting the thickness (TA) and/or the thickness (TB). Layer A and layer B will now be described.

(Shutdown Temperature and Meltdown Temperature)

Layer A preferably has a shutdown temperature (also referred to as the fuse temperature) of 130° C. to 160° C. and a meltdown temperature (also referred to as the membrane rupture temperature) of 200° C. or higher, as measured based on the electrical resistance under pressure of 0.1 MPa to 10.0 MPa (preferably under pressure of 10 MPa).

If the shutdown temperature is 130° C. or higher it will be possible to avoid unnecessary operation of the shutdown function during periods of normal reaction in the electricity storage device, and the electricity storage device can be ensured to have sufficient output characteristics. If the shutdown temperature is 160° C. or lower, on the other hand, the shutdown function can be suitably exhibited during periods of abnormal reaction in the electricity storage device.

In addition, a shutdown temperature of 200° C. or higher will be able to stop abnormal reaction before the ultra-high temperature range is reached, during periods of abnormal reaction in the electricity storage device, and can prevent melting membrane rupture of the separator during periods of abnormal reaction of the electricity storage device.

In other words, if the shutdown temperature and meltdown temperature satisfy the conditions specified above, then it will be possible to obtain a separator that is able to provide an electricity storage device with excellent heat resistance, pore occlusion property (shutdown function) and melting membrane rupture property (meltdown function), and to ensure the mechanical properties and ion permeability of the separator itself. With a separator whose shutdown temperature and meltdown temperature satisfy the aforementioned conditions, therefore, the electricity storage device can be designed with improved cycle characteristics and safety.

From the viewpoint of this effect, the shutdown temperature is preferably higher than 130° C., more preferably 135° C. or higher and even more preferably 136° C. or higher. The shutdown temperature is also preferably no higher than 150° C., more preferably no higher than 148° C. and even more preferably no higher than 146° C.

From the same viewpoint of this effect, the meltdown temperature is preferably 175° C. or higher, more preferably 178° C. or higher and even more preferably 180° C. or higher. The meltdown temperature is also preferably no higher than 230° C., more preferably no higher than 225° C. and even more preferably no higher than 220° C.

The condition of "a meltdown temperature of 200° C. or higher" is satisfied even when the meltdown temperature cannot be accurately measured in the range exceeding 200° C., so long as the temperature is 200° C. or higher.

The terms "shutdown temperature" and "meltdown temperature" as used herein are the values obtained upon measurement based on the electrical resistance under the pressure specified above. Specifically, the shutdown temperature and meltdown temperature are derived from the alternating-current resistance (alternating-current resistance between electrodes) that increases with increasing temperature of the laminated stack comprising the positive electrode, separator and negative electrode while applying the aforementioned pressure to the laminated stack. For the tenth embodiment, the shutdown temperature is the temperature at which the alternating-current resistance first exceeds a prescribed reference value (for example, 1000Ω), and the meltdown temperature is the temperature at which the alternating-current resistance exceeding the reference value falls below the reference value (for example, 1000Ω) as further heating is continued thereafter.

A hydraulic jack may be used for pressurizing of the laminated stack, but this is not limitative, and any known pressurizing means other than a hydraulic jack may be used. An aluminum heater may be used for heating of the laminated stack, but this is also not restrictive, and any known heating means other than an aluminum heater may be used.

The shutdown temperature and meltdown temperature may be measured by the methods described in the Examples, and they can be controlled by adjusting the structure of and production method for layer A.

(Heat Shrinkage Factor at 150° C.)

The heat shrinkage factor (T2) at 150° C. after formation of the crosslinked structure in layer A is 0.02 to 0.91 times the heat shrinkage factor (T1) at 150° C. before formation of the crosslinked structure. In other words, the ratio of the heat shrinkage factor (T2) at 150° C. after formation of the crosslinked structure in layer A with respect to the heat shrinkage factor (T1) at 150° C. before formation of the crosslinked structure (T2/T1) is 0.02 to 0.91. The heat shrinkage factor used here is the larger value of the heat shrinkage factor in the machine direction (MD) of layer A and the heat shrinkage factor in the transverse direction (TD) of layer A.

It is because layer A is able to form a crosslinked structure with a silane-modified polyolefin, that it is possible to notice a change in heat shrinkage factor before and after crosslinking.

If the ratio (T2/T1) is 0.02 or greater it will be possible to effectively inhibit short circuiting, thereby reliably preventing temperature increase of the electricity storage device as a whole and consequent generation of fumes or ignition. It may be judged that crosslinking reaction in layer A has proceeded sufficiently if the ratio (T2/T1) is no greater than 0.91. That is, if the ratio (T2/T1) is within the range specified above, a separator for an electricity storage device can be provided that improves the cycle characteristics and safety for an electricity storage device.

From the viewpoint of this effect, the ratio (T2/T1) is preferably 0.03 or greater, more preferably 0.05 or greater and even more preferably 0.07 or greater. The ratio (T2/T1) is also preferably no greater than 0.7, more preferably no greater than 0.5 and even more preferably no greater than 0.4.

The heat shrinkage factor (T1) at 150° C. before formation of the crosslinked structure is preferably no higher than 70% and more preferably no higher than 60%.

The heat shrinkage factor (T2) at 150° C. after formation of the crosslinked structure is preferably no higher than 60% and more preferably no higher than 50%. However, since formation of a crosslinked structure tends to result in a lower heat shrinkage factor compared to before formation of the crosslinked structure, the heat shrinkage factor (T2) will generally be a smaller value than the heat shrinkage factor (T1).

The heat shrinkage factor at 150° C. can be measured by the methods described in the Examples, and they can be controlled by adjusting the structure of and production method for layer A.

The separators of the embodiments described above are interchangeable and may also be combined with each other. The separator of the ninth or tenth embodiment described above may also optionally include a layer other than the microporous membrane and inorganic porous layer. The constituent elements of the separators of the first to tenth embodiments will now be described.

[Microporous Membrane]

The microporous membrane may be formed of a polyolefin or a modified polyolefin.

The microporous membrane includes a silane-modified polyolefin, and may optionally include other polyolefins. Due to the silane crosslinking property of the silane-modified polyolefin, the microporous membrane is able to undergo crosslinking reaction during the production process for the separator.

The polyolefin to be included in the microporous membrane is not particularly restricted, and examples include ethylene or propylene homopolymers, and copolymers formed from two or more monomers selected from the group consisting of ethylene, propylene, 1-butene, 4-methyl-1-pentene, 1-hexene, 1-octene and norbornane. Among these, high-density polyethylene (homopolymer) or low-density polyethylene is preferred, and high-density polyethylene (homopolymer) is more preferred, from the viewpoint of allowing heat setting (also abbreviated as "HS") to be carried out at higher temperature while avoiding obstruction of the pores. A single polyolefin may be used alone, or two or more may be used in combination.

From the viewpoint of redox degradation resistance and obtaining a compact, homogeneous porous body structure, the microporous membrane is preferably produced using both a silane-modified polyolefin and ultrahigh molecular weight polyethylene (UHMWPE) as starting materials. The weight-average molecular weight of ultrahigh molecular weight polyethylene (UHMWPE) is generally known to be 1,000,000 or higher. More specifically, the weight ratio of the silane-modified polyolefin and UHMWPE during production of the microporous membrane or separator (silane-modified polyolefin weight/UHMWPE weight) is 0.05/0.95 to 0.40/0.60.

The content of the polyolefin in the microporous membrane is preferably 50 wt % to 100 wt %, preferably 70 wt % to 100 wt % or preferably 80 wt % to 100 wt %. The microporous membrane also preferably includes a polyolefin with a weight-average molecular weight of 100,000 or higher and less than 1,000,000 (included in a proportion of preferably 40 wt % or greater and more preferably 80 wt % or greater with respect to the entire polyolefin). The weight-average molecular weight of the polyolefin is more preferably 120,000 or higher and less than 950,000, and even more preferably 130,000 or higher and less than 930,000. By using a polyolefin having a weight-average molecular weight of 100,000 or higher and less than 1,000,000, relaxation of shrinkage of the polymer will take place early during a heating test of the electricity storage device, and in particular, safety will be more easily maintained in the heating safety test. By adjusting the weight-average molecular weight of the microporous membrane to lower than 1,000,000 it is possible to inhibit casting defects (film patterns) during extrusion, known as "melt fracture". By adjusting the weight-average molecular weight of the microporous membrane to 100,000 or higher, on the other hand, it is possible to inhibit transfer of recesses when the microporous membrane has been wound around a core (winding core).

The viscosity-average molecular weight of the microporous membrane during removal of the inorganic porous layer and during uncrosslinked treatment is preferably 100,000 to 1,200,000 and more preferably 150,000 to 800,000, from the viewpoint of avoiding generation of polymer powder by abrasive shear when the separator is transported by a roll.

The membrane thickness of the microporous membrane is preferably 1.0 μm or greater, more preferably 2.0 μm or greater and even more preferably 3.0 μm or greater, 4.0 μm or greater or 4.5 μm or greater. A microporous membrane thickness of 1.0 μm or greater will tend to result in increased membrane strength. The membrane thickness of the microporous membrane is also preferably no greater than 500 μm, more preferably no greater than 100 μm and more preferably no greater than 80 μm, no greater than 22 μm or no greater than 19 μm. A microporous membrane thickness of no greater than 500 μm will tend to result in increased ion permeability. The membrane thickness of the microporous membrane can be measured by the method described in the Examples.

When the microporous membrane is a separator to be used in a relatively high-capacity lithium ion secondary battery of recent years, the membrane thickness of the microporous membrane is preferably no greater than 25 μm, more preferably no greater than 22 μm or no greater than 20 μm, even more preferably no greater than 18 μm and most preferably no greater than 16 μm. In this case, a microporous membrane thickness of no greater than 25 μm will tend to result in increased permeability. The lower limit for the microporous membrane thickness may be 1.0 μm or greater, 3.0 μm or greater, 4.0 μm or greater, 6.0 μm or greater or 7.5 μm or greater.

From the viewpoint of the high-temperature membrane rupture resistance of the separator for an electricity storage device and the safety of the electricity storage device, a microporous membrane used as the separator has a melted membrane rupture temperature of preferably 180° C. to 220°

C. and more preferably 180° C. to 200° C., as measured by thermomechanical analysis (TMA). In most cases when an electricity storage device has released heat in an unexpected runaway reaction, the polyolefin separator for an electricity storage device fuses at low temperature (for example, 150° C. or below), resulting in early migration of Li ions and consequent halting of discharge inside or outside of the electricity storage device. By subsequent cooling of the electricity storage device by external air or a coolant, the electricity storage device as a whole is cooled and it is possible to inhibit ignition of the electrolyte solution or exothermic decomposition reaction of the electrolyte, thus allowing the safety to be ensured. However, runaway reaction occurring inside the electricity storage device is not stopped by fusing of the separator, and heat release continues until the separator undergoes molten membrane rupture, making it impossible to ensure the safety of the device. It is therefore important for the separator to not undergo molten membrane rupture until the electricity storage device as a whole has been thoroughly cooled. Moreover, in extreme cases where the temperature has increased to the ultra-high temperature range of 220° C. or higher, decomposition reaction of the electrolyte solution or electrolyte proceeds violently, with the decomposition products causing corrosion reaction on the electrodes, or heat also being released to the point of explosion. In such cases, the separator undergoes molten membrane rupture, seeping into both electrodes and coating the active materials, thus allowing corrosion reaction to be inhibited.

[First Porous Layer (Layer A)]

Layer A comprises a silane-modified polyolefin and can form a crosslinked structure. From the viewpoint of ensuring degradation resistance against oxidation-reduction and ensuring a compact, homogeneous porous body structure, layer A preferably further includes polyethylene as a different polyolefin from the silane-modified polyolefin. Layer A may also include components other than the silane-modified polyolefin and polyethylene.

The polyolefin composing the silane-modified polyolefin in layer A may be a homopolymer of ethylene or propylene; or a copolymer formed from at least two monomers selected from the group consisting of ethylene, propylene, 1-butene, 4-methyl-1-pentene, 1-hexene, 1-octene and norbornane. Among these, the polyolefin is preferably ethylene homopolymer (polyethylene), more preferably high-density polyethylene and/or low-density polyethylene and even more preferably high-density polyethylene, from the viewpoint of allowing heat setting at higher temperature while avoiding obstruction of the pores. A single polyolefin may be used alone, or two or more may be used in combination.

Layer A may also include a polymer (another polymer) other than a silane-modified polyolefin or polyethylene, within a range that does not overly inhibit the effect of the invention.

The weight-average molecular weight of layer A as a whole is preferably 100,000 to 1,200,000 and more preferably 150,000 to 800,000.

(Thickness of Layer A)

The thickness (TA) of layer A is preferably 1 μm or greater, more preferably 2 μm or greater and even more preferably 3 μm or greater. If the thickness (TA) is 1 μm or greater the membrane strength will tend to be further increased. The thickness (TA) of layer A is also preferably 500 μm or smaller, more preferably 100 μm or smaller and even more preferably 80 μm or smaller. If the thickness (TA) is 500 μm or smaller the ion permeability will tend to be further increased. The thickness (TA) may be set to 1.00 μm or greater, 2.00 μm or greater or 3.00 μm or greater, for example.

When the separator is a separator for a LIB, the thickness (TA) is preferably less than 22 μm, more preferably no greater than 21 μm and even more preferably no greater than 20.5 μm. When the separator is a separator for a LIB the upper limit for the thickness (TA) may be set to less than 13 μm or no greater than 8.5 μm. If the thickness (TA) is 25 μm or smaller the ion permeability will tend to be further increased. The thickness (TA) may be set to less than 22.00 μm, 21.00 μm or smaller, 20.00 μm or smaller, less than 13.00 μm or 8.50 or smaller. The lower limit for the thickness (TA) may be the same as described above.

The thickness (TA) can be measured by the method described in the Examples, and it can be controlled by varying the stretch ratio of layer A.

When layer A is a single layer, the thickness of layer A is treated as the thickness (TA). When layer A consists of multiple layers, the total of the thicknesses of the multiple layers in layer A is treated as the thickness (TA).

(Membrane Rupture Temperature of Layer A)

The membrane rupture temperature of layer A is preferably 180° C. to 220° C., as measured by thermomechanical analysis (TMA).

Even when the electricity storage device has generated abnormal heat release due to runaway reaction, the shutdown function of the separator is expected to stop movement of Li ions, and discharge in the electricity storage device or outside of the electricity storage device that results from it. It is expected that the electricity storage device as a whole will then be cooled by a coolant, thus ensuring the safety. On the other hand, if the membrane rupture temperature is within the range specified above, then the separator will undergo molten rupture and seep onto both electrodes so that the active materials can be coated, thus even more easily inhibiting heat release even when the electricity storage device as a whole is not sufficiently cooled, or even if an ultra-high temperature range is reached.

The membrane rupture temperature can be measured by the method described in the Examples, and it can be controlled by changing the stretching temperature and/or stretch ratio during the production process.

(Porosity of Microporous Membrane or Layer A)

The porosity of the microporous membrane or layer A is preferably 20% or greater, more preferably 25% or greater, and even more preferably 28% or greater, 30% or greater, 32% or greater or 35% or greater. If the porosity is 20% or greater, its ability to follow rapid movement of Li ions will be further increased. The porosity is also preferably no greater than 90%, more preferably no greater than 80% and even more preferably no greater than 60%. If the porosity is no greater than 90%, the membrane strength will be further increased and self-discharge will tend to be inhibited.

The porosity can be measured by the method described in the Examples, and it can be controlled by changing the stretching temperature and/or stretch ratio during the production process.

(Air Permeability of Microporous Membrane or Layer A)

The air permeability of the microporous membrane or layer A is preferably 1 second/100 $cm^3$ or greater, more preferably 50 seconds/100 $cm^3$ or greater, even more preferably 55 seconds/100 $cm^3$ or greater, and yet more preferably 70 seconds or greater, 90 seconds or greater or 110 seconds or greater. If the air permeability is 1 second/100 $cm^3$ or greater, the balance between the membrane thickness, porosity and mean pore size will tend to be improved. The air permeability is also preferably no greater than 400 seconds/100 $cm^3$, more preferably no greater than 300 seconds/100 $cm^3$ and even more preferably no greater than 270 seconds/100 $cm^3$. If the air permeability is no greater than 400 seconds/100 $cm^3$, the ion permeability will tend to be further increased.

The air permeability can be measured by the method described in the Examples, and it can be controlled by changing the stretching temperature and/or stretch ratio during the production process.

(Puncture Strength of Microporous Membrane or Layer A)

The puncture strength of the microporous membrane or layer A is preferably 200 gf/20 μm or greater and more preferably 300 gf/20 μm or greater. If the puncture strength is 200 gf/20 μm or greater, then even if active materials have dropped out when the laminated stack of the separator and electrodes has been wound, it will be easier to inhibit membrane rupture due to the dropped out active materials. It will also be possible to reduce the possibility of short circuiting caused by expansion and contraction of the electrodes during charge-discharge. The puncture strength of the microporous membrane or layer A is also preferably no greater than 4000 gf/20 μm and more preferably no greater than 3800 gf/20 μm. If the puncture strength is no greater than 3500 gf/20 μm, then it will be easier to reduce heat shrinkage during heating.

The puncture strength can be measured by the method described in the Examples, and it can be controlled by changing the stretching temperature and/or stretch ratio during the production process.

[Tensile Strength of Microporous Membrane or Layer A]

The tensile strength of the microporous membrane or layer A is preferably 1000 $kgf/cm^2$ or greater, more preferably 1050 $kgf/cm^2$ or greater and even more preferably 1100 $kgf/cm^2$ or greater in both the MD (the lengthwise direction, machine direction or flow direction of the membrane or layer A) and the TD (the direction perpendicular to the MD, i.e. the transverse direction of the membrane or layer A). If the tensile strength is 1000 $kgf/cm^2$ or greater, then slitting or rupture during winding of the electricity storage device will tend to be further inhibited, or short circuiting due to contaminants in the electricity storage device will tend to be further inhibited. The tensile strength is also preferably no greater than 5000 $kgf/cm^2$, more preferably no greater than 4500 $kgf/cm^2$ and even more preferably no greater than 4000 $kgf/cm^2$. If the tensile strength is no greater than 5000 $kgf/cm^2$, then the microporous membrane or layer A will undergo earlier relaxation to exhibit weaker contractive force during heat testing, thus tending to result in higher safety.

[Tensile Modulus of Microporous Membrane or Layer A]

The tensile modulus of the microporous membrane or layer A is preferably no greater than 120 N/cm, more preferably no greater than 100 N/cm and more preferably no greater than 90 N/cm, in both the MD and TD. A tensile modulus of no greater than 120 N/cm means that the separator for a lithium ion secondary battery is not excessively oriented, and for example, when the plugging agent such as polyethylene melts and shrinks in a heating test, it will tend to allow the polyethylene to undergo early stress relaxation, thereby preventing shrinkage of the separator in the battery and being more likely to prevent short circuiting between the electrodes (that is, it can improve the safety of the separator during heating). A low tensile modulus in this range is easily achieved by including polyethylene with a weight-average molecular weight of 500,000 or lower in the polyolefin forming the microporous membrane or layer A.

The lower limit for the tensile modulus, on the other hand, is not particularly restricted but is preferably 10 N/cm or greater, more preferably 30 N/cm or greater and even more preferably 50 N/cm or greater. The tensile modulus can be appropriately adjusted by adjusting the degree of stretching in the production process or by relaxation as necessary after stretching.

<Polyolefin>

The polyolefin is not particularly restricted, and examples include ethylene or propylene homopolymers, and copolymers formed from two or more monomers selected from the group consisting of ethylene, propylene, 1-butene, 4-methyl-1-pentene, 1-hexene, 1-octene and norbornane. Among these, high-density polyethylene or low-density polyethylene is preferred, and high-density polyethylene is more preferred, from the viewpoint of allowing heat setting (also abbreviated as "HS") to be carried out at higher temperature while avoiding obstruction of the pores. A single polyolefin may be used alone, or two or more may be used in combination.

The separator also preferably includes a polyolefin with a weight-average molecular weight (Mw) of less than 2,000,000, with the polyolefin with a Mw of less than 2,000,000 included in a proportion of more preferably 40 weight % or greater and even more preferably 80 weight % or greater with respect to the entire polyolefin. By using a polyolefin with an Mw of less than 2,000,000, relaxation of shrinkage of the polymer will take place early during a heating test of the electricity storage device, and in particular, safety will be more easily maintained in a heating safety test. When a polyolefin with an Mw of less than 2,000,000 is used, the elastic modulus in the thickness direction of the obtained microporous membrane tends to be lower compared to when a polyolefin of 1,000,000 or higher is used, and therefore a microporous membrane is obtained with relatively easier transfer of core irregularities. The weight-average molecular weight of the entire polyolefin microporous membrane composing the separator is preferably 100,000 to 2,000,000 and more preferably 150,000 to 1,500,000.

(Polyolefin with One or More Types of Functional Groups)

From the viewpoint of formation of a crosslinked structure, redox degradation resistance and obtaining a compact, homogeneous porous body structure, the separator preferably comprises a functional group-modified polyolefin or a polyolefin in which monomers with functional groups are copolymerized, as the polyolefin with one or more types of functional groups. As used herein, a "functional group-modified polyolefin" is a compound in which the functional groups are bonded after production of the polyolefin. The functional groups may be bonded to the polyolefin backbone or they may be ones that can be introduced into a comonomer, and preferably they contribute to selective crosslinking of the amorphous portion of the polyolefin, with examples including one or more selected from the group consisting of carboxyl, hydroxyl, carbonyl, polymerizable unsaturated hydrocarbon, isocyanate, epoxy, silanol, hydrazide, carbodiimide, oxazoline, acetoacetyl, aziridine, ester, active ester, carbonate, azide, straight-chain or cyclic heteroatom-containing hydrocarbon, amino, sulfhydryl, metal chelating and halogen-containing groups.

From the viewpoint of the separator strength, ion permeability, redox degradation resistance and compact and homogeneous porous body structure, the separator preferably comprises both a polyolefin with one or more types of functional groups and a silane-unmodified polyethylene. When a polyolefin with one or more types of functional groups and a silane-unmodified polyethylene are combined, preferably the weight ratio of the polyolefin with one or more types of functional groups and the silane-unmodified polyethylene in the separator (weight of polyolefin with one or more types of functional groups/weight of silane-unmodified polyethylene) is 0.05/0.95 to 0.80/0.20.

(Crosslinked Structure)

The crosslinked structure of the separator contributes to achieving both a shutdown function and high-temperature membrane rupture for the separator and to safety of the electricity storage device, and preferably it is formed in the amorphous portion of the polyolefin of the separator. The crosslinked structure can be formed by reaction via covalent bonding, hydrogen bonding or coordination bonding, for example. The reaction by covalent bonding is preferably one or more selected from the group consisting of the following reactions (I) to (IV):

(I) condensation reaction of a plurality of the same functional groups (II) reaction between a plurality of different functional groups (III) chain condensation reaction between a functional group and the electrolyte solution (IV) chain condensation reaction between a functional group and an additive.

The reaction by coordination bonding is preferably the following reaction (V):

(V) reaction in which a plurality of the same functional groups crosslink by coordination bonding with eluting metal ions.

Reaction (I)

A schematic scheme and specific example of reaction (I) is shown below, with the first functional group of the separator represented as A.

[Chemical Formula 20]

Schematic scheme for reaction (I)

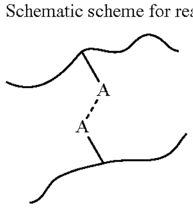

Example of functional group A:
Silanol group, etc.

Specific example of reaction (I)

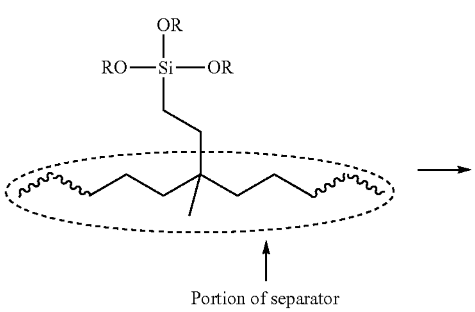

-continued

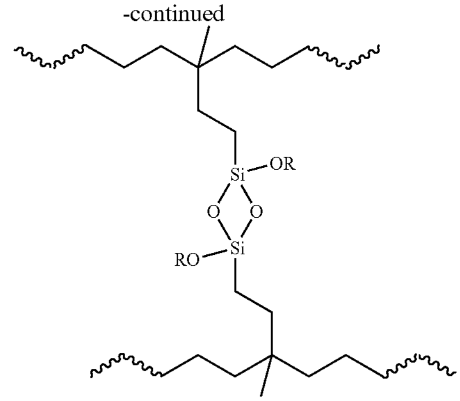

{In the formula, R is an optionally a substituted alkyl group or hetero alkyl group of 1 to 20 carbon atoms.}

When functional group A for reaction (I) is a silanol group, the polyolefin in the separator is preferably silane graft-modified. A silane graft-modified polyolefin is composed with a structure having a polyolefin as the main chain and alkoxysilyl groups grafted onto the main chain. The alkoxide substituted on the alkoxysilyl group may be methoxide, ethoxide or butoxide, for example. For example, R in the formula may be methyl, ethyl, n-propyl, isopropyl, n-butyl, sec-butyl, isobutyl or tert-butyl. The main chain and grafts may be linked by covalent bonding, for an alkyl, ether, glycol or ester structure. In consideration of the production process for the separator of this embodiment, the silane graft-modified polyolefin preferably has a silicon-to-carbon ratio (Si/C) of 0.2 to 1.8% and more preferably 0.5 to 1.7%, at the stage before the crosslinking step.

A preferred silane graft-modified polyolefin is one with a density of 0.90 to 0.96 g/cm$^3$ and a melt mass flow rate (MFR) of 0.2 to 5 g/min at 190° C. From the viewpoint of inhibiting generation of resin aggregates during the production process for the separator, and maintaining silane crosslinkability until contact with the electrolyte solution, the silane graft-modified polyolefin is preferably not a master batch resin containing a dehydrating condensation catalyst. Dehydrating condensation catalysts are also known to function as catalysts for siloxane bond-forming reactions with alkoxysilyl group-containing resins. The term "master batch resin" will be used herein to refer to a compounded product obtained by pre-adding a dehydrating condensation catalyst (for example, an organometallic catalyst) to an alkoxysilyl group-containing resin or other kneading resin in a continuous process of kneading a resin using an extruder.

Reaction (II)

A schematic scheme and specific example of reaction (II) is shown below, with the first functional group of the separator represented as A and the second functional group represented as B.

[Chemical Formula 21]

Schematic scheme for reaction (II)

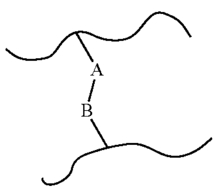

[Chemical Formula 22]

Examples for combination of functional groups A and B:
Hydroxyl group and carboxyl group (esterification);
Carbonyl group and alkyl group (aldol condensation);
Halogen and carboxyl group (intramolecular condensation);
Alkoxy group and alkyl group (Claisen reaction);
Carbonyl group and acid anhydride group (Perkin reaction);
Amino group and halogen;
Isocyanate group and hydroxyl group (formation of urethane bonds); and

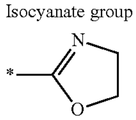

(oxazoline) and hydroxy group, etc.

[Chemical Formula 23]

Specific example 1 of reaction (II):

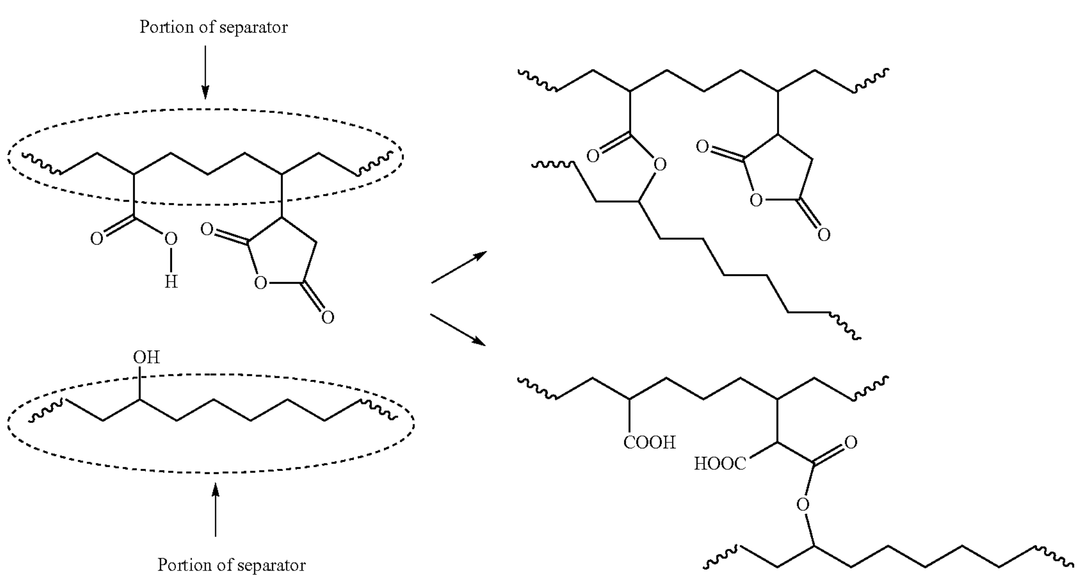

-continued

[Chemical Formula 24]

Specific example 2 of reaction (II):

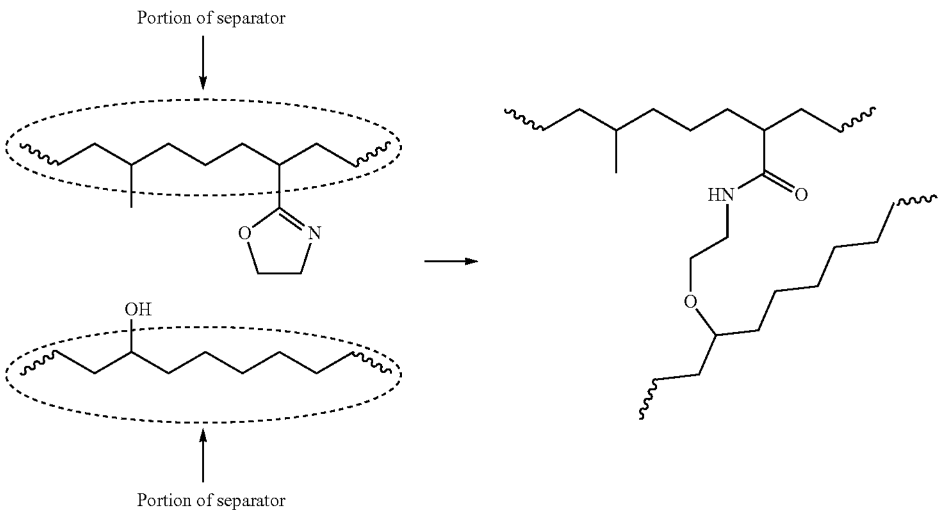

Reaction (I) and reaction (II) are subject to catalytic action, and for example, they can be catalytically accelerated by a chemical substance inside the electricity storage device in which the separator is incorporated. The chemical substance may be, for example, an electrolyte, electrolyte solution, electrode active material or additive contained in the electricity storage device, or a decomposition product thereof.

Reaction (III)

A schematic scheme and specific example of reaction (III) is shown below, with the first functional group of the separator represented as A, and the electrolyte solution represented as Sol.

[Chemical Formula 25]

Schematic scheme for reaction (III)

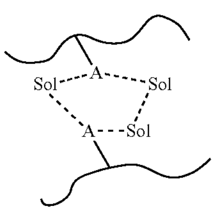

[Chemical Formula 26]

Examples for functional groups A:
Hydroxyl carboxyl, amino, carbonyl, ether and isocyanate groups, etc.

Examples for electrolyte solution:
Electrolytes: $LiPG_6$, $LiBF_4$, $LiN(SO_2CF_3)_2$, $LiSO_3CF_3$, $LiBC_4O_8$ (LiBOB), etc.
Nonaqueous solvents: ethylene carbonate, ethylmethyl carbonate and their mixtures, etc.

-continued

[Chemical Formula 27]

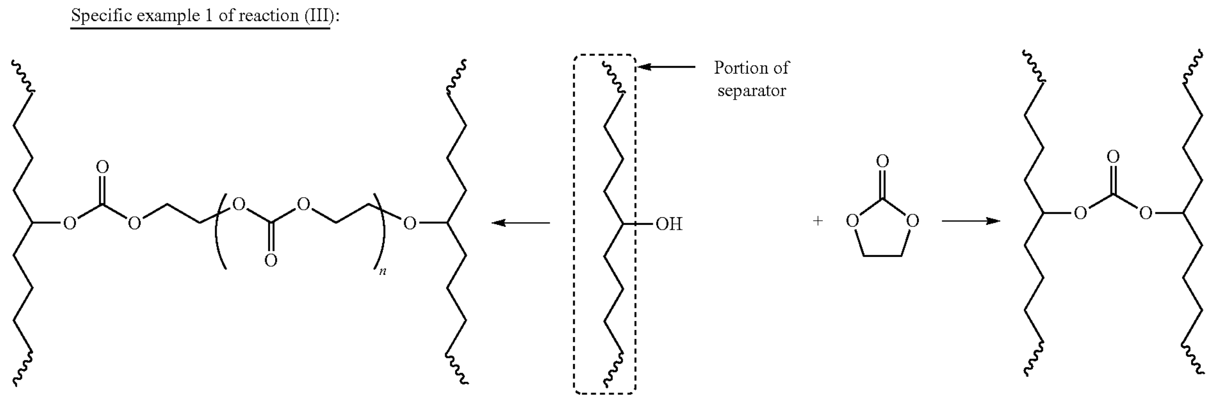

[Chemical Formula 28]

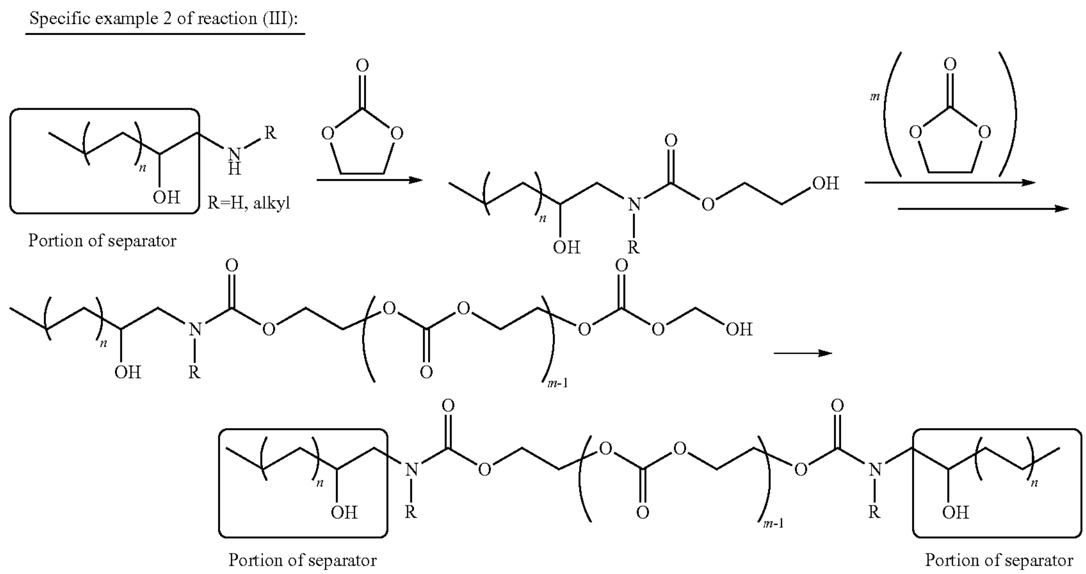

Reaction (IV)

A schematic scheme for reaction (IV) is shown below, with the first functional group of the separator represented as A, the optionally incorporated second functional group as B and an additive as Add.

[Chemical Formula 29]

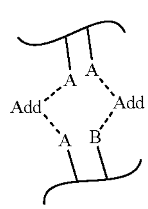

From the viewpoint of forming the covalent bonds represented by the dotted lines in the scheme, reaction (IV) is preferably nucleophilic substitution reaction, nucleophilic addition reaction or ring-opening reaction between the compound Rx composing the separator and the compound Ry composing the additive (Add). Compound Rx may be the polyolefin in the separator, such as polyethylene or polypropylene, and preferably the polyolefin is modified with a functional group x, i.e. modified with one or more selected from the group consisting of —OH, $—NH_2$, —NH—, —COOH and —SH, for example.

Since multiple compounds Rx are crosslinked by compound Ry as the additive, compound Ry preferably has two or more linking reaction units ($y_1$). The multiple linking reaction units $y_1$ may be any groups with any structure so long as they are able to participate in nucleophilic substitution reaction, nucleophilic addition reaction or ring-opening reaction with the functional group x of compound Rx, and they may be substituted or unsubstituted, may contain heteroatoms or inorganic materials, and may be the same or different from each other. When compound Ry has a straight-chain structure, the multiple linking reaction units ($y_1$) may each independently be end groups or groups incorporated into the main chain, or side chain or pendant groups.

When reaction (IV) is nucleophilic substitution reaction it may be as follows, considering the functional group x of compound Rx to be the nucleophilic group and the linking reaction unit $y_1$ of compound Ry to be the leaving group, but this is only an example, and for the purpose of this embodiment the functional group x and linking reaction unit $y_1$ may both be leaving groups, depending on their nucleophilicity.

From the viewpoint of the nucleophilic reagent, the functional group x of compound Rx is preferably an oxygen-based nucleophilic group, nitrogen-based nucleophilic group or sulfur-based nucleophilic group. Oxygen-based nucleophilic groups include hydroxyl, alkoxy, ether and carboxyl groups, of which —OH and —COOH are preferred. Nitrogen-based nucleophilic groups include ammonium groups, primary amino groups and secondary amino groups, of which $—NH_2$ and —NH— are preferred. Sulfur-based nucleophilic groups include —SH and thioether groups, for example, with —SH being preferred.

When reaction (IV) is nucleophilic substitution reaction, from the viewpoint of the leaving group, the linking reaction unit $y_1$ of compound Ry is preferably an alkylsulfonyl group such as $CH_3SO_2$— or $CH_3CH_2SO_2$—; an arylsulfonyl group $(—ArSO_2—)$; a haloalkylsulfonyl group such as $CF_3SO_2$— or $CCl_3SO_2$—; an alkyl sulfonate group such as $CH_3SO_3^-$— or $CH_3CH_2SO_3^-$—; an aryl sulfonate group $(ArSO_3^-—)$; a haloalkyl sulfonate group such as $CF_3SO_3^-$— or $CCl_3SO_3^-$—; or a heterocyclic group, any of which may be used alone or in combinations of two or more different ones. Heteroatoms in a heterocyclic ring include nitrogen atoms, oxygen atoms and sulfur atoms, with nitrogen atoms being preferred from the viewpoint of dissociability. The leaving group containing a nitrogen atom in the heterocyclic ring is preferably a monovalent group represented by one of the following formulas ($y_1$-1) to ($y_1$-6).

[Chemical Formula 30]

($y_1$-1)

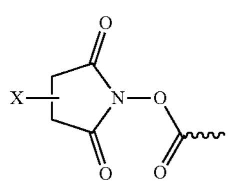

{where X is hydrogen or a monovalent substituent.}

[Chemical Formula 31]

($y_1$-2)

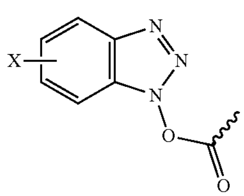

{where X is hydrogen or a monovalent substituent.}

[Chemical Formula 32]

($y_1$-3)

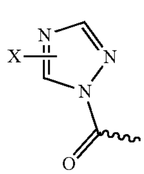

{where X is hydrogen or a monovalent substituent.}

[Chemical Formula 33]

($y_1$-4)

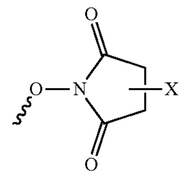

{where X is hydrogen or a monovalent substituent.}

[Chemical Formula 34]

($y_1$-5)

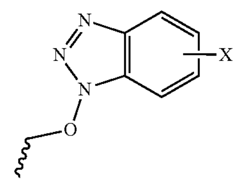

{where X is hydrogen or a monovalent substituent.}

[Chemical Formula 35]

($y_1$-6)

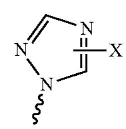

{where X is hydrogen or a monovalent substituent.}

In formulas ($y_1$-1) to ($y_1$-6), X is hydrogen or a monovalent substituent. Examples of monovalent substituents include alkyl groups, haloalkyl groups, alkoxyl groups and halogen atoms.

When reaction (IV) is nucleophilic substitution reaction and compound Ry has a straight-chain structure, compound Ry preferably has, as a straight-chain unit $y_2$ in addition to the linking reaction unit $y_1$, one or more selected from the group consisting of divalent groups represented by the following formulas ($y_2$-1) to ($y_2$-6).

[Chemical Formula 36]

($y_2$-1)

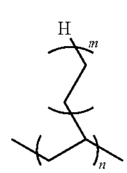

{where m is an integer of 0 to 20, and n is an integer of 1 to 20.}

[Chemical Formula 37]

(y2-2)

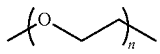

{where n is an integer of 1 to 20.}

[Chemical Formula 38]

(y2-3)

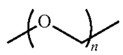

{where n is an integer of 1 to 20.}

[Chemical Formula 39]

(y2-4)

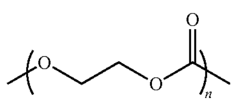

{where n is an integer of 1 to 20.}

[Chemical Formula 40]

(y2-5)

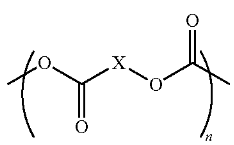

{where X is an alkylene or arylene group of 1 to 20 carbon atoms, and n is an integer of 1 to 20.}

[Chemical Formula 41]

(y2-6)

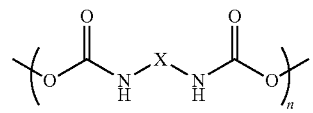

{where X is an alkylene or arylene group of 1 to 20 carbon atoms, and n is an integer of 1 to 20}. When compound Ry contains multiple straight-chain units $y_2$, they may be the same or different, and their sequences may be either block or random.

In formula ($y_2$-1), m is an integer of 0 to 20, and from the viewpoint of the crosslinked network it is preferably 1 to 18. In formulas ($y_2$-1) to ($y_2$-6), n is an integer of 1 to 20, and from the viewpoint of the crosslinked network it is preferably 2 to 19 or 3 to 16. In formula ($y_2$-5) to ($y_2$-6), X is an alkylene or arylene group of 1 to 20 carbon atoms, and from the viewpoint of stability of the straight-chain structure it is preferably a methylene, ethylene, n-propylene, n-butylene, n-hexylene, n-heptylene, n-octylene, n-dodecylene, o-phenylene, m-phenylene or p-phenylene group.

Tables 2 to 4 below show preferred combinations for the functional group x of compound Rx and the linking reaction unit $y_1$ and straight-chain unit $y_2$ of compound Ry, when reaction (IV) is nucleophilic substitution reaction.

TABLE 2

| Nucleophilic substitution reaction (preferred combination I) | | |
|---|---|---|
| Separator functional group | Additive (compound Ry) | |
| (functional group x of compound Rx) | Straight-chain unit (y2) | Two or more linking reaction units (y1) Both terminals |
| —OH<br>—NH$_2$<br>—NH—<br>—COOH<br>—SH | 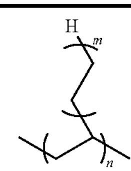<br>n = 1 to 20<br>m = 0 to 20 | 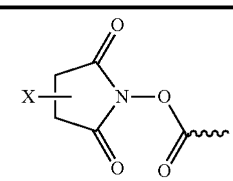<br>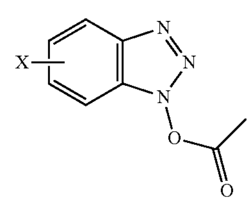<br>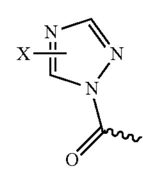<br>X = H or monovalent substituent |

TABLE 3

| Nucleophilic substitution reaction (preferred combination II) | | |
|---|---|---|
| Separator functional group | Additive (compound Ry) | |
| (functional group x of compound Rx) | Straight-chain unit (y2) | Two or more linking reaction units (y1) Both terminals |
| —OH<br>—$NH_2$<br>—NH—<br>—COOH<br>—SH | 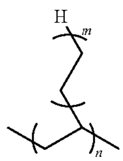<br>n = 1 to 20<br>m = 0 to 20 | $CF_3SO_2$—<br>$CH_3SO_2$—<br>$ArSO_2$—<br>$CF_3SO_3^-$—<br>$CH_3SO_3^-$—<br>$ArSO_3^-$— |

TABLE 4

| Nucleophilic substitution reaction (preferred combination III) | | | |
|---|---|---|---|
| Separator functional group | Additive (compound Ry) | | |
| (functional group x of | | Two or more linking reaction units (y1) | |
| compound Rx) | Straight-chain unit (y2) | Terminal 1 | Terminal 2 |
| —OH<br>—$NH_2$<br>—NH—<br>—COOH<br>—SH | 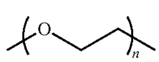<br>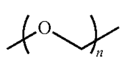<br>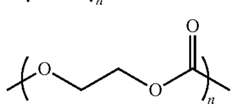<br>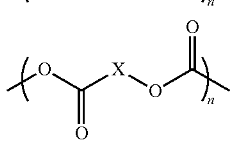<br>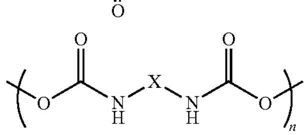<br>n = 1-20,<br>X = $C_{1-20}$ alkylene or arylene group | 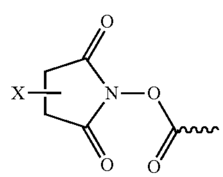<br>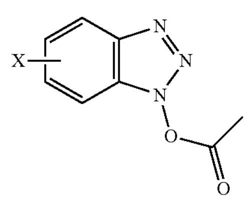<br>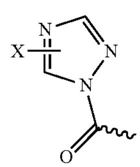<br>X = H or monovalent substituent | 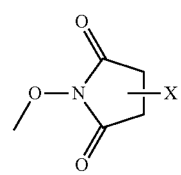<br>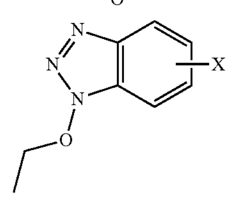<br>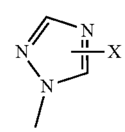<br>X = H or monovalent substituent |

The following is a reaction scheme as Specific Example 1 of the nucleophilic substitution reaction, where the functional group x of the polyolefin is —$NH_2$, the linking reaction unit $y_1$ of the additive (compound Ry) is the backbone of a succinimide, and the straight-chain unit ($y_2$) is $(O—C_2H_5)_n$.

[Chemical Formula 42]
Specific example 1:
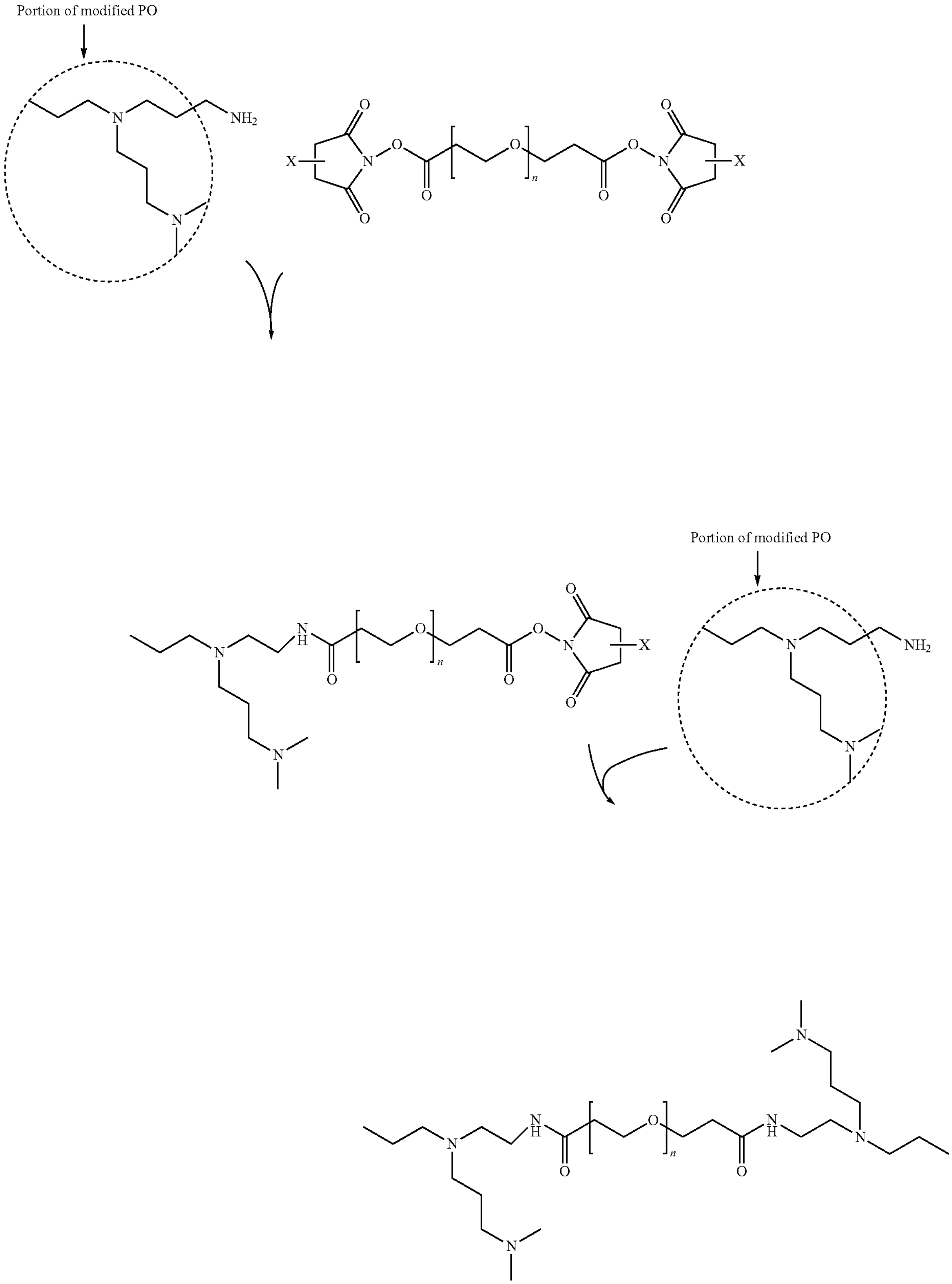

The following is a reaction scheme as Specific Example 2 of the nucleophilic substitution reaction, where the functional groups x of the polyolefin are —SH and —$NH_2$, the linking reaction unit $y_1$ of the additive (compound Ry) is a nitrogen-containing cyclic backbone, and the straight-chain unit $y_2$ is o-phenylene.

[Chemical Formula 43]

Specific example 2:

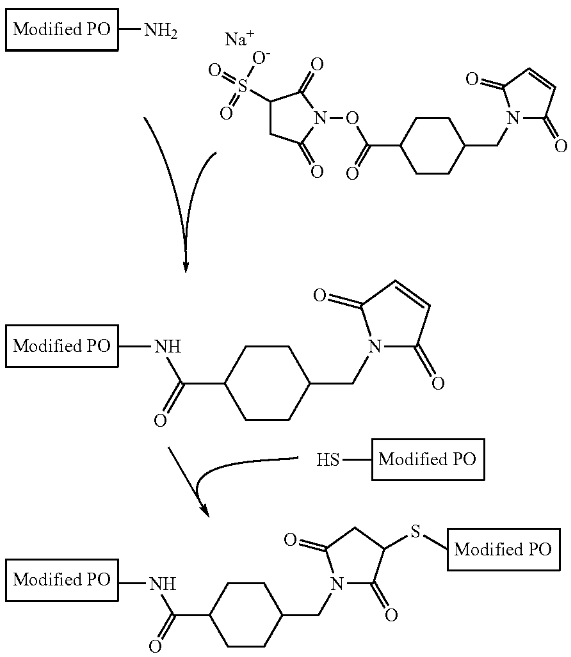

When reaction (IV) is nucleophilic addition reaction, the functional group x of compound Rx and the linking reaction unit $y_1$ of compound Ry may participate in addition reaction. For nucleophilic addition reaction, the functional group x of compound Rx is preferably an oxygen-based nucleophilic group, nitrogen-based nucleophilic group or sulfur-based nucleophilic group. Oxygen-based nucleophilic groups include hydroxyl, alkoxy, ether and carboxyl groups, of which —OH and —COOH are preferred. Nitrogen-based nucleophilic groups include ammonium groups, primary amino groups and secondary amino groups, of which —$NH_2$ and —NH— are preferred. Sulfur-based nucleophilic groups include —SH and thioether groups, for example, with —SH being preferred.

In nucleophilic addition reaction, from the viewpoint of addition reactivity and ready availability of starting materials, the linking reaction unit $y_1$ of compound Ry is preferably one or more selected from the group consisting of groups represented by the following formulas ($Ay_1$-1) to ($Ay_1$-6).

[Chemical Formula 44]

($Ay_1$-1)

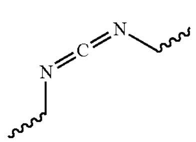

-continued

[Chemical Formula 45]

($Ay_1$-2)

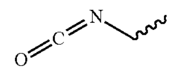

[Chemical Formula 46]

($Ay_1$-3)

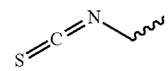

[Chemical Formula 47]

($Ay_1$-4)

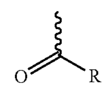

{where R is hydrogen or a monovalent organic group.}

[Chemical Formula 48]

($Ay_1$-5)

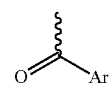

[Chemical Formula 49]

($Ay_1$-6)

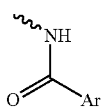

In formula ($Ay_1$-4), R is a hydrogen atom or a monovalent organic group, preferably a hydrogen atom or a $C_{1-20}$ alkyl, alicyclic or aromatic group, and more preferably a hydrogen atom or a methyl, ethyl, cyclohexyl or phenyl group.

Tables 5 and 6 below show preferred combinations for the functional group x of compound Rx and the linking reaction unit $y_1$ of compound Ry, when reaction (IV) is nucleophilic addition reaction.

TABLE 5

| Nucleophilic addition reaction (preferred combination I) | |
|---|---|
| Separator functional group (functional group x of compound Rx) | Additive (compound Ry) Two or more linking reaction units (y1) |
| —OH<br>—$NH_2$<br>—NH—<br>—COOH<br>—SH | 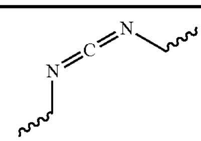<br>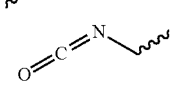<br>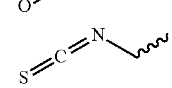 |

TABLE 6

| Nucleophilic addition reaction (preferred combination II) | |
|---|---|
| Separator functional group (functional group x of compound Rx) | Additive (compound Ry) Two or more linking reaction units (y1) |
| —OH<br>—$NH_2$<br>—NH—<br>—COOH<br>—SH | 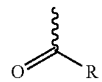<br>R = H or monovalent organic group |
| | 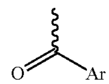 |
| | 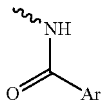 |

The following is a reaction scheme as a specific example of the nucleophilic addition reaction, where the functional group x of the separator is —OH and the linking reaction unit $y_1$ of the additive (compound Ry) is —NCO.

[Chemical Formula 50]

Specific example:

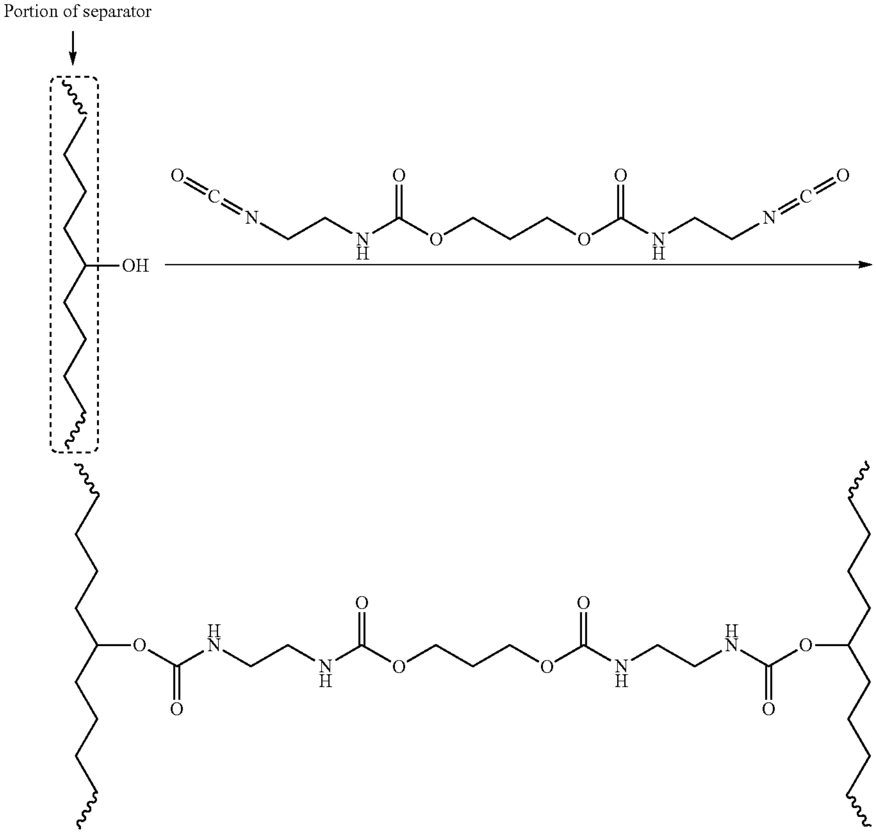

When reaction (IV) is ring-opening reaction, the functional group x of compound Rx and the linking reaction unit $y_1$ of compound Ry may participate in ring-opening reaction, and from the viewpoint of ready availability of starting materials it is preferred to open the cyclic structure on the linking reaction unit $y_1$ side. From the same viewpoint, the linking reaction unit $y_1$ is more preferably an epoxy group, even more preferably compound Ry has two or more epoxy groups, and yet more preferably it is a diepoxy compound.

When reaction (IV) is ring-opening reaction, the functional group x of compound Rx is preferably one or more selected from the group consisting of —OH, —$NH_2$, —NH—, —COOH and —SH, and/or the linking reaction unit $y_1$ of compound Ry is preferably two or more groups represented by the following formula ($ROy_1$-1).

[Chemical Formula 51]

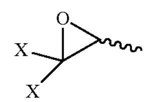

($ROy_1$-1)

{where the multiple X groups are each independently a hydrogen atom or a monovalent substituent}. In formula ($ROy_1$-1), the multiple X groups are each independently a hydrogen atom or a monovalent substituent, preferably a hydrogen atom or a $C_{1-20}$ alkyl, alicyclic or aromatic group, and more preferably a hydrogen atom or a methyl, ethyl, cyclohexyl or phenyl group. Table 7 below shows preferred combinations for the functional group x of compound Rx and the linking reaction unit $y_1$ of compound Ry, for epoxy ring-opening reaction.

TABLE 7

| Epoxy ring-opening reaction (preferred combination) | |
|---|---|
| | Additive (compound Ry) Two or more linking reaction units (y1) |
| —OH<br>—NH$_2$<br>—NH—<br>—COOH<br>—SH | 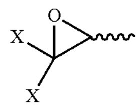 X = H or monovalent substituent |

Reaction (V)

A schematic scheme for reaction (V) and an example of functional group A are shown below, with the first functional group of the separator represented as A and the metal ion represented as $M^{n+}$.

[Chemical Formula 52]

Schematic scheme for reaction (V)

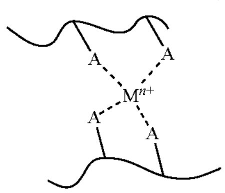

Examples for functional group A: —CHO, —COOH, acid anhydride, —COO⁻, etc,

In this scheme, the metal ion $M^{n+}$ is preferably one eluted from the electricity storage device (hereunder also referred to as "eluting metal ion"), and it may be one or more selected from the group consisting of $Zn^{2+}$, $Mn^{2+}$, $Co^{3+}$, $Ni^{2+}$ and $Li^+$, for example. The following is an example of coordination bonding when functional group A is —COO⁻.

[Chemical Formula 53]

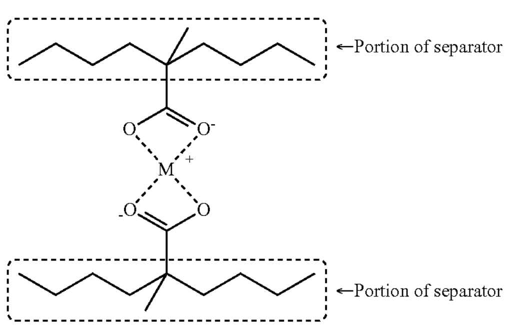

M = $ZN^{2+}$, $Mn^{2+}$, $Co^{3+}$, $Ni^{2+}$, $Li^+$

A specific scheme for reaction (V) is shown below, where functional group A is —COOH and the eluting metal ion is $Zn^{2+}$.

[Chemical Formula 54]

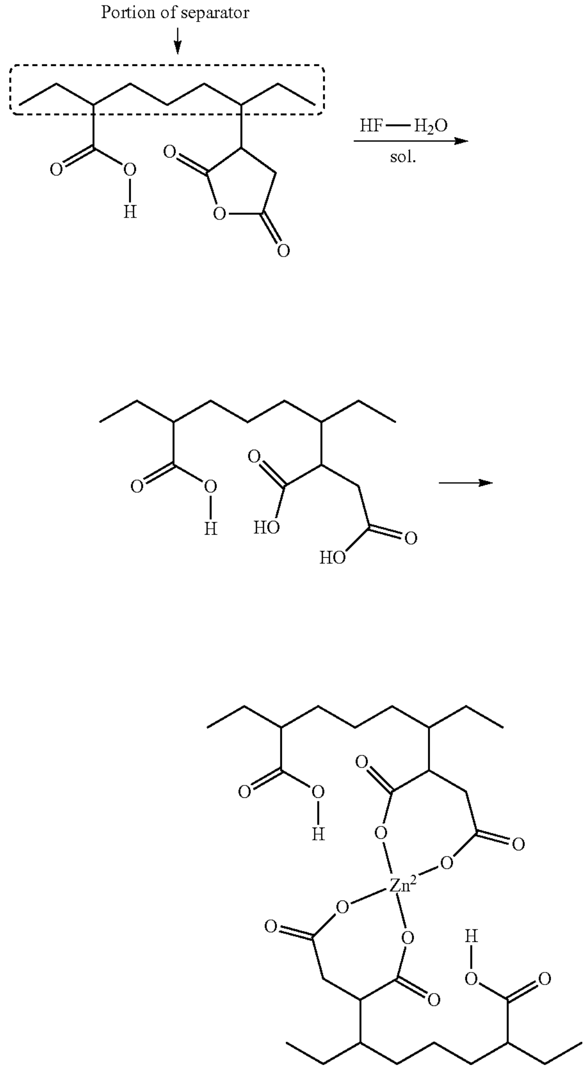

In this scheme, the hydrofluoric acid (HF) may be derived from the electrolytes, electrolyte solution, electrode active materials and additives, or their decomposition products or water-absorbed products, that are present in the electricity storage device, depending on the charge-discharge cycle of the electricity storage device.

<Silane-Modified Polyolefin>

The silane-modified polyolefin has a structure with a polyolefin as the main chain and alkoxysilyl groups grafted onto the main chain. The silane-modified polyolefin can be obtained by grafting alkoxysilyl groups onto the main chain of a non-silane-modified polyolefin.

It is presumed that the alkoxysilyl groups are converted to silanol groups by water hydrolysis, and undergo crosslinking reaction to form siloxane bonds (with any proportion among structure T1, structure T2 and structure T3 in the following formula). Alkoxides substituting on the alkoxysilyl groups may be methoxide, ethoxide or butoxide. In the following formula, R may be methyl, ethyl, n-propyl, isopropyl, n-butyl, sec-butyl, isobutyl or tert-butyl.

[Chemical Formula 55]

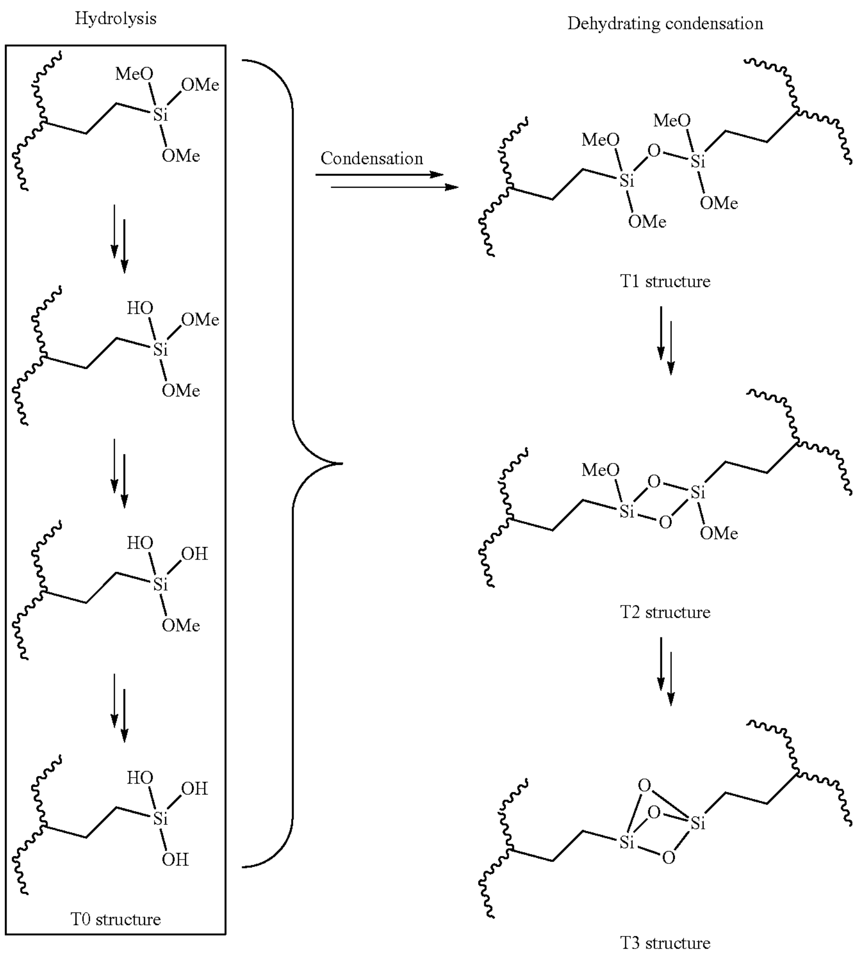

The main chain and grafts are linked by covalent bonding. The structure of the covalent bonding may be an alkyl, ether, glycol or ester structure. At the stage before the crosslinking reaction, the silane-modified polyolefin has a modification degree of no greater than 2% of silanol units with respect to the main chain ethylene units.

A preferred silane graft-modified polyolefin is one with a density of 0.90 to 0.96 g/cm$^3$ and a melt mass flow rate (MFR) of 0.2 to 5 g/min at 190° C.

From the viewpoint of satisfactorily exhibiting the effect of the invention, the amount of silane-modified polyolefin is preferably 0.5 weight % or greater or 3 weight % or greater, more preferably 4 weight % or greater, and even more preferably 5 weight % or greater or 6 weight % or greater, based on the total weight of the microporous membrane or layer A. From the viewpoint of cycle properties and safety of the electricity storage device, the amount of silane-modified polyolefin is preferably no greater than 40 weight % and more preferably no greater than 38 weight %, based on the total weight of the microporous membrane. The amount of silane-modified polyolefin may be 30 weight % or greater or 50 weight % or greater, or even 100 weight %, based on the total weight of layer A.

The crosslinked structure of the microporous membrane or layer A is preferably formed by compounds generated inside the electricity storage device.

That is, the crosslinked structure of the microporous membrane or layer A is preferably a crosslinked structure with oligosiloxane bonds formed by utilizing swelling of the microporous membrane or layer A and/or compounds generated inside the electricity storage device when the separator is contacted with the nonaqueous electrolyte solution during the production process for the electricity storage device. The crosslinked structure in this case is a crosslinked structure obtained not by active promotion of the crosslinking reaction during the production process for the separator, but rather by active promotion of the crosslinking reaction during the production process for the electricity storage device, and therefore the self-crosslinking property of the separator can be maintained until it is housed in the electricity storage device.

From the viewpoint of inhibiting generation of resin aggregates during the production process for the separator, and maintaining silane crosslinkability until contact with the electrolyte solution, the silane-modified polyolefin is preferably not a master batch resin containing a dehydrating condensation catalyst. Dehydrating condensation catalysts are also known to function as catalysts for siloxane bond-forming reactions with alkoxysilyl group-containing resins. Throughout the present specification, the term "master batch resin" will be used to refer to a compounded product obtained by pre-adding a dehydrating condensation catalyst (for example, an organometallic catalyst) to an alkoxysilyl group-containing resin or other kneading resin in a continuous process with a step of kneading a resin using an extruder.

(Polyethylene)

Throughout the present specification, the polyethylene that can be further included in addition to the silane-modified polyolefin (the polyethylene further included in the microporous membrane or layer A as a polyolefin different from the silane-modified polyolefin) is polyethylene that is a homoethylene polymer or an alkane unit-containing copolymer with a weight-average molecular weight of 100,000 to 10,000,000.

When the microporous membrane or layer A further includes polyethylene as a polyolefin different from the silane-modified polyolefin, its content is preferably 20 weight % or greater, more preferably 40 weight % or greater and even more preferably 50 weight % or greater, based on the total amount of the silane-modified polyolefin and polyethylene. If the polyethylene content is 20 weight % or greater it will tend to be easier to ensure degradation resistance against oxidation-reduction, and a compact, homogeneous porous body structure can be ensured.

The polyethylene content is also preferably no greater than 97 weight %, more preferably no greater than 96 weight % and even more preferably no greater than 95 weight %. If the polyethylene content is no greater than 97 weight % it will be possible to ensure the content of the silane-modified polyolefin in the microporous membrane or layer A.

(Detection Method for Silane-Modified Polyolefin in Separator)

When the silane-modified polyolefin in the separator is in a crosslinked state it is insoluble or has insufficient solubility in organic solvents, and it is therefore difficult to directly measure the silane-modified polyolefin content from the separator. In such cases, as pretreatment for the sample, methyl orthoformate which does not undergo secondary reactions may be used to decompose the siloxane bonds to methoxysilanol, and then solution NMR measurement may be carried out to detect the silane-modified polyolefin in the separator. The pretreatment experiment may be carried out with reference to Japanese Patent Publication No. 3529854 and Japanese Patent Publication No. 3529858.

Specifically, $^{1}$H or $^{13}$C NMR identification of the silane-modified polyolefin as the starting material used for production of the separator may be employed in the detection method for the silane-modified polyolefin in the separator. The following are examples of $^{1}$H- and $^{13}$C-NMR measurement methods.

($^{1}$H-NMR Measurement)

The sample is dissolved in o-dichlorobenzene-d4 at 140° C. and a 1H-NMR spectrum is obtained at a proton resonance frequency of 600 MHz. The $^{1}$H-NMR measuring conditions are as follows.

Apparatus: AVANCE NEO 600 by Bruker
Sample tube diameter: 5 mmφ
Solvent: o-Dichlorobenzene-d4
Measuring temperature: 130° C.
Pulse angle: 30°
Pulse delay time: 1 sec
Number of scans: ≥1000
Sample concentration: 1 wt/vol %

($^{13}$C-NMR Measurement)

The sample is dissolved in o-dichlorobenzene-d4 at 140° C. and a $^{13}$C-NMR spectrum is obtained. The $^{13}$C-NMR measuring conditions are as follows.

Apparatus: AVANCE NEO 600 by Bruker
Sample tube diameter: 5 mmφ
Solvent: o-Dichlorobenzene-d4
Measuring temperature: 130° C.
Pulse angle: 30°
Pulse delay time: 5 sec
Number of scans: ≥10,000
Sample concentration: 10 wt/vol %

Figure 11:
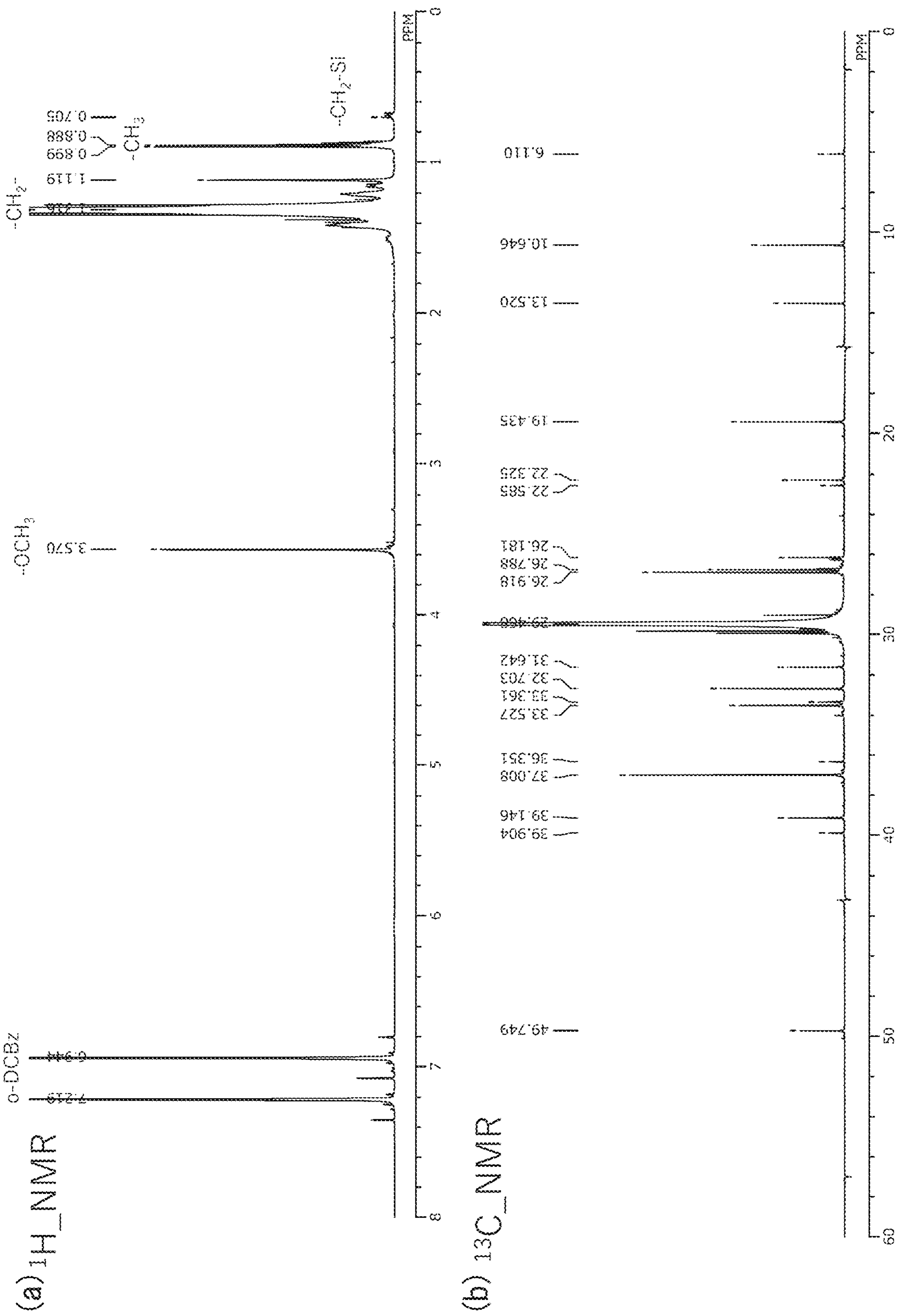
FIG. 11 is a $^{1}$H-NMR chart (a) and $^{13}$C-NMR chart (b) for silane-modified polyolefin starting material 1 obtained using a polyolefin.
Figure 12:
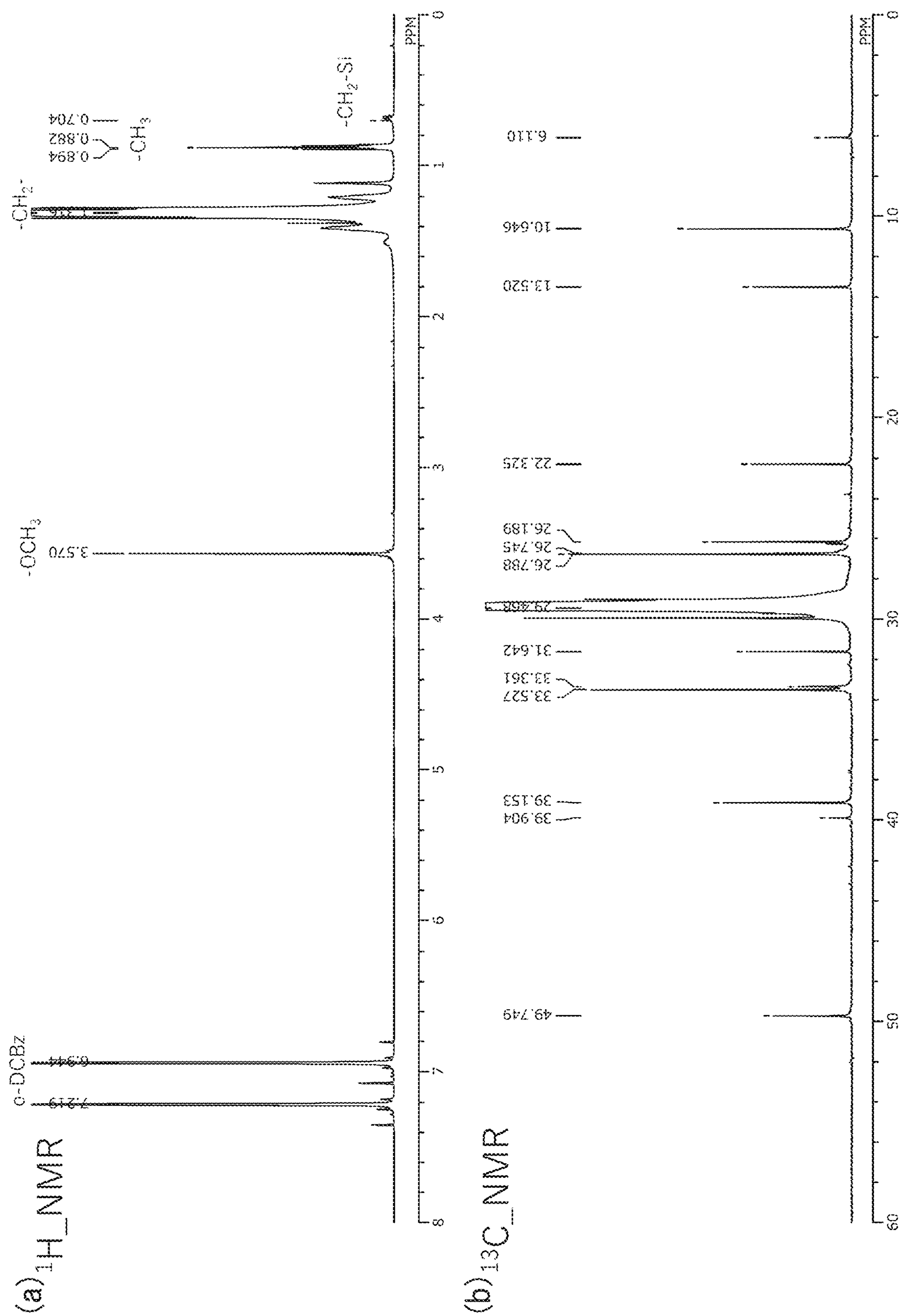
FIG. 12 is a $^{1}$H-NMR chart (a) and $^{13}$C-NMR chart (b) for silane-modified polyolefin starting material 2 obtained using a polyolefin.

FIGS. 11 and 12 are $^{1}$H and $^{13}$C-NMR charts for silane-modified polyolefin starting materials 1 and 2 using two types of polyolefins, where starting materials 1 and 2 each have a different melt index (MI), $C_3$ graft amount, $C_4$ graft amount and/or silanol-modified amount.

The $^{1}$H- and $^{13}$C-NMR measuring conditions for FIG. 11 are as follows.

($^{1}$H-NMR Measuring Conditions)

Apparatus: Bruker Avance NEO 600
Observation nucleus: $^{1}$H
Observation frequency: 600 MHz
Pulse program: zg30
Pulse delay time: 1 sec
Number of scans: 1024
Measuring temperature: 130° C.
Chemical shift reference: 7.219 ppm (o-DCBz)
Solvent: o-Dichlorobenzene-d4
Sample concentration: 1 wt/vol %
Sample tube: 5 mmφ

($^{13}$C-NMR Measuring Conditions)

Apparatus: Bruker Avance NEO 600
Observation nucleus: $^{13}$C
Observation frequency: 150.91 MHz
Pulse program: zgpg30
Pulse delay time: 5 sec
Number of scans: 24,000 or 12,800
Measuring temperature: 130° C.
Chemical shift reference: 132.39 ppm (o-DCBz)
Solvent: o-Dichlorobenzene-d4
Sample concentration: 10 wt/vol %
Sample tube: 5 mmφ

The $^{1}$H and $^{13}$C-NMR measuring conditions for FIG. 12 are as follows.

($^{1}$H-NMR Measuring Conditions)

Apparatus: Bruker Avance NEO 600
Observation nucleus: $^{1}$H
Observation frequency: 600 MHz
Pulse program: zg30
Pulse delay time: 1 sec
Number of scans: 1024
Measuring temperature: 130° C.
Chemical shift reference: 7.219 ppm (o-DCBz)
Solvent: o-Dichlorobenzene-d4
Sample concentration: 1 wt/vol %
Sample tube: 5=mmφ

($^{13}$C-NMR Measuring Conditions)

Apparatus: Bruker Avance NEO 600
Observation nucleus: $^{13}$C
Observation frequency: 150.91 MHz
Pulse program: zgpg30
Pulse delay time: 5 sec
Number of scans: 12,800
Measuring temperature: 130° C.
Chemical shift reference: 132.39 ppm (o-DCBz)
Solvent: o-Dichlorobenzene-d4
Sample concentration: 10 wt/vol %
Sample tube: 5 mmφ

Figure 13:
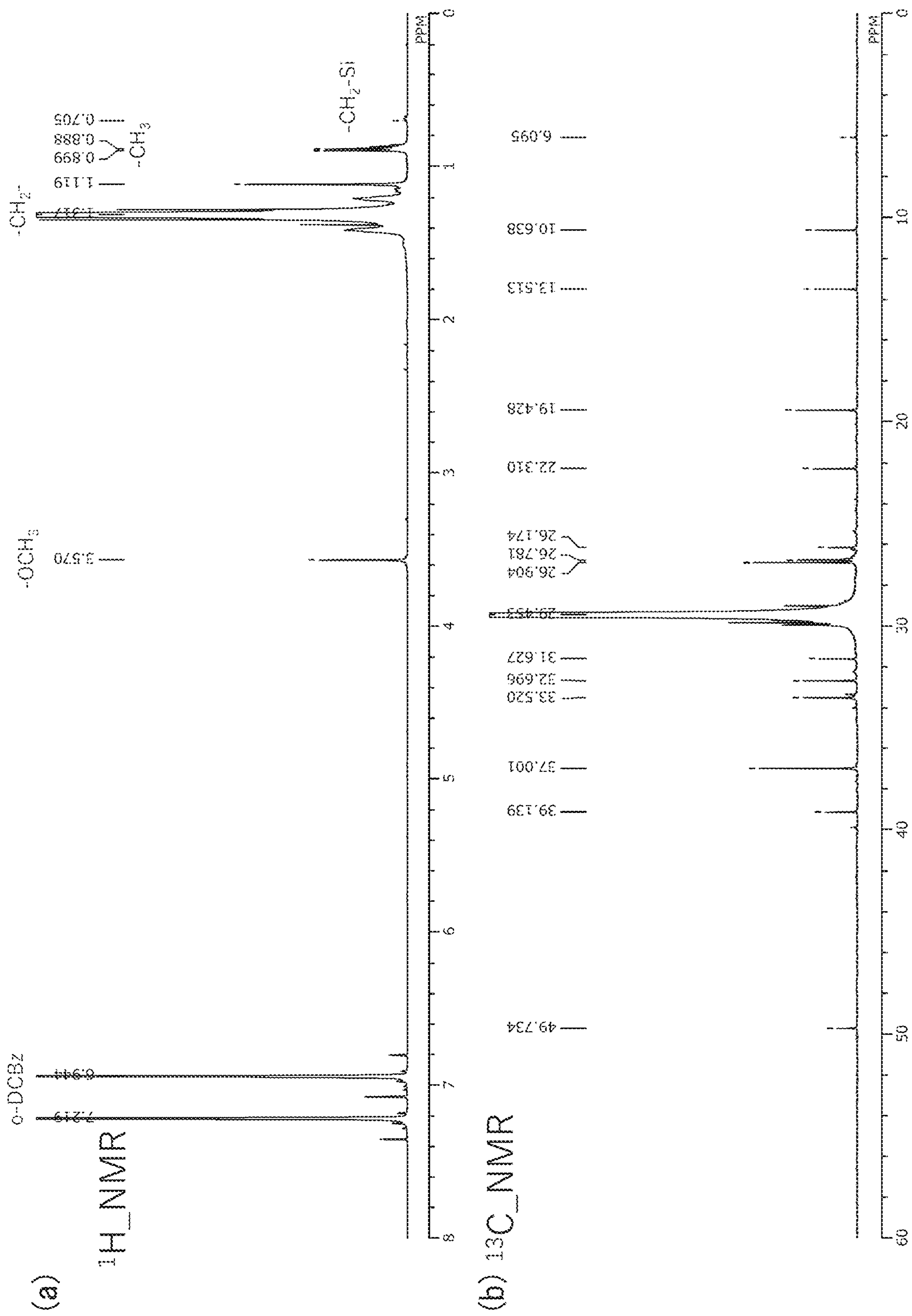
FIG. 13 is a $^{1}$H-NMR chart (a) and $^{13}$C-NMR chart (b) for the separator obtained in Example I-1, in the state before crosslinking.

FIG. 13 is a $^{1}$H- and $^{13}$C-NMR chart of the separator fabricated using silane-modified polyolefin starting material 1 shown in FIG. 11, in the state before crosslinking, for Example I-1 described below. The $^{1}$H- and $^{13}$C-NMR measuring conditions for FIG. 13 are as follows.

($^{1}$H-NMR Measuring Conditions)

Apparatus: Bruker Avance NEO 600
Observation nucleus: $^{1}$H
Observation frequency: 600 MHz
Pulse program: zg30
Pulse delay time: 1 sec
Number of scans: 1024
Measuring temperature: 130° C.
Chemical shift reference: 7.219 ppm (o-DCBz)
Solvent: o-Dichlorobenzene-d4
Sample concentration: 1 wt/vol %
Sample tube: 5 mmφ

($^{13}$C-NMR Measuring Conditions)

Apparatus: Bruker Avance NEO 600
Observation nucleus: $^{13}$C
Observation frequency: 150.91 MHz
Pulse program: zgpg30
Pulse delay time: 5 sec
Number of scans: 24,000 or 12,800
Measuring temperature: 130° C.
Chemical shift reference: 132.39 ppm (o-DCBz)
Solvent: o-Dichlorobenzene-d4
Sample concentration: 10 wt/vol %
Sample tube: 5 mmφ

For the separator in the crosslinked state, measurement can be performed by NMR in the same manner as FIG. 13 after the pretreatment described above (not shown).

As shown in FIGS. 11 to 13, the $^{1}$H and/or $^{13}$C NMR measurement allows the amount of silane unit modification and the amount of polyolefin alkyl group modification in the silane-modified polyolefin to be confirmed for a polyolefin starting material, and allows the silane-modified polyolefin contained in the separator to be determined (—$CH_2$—Si: $^{1}$H, 0.69 ppm, t; $^{13}$C, 6.11 ppm, s).

[Combination of Microporous Membrane and Inorganic Porous Layer]

A combination of a silane-modified polyolefin-containing microporous membrane and an inorganic porous layer will tend to provide both a shutdown function at lower temperatures than 150° C. and membrane rupture properties at relatively high temperature, and to improve the electricity storage device cycle characteristics and battery nail penetration safety. Since the silane-modified polyolefin in the microporous membrane has a silane crosslinking property, presumably silane crosslinking can result in increased viscosity of the resin in the microporous membrane, and therefore when compressive force is applied between the electrodes during a period of abnormal high temperature of the separator-containing electricity storage device, the crosslinked high-viscosity resin is less likely to flow into the inorganic layer (that is, integration is less likely), and clearance between the electrodes can be adequately ensured and shorting of the battery can be inhibited.

[Inorganic Porous Layer]

The inorganic porous layer is a layer comprising inorganic particles and a resin binder, and optionally it may further comprise a dispersing agent that disperses the inorganic particles in the binder resin.

The thickness of the inorganic porous layer is preferably 0.5 μm to 10 μm, 0.5 μm to 7 μm, 0.5 μm to 5 μm or 0.5 μm to 4 μm, from the viewpoint of the ion permeability of the separator, and the charge-discharge capacity or cycle stability of the electricity storage device. The thickness of the inorganic porous layer can be determined by the method described in the Examples.

[Second Porous Layer (Layer B)]

Layer B comprises inorganic particles. Layer B may also comprise a resin binder. When layer B comprises inorganic particles and a resin binder, layer B may be an inorganic porous layer as described above. Layer B may also comprise components other than inorganic particles and a resin binder.

(Thickness of Layer B)

The thickness (TB) of layer B is preferably 0.2 μm or greater and more preferably 0.5 μm or greater. If the thickness (TB) is 0.5 μm or greater the mechanical strength will tend to be further increased. The thickness (TB) is also preferably smaller than 22 μm, more preferably 20 μm or smaller and even more preferably 15 μm or smaller. If the thickness (TB) is 30 μm or smaller, the volume of the electricity storage device occupied by the separator will be reduced, which will tend to be advantageous from the viewpoint of increasing the capacity of the electricity storage device. It is also preferred from the viewpoint of preventing excessive increase in the air permeability of the separator. The thickness (TB) may be set to 0.50 μm or greater, 0.80 μm or greater or 1.00 μm or greater, or set to smaller than 22.00 μm, 20.00 μm or smaller or 15.00 μm or smaller, for example.

The thickness (TB) can be measured by the method described in the Examples, and it can be controlled by varying the coating amount of the coating solution (slurry) used to form layer B.

When layer B is a single layer, the thickness of layer B is treated as the "thickness (TB)". When layer B is multilayered, the total thickness of the multiple layers of layer B is treated as the "thickness (TB)".

When layer B is disposed on both one and the other side of layer A, the total thickness of the layer B disposed on the one side and the layer B disposed on the other side is treated as the "thickness (TB)".

(Inorganic Particles)

Examples for the inorganic particles include inorganic oxides (oxide-based ceramics) such as alumina ($Al_2O_3$), silica, titania, zirconia, magnesia, ceria, yttria, zinc oxide and iron oxide; inorganic nitrides (nitride-based ceramics) such as silicon nitride, titanium nitride and boron nitride; ceramics such as silicon carbide, calcium carbonate, magnesium sulfate, aluminum sulfate, aluminum hydroxide, aluminum hydroxide oxide (AlO(OH)), potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth and quartz sand; and glass fibers. These may be used alone, or two or more may be used in combination.

From the viewpoint of ensuring heat resistance, the amount of inorganic particles is preferably 5 weight % or greater or 20 weight % or greater, and more preferably 30 weight % or greater, based on the total weight of the inorganic porous layer or layer B. The amount of inorganic particles may be set to 50 weight % or greater, greater than 80 weight % or 85 weight % or greater, based on the total weight of the inorganic porous layer or layer B. The amount of inorganic particles is also preferably no greater than 99.9 weight %, and more preferably no greater than 99.5 weight % or no greater than 99 weight %.

The amount of inorganic particles may be set 20.00 weight % or greater, 30.00 weight % or greater, 50.00 weight % or greater, greater than 80.00 weight % or 85.00 weight % or greater, and also set to no greater than 99.90 weight % or 99.50 weight %.

The form of the inorganic particles may be tabular, scaly, needle-like, columnar, spherical, polyhedral, fusiform or aggregated (block-shaped). Inorganic particles with these shapes may also be combined for use.

The number-mean particle size of the inorganic particles is preferably 0.01 μm or greater, 0.1 μm or greater, 0.3 μm or greater or 0.5 μm or greater. The number-mean particle size is also preferably no greater than 10.0 μm, no greater than 9.0 μm, no greater than 6.0 μm or no greater than 2.5 μm, more preferably no greater than 2.0 μm and even more preferably no greater than 1.5 μm, for example. Adjusting the number-mean particle size of the inorganic particles to within this range is preferred from the viewpoint of increasing the safety during short circuiting. The method of adjusting the number-mean particle size of the inorganic particles may be a method of pulverizing the inorganic particles using a suitable pulverizing apparatus such as a ball mill, bead mill or jet mill.

The particle size distribution of the inorganic particles is preferably 0.02 μm or greater, more preferably 0.05 μm or greater and even more preferably 0.1 μm or greater, as the minimum particle size. The maximum particle size is preferably no greater than 20 more preferably no greater than 10 μm and even more preferably no greater than 7 The maximum particle size/mean particle size ratio is preferably no greater than 50, more preferably no greater than 30 and even more preferably no greater than 20. Adjusting the particle size distribution of the inorganic particles to within this range is preferred from the viewpoint of inhibiting heat shrinkage at high temperature. Multiple particle size peaks may also be present between the maximum particle size and minimum particle size. The method of adjusting the particle size distribution of the inorganic particles may be, for example, a method of pulverizing the inorganic filler using a ball mill, bead mill or jet mill to adjust them to the desired particle size distribution, or a method of preparing multiple fillers with different particle size distributions and then blending them.

(Resin Binder)

The resin binder comprises a resin that binds together the inorganic particles. The glass transition temperature (Tg) of the resin binder is preferably −50° C. to 100° C. and more preferably −35° C. to 95° C., from the viewpoint of ensuring the binding property with the inorganic particles, and ensuring stability of the inorganic porous layer or layer B, during the production process for the separator, the production process for the electricity storage device or the charge-discharge process.

The glass transition temperature is determined from a DSC curve obtained by differential scanning calorimetry (DSC). Specifically, the value used for the glass transition temperature may be the temperature at the intersection between a straight line extending the low-temperature end baseline in the DSC curve toward the high-temperature end, and the tangent line at the inflection point in the stepwise change region of glass transition. More specifically, it may be determined by the method described in the Examples. Moreover, the "glass transition" refers to the value when a change in heat quantity accompanying the change in state of a polymer test piece in DSC occurs at the endothermic end. The change in heat quantity is observed in the form of a stepwise change in the DSC curve. A "stepwise change" is a portion of the DSC curve moving away from the previous low-temperature end baseline and toward a new high-temperature end baseline. A combination of a stepwise change and a peak is also included in the concept of "stepwise change". The "inflection point" is the point at which the slope of the DSC curve is maximum in the stepwise change region. If the exothermic end in the stepwise change region is defined as the top end, then this represents the point where the upwardly convex curve changes to a downwardly convex curve. The term "peak" refers to a portion of the DSC curve that moves away from the low-temperature end baseline and then returns to the same baseline. The term "baseline" refers to the DSC curve in the temperature zone where no transition or reaction takes place in the test piece.

Examples for the resin binder include the following 1) to 7), for example. These may be used alone, or two or more may be used in combination.

1) Polyolefins: Polyethylene, polypropylene, ethylene-propylene rubber and modified forms of these;
2) Conjugated diene-based polymers: For example, styrene-butadiene copolymers and their hydrogenated forms, acrylonitrile-butadiene copolymers and their hydrogenated forms and acrylonitrile-butadiene-styrene copolymers and their hydrogenated forms;
3) Acrylic-based polymers: For example, methacrylic acid ester-acrylic acid ester copolymers, styrene-acrylic acid ester copolymers and acrylonitrile-acrylic acid ester copolymers;
4) Polyvinyl alcohol-based resins: For example, polyvinyl alcohol and polyvinyl acetate;
5) Fluorine-containing resins: For example, PVdF, polytetrafluoroethylene, vinylidene fluoride-hexafluoropropylene-tetrafluoroethylene copolymer and ethylene-tetrafluoroethylene copolymer;
6) Cellulose derivatives: For example, ethyl cellulose, methyl cellulose, hydroxyethyl cellulose and carboxymethyl cellulose; and
7) Polymers that are resins with a melting point and/or glass transition temperature of 180° C. or higher, or without a melting point but having a decomposition temperature of 200° C. or higher: For example, polyphenylene ethers, polysulfones, polyethersulfones, polyphenylene sulfides, polyetherimides, polyamide-imides, polyamides and polyesters.

These types of resin binders can be obtained by known production methods such as emulsion polymerization or solution polymerization, using any desired monomers as the starting materials. The polymerization is not restricted in terms of the polymerization temperature, the pressure during polymerization, the method of adding the monomers and the additives used (polymerization initiator, molecular weight modifier and pH regulator, etc.).

The amount of resin binder is 0.5 weight % or greater or 1.0 weight % or greater, for example, and no greater than 50 weight % or no greater than 30 weight %, for example, based on the total weight of the inorganic porous layer or layer B. Since layer B has the resin binder as an optional component as mentioned above, the amount of resin binder in layer B may be less than 20 weight %, 15 weight % or less or 0 weight % based on the total weight of layer B. If the amount of resin binder in layer B is reduced, it will be possible to increase the amount of inorganic particles added to layer B by that amount.

(Dispersing Agent)

The dispersing agent is adsorbed onto the surfaces of the inorganic particles in the slurry to form the inorganic porous layer or layer B, thus stabilizing the inorganic particles by electrostatic repulsion and the like, and examples thereof include polycarboxylic acid salts, sulfonic acid salts, polyoxyethers and surfactants. The inorganic porous layer or layer B may also include other components commonly added to aqueous coating materials in addition to the components mentioned above, within the range of the aforementioned effect. Such other components include, but are not limited to, thickeners, membrane-forming aids, plasticizers, crosslinking agents, cryoprotectants, antifoaming agents, dyes, antiseptic agents, ultraviolet absorbers and light stabilizers, for example. Such other components may be used alone, or two or more may be used in combination.

(Additives)

The microporous membrane, inorganic porous layer, layer A and/or layer B may also include known additives as necessary. Examples of such additives include organometallic catalysts (dehydrating condensation catalysts); plasticizers; phenol-based, phosphorus-based and sulfur-based antioxidants; metal soaps such as calcium stearate and zinc stearate; thickeners; membrane-forming aids; crosslinking agents; cryoprotectants; antifoaming agents; antiseptic agents; ultraviolet absorbers; light stabilizers; antistatic agents; anti-fogging agents; dyes; and color pigments.

Layer B may also include a crosslinking agent. The crosslinking agent may include a functional group that reacts with the inorganic particles.

<Physical Properties of Separator>

When the separator is to be used in a relatively high-capacity lithium ion secondary battery, the membrane thickness of the separator as a whole is preferably no greater than 25 μm, more preferably no greater than 22 μm or no greater than 20 m, even more preferably no greater than 18 μm and most preferably no greater than 16 m. If the membrane thickness of the separator is no greater than 25 μm, the ion permeability will tend to be further increased. The lower limit for the membrane thickness of the separator as a whole may be 1.0 μm or greater, 3.0 μm or greater, 4.0 μm or greater, 6.0 μm or greater or 7.5 μm or greater, for example.

The air permeability of the separator is preferably 50 seconds/100 $cm^3$ to 400 seconds/100 $cm^3$, more preferably 75 seconds/100 $cm^3$ to 275 seconds/100 $cm^3$ and even more preferably 100 seconds/100 $cm^3$ to 200 seconds/100 $cm^3$. This is preferred because the separator will have suitable mechanical strength so long as the air permeability is 50 seconds/100 $cm^3$ or greater, and will have an improved battery characteristic from the viewpoint of permeability if the air permeability is 400 seconds/100 $cm^3$ or less.

[Electricity Storage Device Assembly Kit]

According to another aspect of the invention there is provided an electricity storage device assembly kit comprising the separator for an electricity storage device described above. The electricity storage device assembly kit comprises the following two elements:

(A) an exterior body housing electrodes and a laminated stack or wound body of the separator for an electricity storage device according to any of the embodiments described above; and (B) a container housing a nonaqueous electrolyte solution. During use of the electricity storage device assembly kit, the separator in element (A) is contacted with the nonaqueous electrolyte solution in element (B), thereby contacting the electrolyte solution and the laminated stack or wound body inside the exterior body and/or continuously carrying out charge-discharge cycling of the assembled electricity storage device, to form a crosslinked structure in the separator, so that an electricity storage device having both safety and output can be formed.

While it is not our intention to be limited to any particular theory, it is possible that when the electrolyte or electrolyte solution contacts with the electrodes and/or charge-discharge of the electricity storage device is carried out, the substance that is responsible for catalytic action during the crosslinking reaction or substances with functional groups that form part of the crosslinked structure, being present in the electrolyte solution, on the exterior body inner walls or on the electrode surfaces, dissolve into the electrolyte solution and evenly swell and diffuse into the amorphous portions of the polyolefin, thereby homogeneously promoting crosslinking reaction of the separator-containing laminated stack or wound body. The substance responsible for catalytic action during the crosslinking reaction may be in the form of an acid solution or membrane, and when the electrolyte includes lithium hexafluorophosphate ($LiPF_6$), it may be hydrofluoric acid (HF) or a fluorine-containing organic substance derived from hydrofluoric acid (HF). Substances with functional groups that form part of the crosslinked structure may include the compound with functional group A and/or B described above, or the electrolyte solution itself, or various additives.

From the viewpoint of promoting crosslinking reaction of the separator, the electrolyte in the nonaqueous electrolyte solution housed in element (2) may be a fluorine (F)-containing lithium salt such as $LiPF_6$ or an electrolyte having an unshared electron pair such as $LiN(SO_2CF_3)_2$ or $LiSO_3CF_3$, which generates HF, or it may be $LiBF_4$ or $LiBC_4O_8$ (LiBOB).

From the viewpoint of promoting crosslinking reaction of the separator, the electricity storage device assembly kit may be provided with a separate container as an accessory (or element (C)), which houses a catalyst to promote the crosslinking reaction, such as a mixture of an organometallic catalyst and water, an acid solution or a base solution.

[Electricity Storage Device]

The separator described above can be used in an electricity storage device. The electricity storage device comprises a positive electrode, a negative electrode, a separator according to this embodiment disposed between the positive and negative electrodes, an electrolyte solution, and optionally an additive. When the separator is housed in a device exterior body, the functional group-modified polyethylene or functional group graft-copolymerized polyethylene reacts with chemical substances in the electrolyte solution or additives, forming a crosslinked structure, and therefore a crosslinked structure is present in the fabricated electricity storage device. The functional group-modified polyethylene and functional group graft-copolymerized polyethylene are not limited, and they may be derived from the polyolefin of the microporous membrane or derived from a polyolefin that has been modified during the production process for the microporous membrane.

Specifically, the electricity storage device may be a lithium battery, lithium secondary battery, lithium ion secondary battery, sodium secondary battery, sodium ion secondary battery, magnesium secondary battery, magnesium ion secondary battery, calcium secondary battery, calcium ion secondary battery, aluminum secondary battery, aluminum ion secondary battery, nickel hydrogen battery, nickel cadmium battery, electrical double layer capacitor, lithium ion capacitor, redox flow battery, lithium sulfur battery, lithium-air battery or zinc air battery, for example. Preferred among these, from the viewpoint of practicality, are a lithium battery, lithium secondary battery, lithium ion secondary battery, nickel hydrogen battery or lithium ion capacitor, with a lithium battery or lithium ion secondary battery being more preferred.

The additive may be a dehydrating condensation catalyst, a metal soap such as calcium stearate or zinc stearate, or an ultraviolet absorber, light stabilizer, antistatic agent, anti-fogging agent or color pigment, for example.

[Lithium Ion Secondary Battery]

A lithium ion secondary battery is a battery employing a lithium transition metal oxide such as lithium cobaltate or a lithium cobalt composite oxide as the positive electrode, a carbon material such as graphite or graphite as the negative electrode, and an organic solvent containing a lithium salt such as $LiPF_6$ as the electrolyte solution. The electrolyte solution described above may also be used in a lithium ion secondary battery for the electricity storage device assembly kit.

During charge and discharge of the lithium ion secondary battery, ionized lithium reciprocates between the electrodes. The separator is disposed between the electrodes since the ionized lithium must migrate between the electrodes relatively rapidly while contact between the electrodes is inhibited.

<Method for Producing Separator for Electricity Storage Device>

Another aspect of the invention is a method for producing a separator for an electricity storage device. The method for producing the separator may comprise a step of producing the microporous membrane or layer A, and optionally a step of producing an inorganic porous layer on the microporous membrane or a step of producing layer B on layer A. The materials used in the method for producing the separator may be those mentioned for the first to tenth embodiments, unless otherwise specified.

Eleventh Embodiment

The method for producing a separator according to the eleventh embodiment will now be explained for a microporous membrane (flat membrane), with the understanding that other forms in addition to flat membranes are not excluded. The method for producing a microporous membrane according to the eleventh embodiment comprises the following steps:

(1) a sheet-forming step;
(2) a stretching step;
(3) a porous body-forming step; and
(4) a heat treatment step. Layer A described above can be formed by carrying out steps (1) to (4).

The method for producing a separator according to the eleventh embodiment may optionally include, in addition to steps (1) to (4), also the following steps:

(8B) a coating step in which an inorganic porous layer that includes inorganic particles and a resin binder is formed on at least one surface of the heat-treated porous body to form a silane-crosslinking precursor;
(9) an assembly step in which the electrodes, the laminated stack of the silane-crosslinking precursor or its wound body and the nonaqueous electrolyte solution are housed in an exterior body, and the silane-crosslinking precursor is contacted with the nonaqueous electrolyte solution. According to the eleventh embodiment, in step (8B) the inorganic porous layer is coated onto the microporous membrane which maintains its silane crosslinkability, after which in step (9) the separator and electrolyte solution are contacted inside the electricity storage device, and therefore the stress resistance of the electricity storage device and the separator in it is improved, and cycle stability and safety can be achieved for the electricity storage device.

The method for producing the microporous membrane of the eleventh embodiment may optionally include a kneading step before the sheet-forming step (1) and/or a winding and slitting step after the heat treatment step (3), but preferably it does not include a silane crosslinking treatment step from the viewpoint of maintaining silane crosslinkability until contact with the electrolyte solution. The silane crosslinking treatment step will generally be a step in which the target of treatment that contains a silane-modified polyolefin is contacted with the mixture of an organometallic catalyst and water, or is immersed in a base solution or acid solution, for silane dehydration condensation reaction to form oligosiloxane bonds.

The metal in an organometallic catalyst may be one or more selected from the group consisting of scandium, titanium, vanadium, copper, zinc, aluminum, zirconium, palladium, gallium, tin and lead, for example. The organometallic catalyst may be di-butyltin-di-laurate, di-butyltin-di-acetate, di-butyltin-di-octoate, or the like, which are known to overwhelmingly accelerate the reaction rate by the reaction mechanism proposed by Weij et al. (F. W. van. der. Weij: Macromol. Chem., 181, 2541, 1980). In recent years it is known that, in order to avoid damage to the environment and human health by organic tin, the Lewis functions of chelate complexes of copper and/or titanium can been utilized and combined with organic bases to promote reaction forming siloxane bonds between alkoxysilyl groups, similar to organic tin complexes.

The base solution may have a pH of higher than 7 and may include alkali hydroxide metals, alkaline earth metal hydroxides, alkali metal carbonates, alkali metal phosphates, ammonia or amine compounds, for example. Of these, alkali metal hydroxides and alkaline earth metal hydroxides are preferred, alkali metal hydroxides are more preferred and sodium hydroxide is even more preferred, from the viewpoint of the electricity storage device safety and silane crosslinkability.

The acid solution is a pH of below 7 and may include inorganic acids or organic acids, for example. Preferred acids are hydrochloric acid, sulfuric acid, carboxylic acids or phosphoric acids.

In the kneading step, a kneading machine may be used for kneading of the silane-modified polyolefin, for this embodiment, and optionally a plasticizer or inorganic material and another polyolefin. From the viewpoint of inhibiting generation of resin aggregates during the production process and maintaining silane crosslinkability until contact with the electrolyte solution, a master batch resin containing a dehydrating condensation catalyst is preferably not added to the kneaded product.

The plasticizer is not particularly restricted, and examples include organic compounds that can form homogeneous solutions with polyolefins at temperatures below their boiling points. More specifically, these include decalin, xylene, dioctyl phthalate, dibutyl phthalate, stearyl alcohol, oleyl alcohol, decyl alcohol, nonyl alcohol, diphenyl ether, n-decane, n-dodecane and paraffin oil. Paraffin oil and dioctyl phthalate are preferred among these. A plasticizer may be used alone, or two or more may be used in combination. The proportion of the plasticizer is not particularly restricted, but from the viewpoint of the porosity of the obtained microporous membrane it is preferably 20 weight % or greater, and from the viewpoint of the viscosity during melt kneading it is preferably no greater than 90 weight %, as necessary, with respect to the total weight of the polyolefin and silane-modified polyolefin.

The sheet-forming step is a step in which the obtained kneaded blend or a mixture of the silane-modified polyolefin, polyethylene and plasticizer is extruded, cooled to solidification, and cast into a sheet form to obtain a sheet. The sheet forming method is not particularly restricted, and may be a method of compressed-cooling solidification of a molten mixture obtained by melt kneading and extrusion. The cooling method may be a method of direct contact with a cooling medium such as cold air or cooling water; or a method of contact with a refrigerant-cooled roll and/or a pressing machine, with a method of contact with a refrigerant-cooled roll and/or a pressing machine being preferred for superior membrane thickness control.

From the viewpoint of resin aggregates in the separator, and the maximum internal heat release rate, the weight ratio of the silane-modified polyolefin and polyethylene in the sheet-forming step (silane-modified polyolefin weight/polyethylene weight) is preferably 0.05/0.95 to 0.4/0.6 and more preferably 0.06/0.94 to 0.38/0.62.

From the viewpoint of exhibiting low temperature shutdown at 150° C. and below and rupture resistance at high temperatures of 180 to 220° C., while also inhibiting thermal runaway during destruction of the electricity storage device to improve safety, preferably the silane-modified polyolefin in the sheet-forming step is not a master batch resin that contains a dehydrating condensation catalyst that crosslinks the silane-modified polyolefin prior to the sheet-forming step.

The stretching step is a step in which the plasticizer and/or inorganic material is extracted from the obtained sheet as necessary, and the sheet is further subjected to stretching in one or more axial directions. The method of stretching the sheet may be MD uniaxial stretching with a roll stretcher, TD uniaxial stretching with a tenter, sequential biaxial stretching with a combination of a roll stretcher and tenter, or a tenter and tenter, or simultaneous biaxial stretching with a biaxial tenter or inflation molding. Simultaneous biaxial stretching is preferred from the viewpoint of obtaining a more homogeneous membrane. The total area increase is preferably 8-fold or greater, more preferably 15-fold or greater and even more preferably 20-fold or greater or 30-fold or greater, from the viewpoint of membrane thickness homogeneity, and balance between tensile elongation, porosity and mean pore size. If the total area increase is 8-fold or greater, it will tend to be easier to obtain high strength and a satisfactory thickness distribution. The area increase is also no greater than 250-fold from the viewpoint of preventing rupture.

The porous body-forming step is a step in which the plasticizer is extracted from the stretched sheet after the stretching step to form pores in the stretched sheet. The method of extracting the plasticizer is not particularly restricted, and may be a method of immersing the stretched sheet in an extraction solvent or a method of showering the stretched sheet with an extraction solvent, for example. The extraction solvent used is not particularly restricted, but it is preferably one that is a poor solvent for the polyolefin and a good solvent for the plasticizer and/or inorganic material, and that has a boiling point that is lower than the melting point of the polyolefin. Such extraction solvents are not particularly restricted and include hydrocarbons such as n-hexane and cyclohexane; halogenated hydrocarbons such as methylene chloride, 1,1,1-trichloroethane and fluorocarbon-based compounds; alcohols such as ethanol and isopropanol; ketones such as acetone and 2-butanone; and alkali water. An extraction solvent may be used alone, or two or more may be used in combination.

The heat treatment step is a step in which, after the stretching step, the plasticizer is also extracted from the sheet as necessary and heat treatment is further carried out to obtain a microporous membrane. The method of heat treatment is not particularly restricted, and for example, it may be a heat setting method in which a tenter and/or roll stretcher is utilized for stretching and relaxation procedures. A relaxation procedure is a procedure of shrinking carried out at a prescribed temperature and relaxation factor, in the machine direction (MD) and/or transverse direction (TD) of the membrane. The relaxation factor is the value of the MD dimension of the membrane after the relaxation procedure divided by the MD dimension of the membrane before the procedure, or the value of the TD dimension after the relaxation procedure divided by the TD dimension of the membrane before the procedure, or the product of the relaxation factor in the MD and the relaxation factor in the TD, when both the MD and TD have been relaxed.

[Inorganic Porous Layer Coating Step]

The coating step (8B) for the inorganic porous layer is a step in which an inorganic porous layer comprising inorganic particles and a resin binder is formed on at least one surface of the microporous membrane obtained as described above. The coating step (8B) may be carried out while maintaining the silane crosslinkability of the silane-modified polyolefin.

Layer B described above can be formed by carrying out the coating step (8B). The method used to form layer B may be a known production method. The method of fabricating a laminated stack comprising layer A and layer B may be, for example, a method of coating an inorganic particle-containing slurry onto layer A, a method of layering and extruding the starting material for layer B and the starting material for layer A by a co-extrusion method, or a method of separately preparing layer A and layer B and then attaching them together.

The inorganic porous layer can be formed, for example, by coating at least one surface of the microporous membrane with a slurry containing inorganic particles, a resin binder, water or an aqueous solvent (for example, a mixture of water and an alcohol) and optionally a dispersing agent. The inorganic particles, resin binder and dispersing agent may be as described above for the first to tenth embodiments.

The solvent in the slurry is preferably one that can uniformly and stably disperse or dissolve the inorganic particles. Examples of such solvents include N-methylpyrrolidone (NMP), N,N-dimethylformamide, N,N-dimethylacetamide, water, ethanol, toluene, hot xylene, methylene chloride and hexane.

The method of preparing the inorganic particle-containing slurry may be, for example, a mechanical stirring method using a ball mill, bead mill, planetary ball mill, vibrating ball mill, sand mill, colloid mill, attritor, roll mill, high-speed impeller disperser, disperser, homogenizer, high-speed impact mill, ultrasonic disperser or stirring blade.

Examples for the method of coating the inorganic particle-containing slurry include gravure coater methods, small-diameter gravure coater methods, reverse roll coater methods, transfer roll coater methods, kiss coater methods, dip coater methods, knife coater methods, air doctor coater methods, blade coater methods, rod coater methods, squeeze coater methods, cast coater methods, die coater methods, screen printing methods and spray coating methods.

The method for removing the solvent from the coated membrane may be a method of drying at a temperature below the melting point of the material forming the microporous membrane, or a method of reduced pressure drying at low temperature. Some of the solvent may be allowed to remain so long as it does not produce any notable effect on the device properties.

[Winding/Slitting Step]

The winding step is a step in which the obtained microporous membrane or the inorganic porous layer-coated microporous membrane is slit if necessary and wound onto a prescribed core.

[Electricity Storage Device Assembly Step]

The electricity storage device assembly step is a step in which a separator precursor that maintains its silane crosslinkability (hereunder also referred to as "silane-crosslinking precursor") and electrodes are layered to form a laminated stack, the laminated stack is optionally wound to form a wound body, and the laminated stack or wound body and a nonaqueous electrolyte solution are housed in an exterior body, causing contact between the silane-crosslinking precursor and the nonaqueous electrolyte solution. The electricity storage device assembly step allows membrane loss of the microporous membrane to be reduced to maintain its morphology and can inhibit infiltration of the polyolefin resin from the microporous membrane into the inorganic porous layer, thus improving the stress resistance of the electricity storage device or separator.

Since the silane-modified polyolefin is crosslinked either during the electricity storage device assembly step (9) or after step (9), it is suitable for conventional electricity storage device production processes, while it also produces silane crosslinking reaction of the separator after production of the electricity storage device, thereby improving the safety of the electricity storage device.

From the viewpoint of handleability of the electrolyte solution during the electricity storage device assembly step, preferably the nonaqueous electrolyte solution is injected into the exterior body after the laminated stack or wound body has been housed in the exterior body, or the laminated stack or wound body is housed in the exterior body after the electrolyte solution has been injected into the exterior body.

From the viewpoint of promoting crosslinking reaction of the separator, the electrolyte of the nonaqueous electrolyte solution may be a fluorine (F)-containing lithium salt such as $LiPF_6$ or an electrolyte having an unshared electron pair such as $LiN(SO_2CF_3)_2$ or $LiSO_3CF_3$, which generates hydrofluoric acid (HF), or it may be $LiBF_4$ or $LiBC_4O_8$ (LiBOB).

While it is not our intention to be limited to any particular theory, it is conjectured that the methoxysilane-grafted portions are converted to silanol by trace amounts of water inside the electricity storage device (water present in the members such as the electrodes, separator and electrolyte solution), resulting in crosslinking reaction and conversion to siloxane bonds. It is possible that when the electrolyte or electrolyte solution contacts with the electrodes, substances that produce catalytic action in the silane crosslinking reaction are generated in the electrolyte solution or on the electrode surfaces and dissolve into the electrolyte solution, resulting in uniform swelling and diffusion in the amorphous portions of the polyolefin where the silane-modified grafts are present, and thus homogeneously promoting crosslinking reaction of the separator-containing laminated stack or wound body. The substances responsible for catalytic action in the silane crosslinking reaction may be in the form of an acid solution or membrane, and when the electrolyte includes lithium hexafluorophosphate ($LiPF_6$), it may be HF generated by reaction between $LiPF_6$ and water, or a fluorine-containing organic substance derived from HF.

From the viewpoint of efficient silane crosslinking reaction, it is preferred to connect lead terminals to the electrodes and to conduct at least one cycle of charge-discharge, after the laminated stack or wound body and the nonaqueous electrolyte solution in the exterior body of the electricity storage device have been housed in the exterior body. As a result of charge-discharge cycling, presumably, substances responsible for catalytic action in the silane crosslinking reaction are produced in the electrolyte solution or on the electrode surfaces, so that silane crosslinking reaction is achieved. The cycling charge-discharge can be carried out with a known method and apparatus, and specifically the method described in the Examples may be employed.

[Method for Producing Electricity Storage Device]

Another aspect of the invention is a method for producing an electricity storage device.

Twelfth Embodiment

The method for producing an electricity storage device according to the twelfth embodiment comprises the following steps:

(a) a step of preparing an electricity storage device assembly kit as described above, (b) a step of contacting the separator in element (1) and the nonaqueous electrolyte solution in element (2) of the electricity storage device assembly kit, to initiate silane crosslinking reaction of the silane-modified polyolefin, (c) optionally, a step of connecting lead terminals to the electrodes of element (1), and (d) optionally, a step of carrying out at least one cycle of charge-discharge. Steps (a) to (d) can be carried out by a method known in the technical field, except for using a separator for an electricity storage device according to this embodiment, and a positive electrode, negative electrode, electrolyte solution, exterior body and charge-discharge apparatus known in the technical field may be used in steps (a) to (d).

A separator with a longitudinal shape having a width of 10 to 500 mm (preferably 80 to 500 mm) and a length of 200 to 4000 m (preferably 1000 to 4000 m) may be produced for step (a). Next, in step (a), lamination may be carried out in the order: positive electrode-separator-negative electrode-separator or negative electrode-separator-positive electrode-separator, and the laminate wound into a circular or flat spiral form to obtain a wound body. In steps (b) and (c), the wound body may be housed in a device can (for example, a battery can) and a nonaqueous electrolyte solution injected to produce an electricity storage device. The electrodes and the wound body obtained by folding the separator may then be placed in a device container (for example, an aluminum film) and a nonaqueous electrolyte solution may be injected, thereby producing an electricity storage device.

The wound body may also be pressed during this time. Specifically, the separator may be stacked and pressed with an electrode having a current collector and an active material layer formed on at least one side of the current collector.

The pressing temperature is preferably 20° C. or higher, as an example of a temperature allowing the adhesion to be effectively exhibited. From the viewpoint of inhibiting blocking or heat shrinkage of the pores in the separator by hot pressing, the pressing temperature is preferably lower than the melting point of the material in the microporous membrane, and more preferably no higher than 120° C. The pressing pressure is preferably no higher than 20 MPa from the viewpoint of inhibiting blocking of the pores of the separator. The pressing time may be up to 1 second when a roll press is used, or several hours for surface pressing, but from the viewpoint of productivity it is preferably no longer than 2 hours.

By this production process it is possible to reduce press back during press molding of a wound body comprising the electrodes and the separator. It is thus possible to inhibit yield reduction in the device assembly steps and shorten the production process time.

It is preferred to carry out steps (c) and (d) from the viewpoint of reliably carrying out silane crosslinking reaction of the separator after step (b). As a result of charge-discharge cycling, presumably, substances responsible for catalytic action in the silane crosslinking reaction are produced in the electrolyte solution or on the electrode surfaces, so that silane crosslinking reaction is achieved.

For example, when the method for producing layer A described above in the method for producing the separator does not include a silane crosslinking treatment step, the separator may be contacted with the nonaqueous electrolyte solution to actively promote the crosslinking reaction. While it is not our intention to be limited to any particular theory, it is conjectured that the silane-modified graft portions are converted to silanol by trace amounts of water inside the electricity storage device (water present in trace amounts in the electrodes, separator and nonaqueous electrolyte solution), resulting in crosslinking reaction and conversion to siloxane bonds. When the nonaqueous electrolyte solution contacts with the electrodes, presumably the substances responsible for catalytic action in the silane crosslinking reaction are produced in the nonaqueous electrolyte solution and on the electrode surfaces. It is possible that the substances responsible for catalytic action in the silane crosslinking reaction dissolve into the nonaqueous electrolyte solution, resulting in uniform swelling and diffusion in the amorphous portions of the polyolefin where the silane-modified grafts are present, and thus homogeneously promoting crosslinking reaction of the separator-containing laminated stack or wound body.

The substances responsible for catalytic action in the silane crosslinking reaction may be in the form of an acid solution or membrane. When the electrolyte includes lithium hexafluorophosphate ($LiPF_6$), the $LiPF_6$ reacts with water, and hydrofluoric acid (HF) generated by the reaction or fluorine-containing organic substances derived from hydrofluoric acid (HF) are treated as substances responsible for catalytic action in the silane crosslinking reaction (compounds generated inside the electricity storage device).

Thirteenth Embodiment

The thirteenth embodiment is a method for producing an electricity storage device using a separator that includes a polyolefin having one or two or more different functional groups, the method comprising the following step:

a crosslinking step in which (1) condensation reaction is carried out between the functional groups, (2) the functional groups are reacted with a chemical substance inside the electricity storage device, or (3) the functional groups of the polyolefin are reacted with different types of functional groups, to form a crosslinked structure.

The crosslinking step can be carried out in the same manner as the reaction for formation of the crosslinked structure in the separator, described above. Since the crosslinking step can also be carried out utilizing compounds in the electricity storage device or the surrounding environment of the device, it is possible to employ mild conditions such as a temperature of 5° C. to 90° C. and/or ambient atmosphere, without requiring excessive conditions such as an electron beam or a high temperature of 100° C. or above.

By carrying out the crosslinking step during the production process for the electricity storage device, it is possible to eliminate formation of a crosslinked structure either during or immediately after the process of forming the separator membrane, which can alleviate or eliminate stress strain following fabrication of the electricity storage device, and/or the separator can be imparted with a crosslinked structure without using relatively high energy such as photoirradiation or heating, thus allowing crosslinking unevenness, non-molten resin aggregate generation and environmental load to be reduced.

By reaction of functional groups with a chemical substance inside the electricity storage device (2) or reaction of the functional groups of the polyolefin with other types of functional groups (3) in the crosslinking step, a crosslinked structure can be formed not only within the separator but also between the separator and the electrodes or between the separator and the solid electrolyte interface (SEI), thus increasing the strength between multiple members of the electricity storage device.

Since the silane-modified polyolefin is crosslinked when the separator described above contacts with the electrolyte solution, it is suitable for conventional electricity storage device production processes, while it also produces silane crosslinking reaction after production of the electricity storage device, thereby improving the safety of the electricity storage device.

EXAMPLES

The present invention will now be explained in greater detail by examples and comparative examples, with the understanding that the invention is not limited to the examples so long as its gist is maintained. The physical properties in the examples were measured by the following methods.

<Weight-Average Molecular Weight>

Standard polystyrene was measured using a Model ALC/GPC 150C™ by Waters Co. under the following conditions, and a calibration curve was drawn. The chromatogram for each polymer was also measured under the same conditions, and the weight-average molecular weight of each polymer was calculated by the following method, based on the calibration curve.

Column: $GMH_6$-HT™ (2)+$GMH_6$-HTL™ (2), by Tosoh Corp.

Mobile phase: o-Dichlorobenzene

Detector: differential refractometer

Flow rate: 1.0 ml/min

Column temperature: 140° C.

Sample concentration: 0.1 wt %

(Weight-Average Molecular Weight of Polyethylene)

Each molecular weight component in the obtained calibration curve was multiplied by 0.43 (polyethylene Q factor/polystyrene Q factor=17.7/41.3), to obtain a molecular weight distribution curve in terms of polyethylene, and the weight-average molecular weight was calculated.

(Weight-Average Molecular Weight of Resin Composition)

The weight-average molecular weight was calculated in the same manner as for polyethylene, except that the Q factor value for the polyolefin with the largest weight fraction was used.

<Viscosity-Average Molecular Weight (Mv)>

The limiting viscosity [η] (dl/g) at 135° C. in a decalin solvent was determined based on ASTM-D4020. The My of polyethylene was calculated by the following formula.

$$[\eta]=6.77\times10^{-4}Mv^{0.67}$$

<Melt Mass-Flow Rate (MFR) (g/10 Min)>

A melt mass-flow rate measuring device by Toyo Seiki Co., Ltd. (Melt Indexer F-F01) was used to determine the weight of the resin extruded for 10 minutes under conditions of 190° C., 2.16 kg pressure, as the MFR value.

<Measurement of Glass Transition Temperature>

An appropriate amount of the resin sample-containing aqueous dispersion (solid content=38 to 42 wt %, pH=9.0) was placed in an aluminum pan and dried for 30 minutes with a hot air drier at 130° C. to obtain a dry membrane. Approximately 17 mg of the dried membrane was packed into an measuring aluminum container, and DSC and DDSC curves were obtained using a DSC measuring apparatus (model DSC6220 by Shimadzu Corp.) under a nitrogen atmosphere. The measuring conditions were as follows.

Stage 1 heating program: Start=70° C., temperature increase at 15° C./min. Temperature maintained for 5 minutes after reaching 110° C.

Stage 2 cooling program: Temperature decrease from 110° C. at 40° C./min. Temperature maintained for 5 minutes after reaching −50° C.

Stage 3 heating program: Temperature decrease from −50° C. to 130° C. at 15° C./min. Recording of DSC and DDSC data during stage 3 temperature increase.

The intersection between the baseline (an extended straight line toward the high-temperature end from the baseline of the obtained DSC curve) and the tangent line at the inflection point (the point where the upwardly convex curve changed to a downwardly convex curve) was recorded as the glass transition temperature (Tg).

<Membrane Thickness (μm)>

A KBM™ microthickness meter by Toyo Seiki Co., Ltd. was used to measure the membrane thickness of the microporous membrane or separator at room temperature (23±2° C.) and 60% relative humidity. Specifically, the membrane thickness was measured at 5 points at approximately equal intervals across the entire width in the TD direction, and the average value was calculated. The thickness of the inorganic porous layer can be calculated by subtracting the thickness of the microporous membrane from the thickness of the separator comprising the microporous membrane and the inorganic porous layer.

<Layer a Thickness (TA), Layer B Thickness (TB)>

A KBM™ microthickness meter by Toyo Seiki Co., Ltd. was used to measure the thickness (TA) of layer A at room temperature (23±2° C.) and 60% relative humidity. Specifically, the membrane thickness was measured at 5 points at approximately equal intervals across the entire width in the TD, and the average value was calculated. The thickness of the laminated stack including layer A and layer B was obtained by the same method. The thickness (TA) of layer A was subtracted from the thickness of the obtained laminated stack to obtain the thickness (TB) of the layer B.

The thickness of the obtained laminated stack was treated as the total thickness (TA+TB) of layer A and layer B. The thickness (TA) was divided by the thickness (TB) to obtain the thickness ratio (TA/TB).

<Porosity (%)>

(i) Calculation from Density of Mixed Composition

A 10 cm×10 cm-square sample was cut out from the microporous membrane, and its volume ($cm^3$) and mass (g) were determined and used together with the density ($g/cm^3$) by the following formula, to obtain the porosity. The density value used for the mixed composition was the value determined by calculation from the densities of the starting materials used and their mixing ratio.

Porosity (%)=(Volume−(mass/density of mixed composition))/volume×100

(ii) Calculation from Membrane Density

Alternatively, the porosity of the microporous membrane may be calculated by the following formula from the volume, mass and membrane density ($g/cm^3$).

Porosity (%)=(Volume−(mass/membrane density of mixed composition))/volume×100

The membrane density, for the purpose of the present disclosure, is the value measured according to the density gradient tube method D described in JIS K7112(1999).

(iii) Porosity of Layer A

A 10 cm×10 cm-square sample was cut out from layer A, and its volume ($cm^3$) and mass (g) were determined and used together with the density ($g/cm^3$) in the following formula, to obtain the porosity. The density value used for the mixed composition was the value determined by calculation from the densities of the starting materials used and their mixing ratio.

Porosity (%)=(Volume−(mass/density of mixed composition))/volume×100

<Air Permeability (Sec/100 $cm^3$)>

The air permeability of the sample or layer A was measured with a Gurley air permeability tester (G-B2™ by Toyo Seiki Kogyo Co., Ltd.), according to JIS P-8117(2009).

<Puncture Strength of Layer A>

Using a Handy Compression Tester KES-G5 (model name) by Kato Tech Corp., layer A was anchored with a specimen holder having an opening diameter of 11.3 mm. Next, the center section of the anchored layer A was subjected to a puncture test with a needle having a tip curvature radius of 0.5 mm, at a puncture speed of 2 mm/sec and a 25° C. atmosphere, to measure the maximum puncture load. The value of the maximum puncture load per 20 μm thickness was recorded as the puncture strength (gf/20 μm). When the thermoplastic polymer is only present on one side of the base material, the needle may be used for piercing from the side where the thermoplastic polymer is present.

<Quantification of Resin Aggregates in Separator>

The resin aggregates in the separator were defined in a region with an area of 100 μm length×≥100 μm width, and with no light permeation, when separators obtained by the membrane formation steps in the Examples and Comparative Examples described below were observed with a transmission optical microscope. The number of resin aggregates per 1000 $m^2$ area of the separator were counted during observation with a transmission optical microscope.

<Transition Temperature for Storage Modulus and Loss Modulus (Version 1)>

Using a dynamic viscoelasticity measurement apparatus for dynamic viscoelasticity measurement of the separator, it is possible to calculate the storage modulus (E'), the loss modulus (E") and the transition temperature for the rubber plateau and crystal melt flow region. The storage modulus change ratio ($R_{\Delta E'}$) was calculated by the following formula (1), the mixed storage modulus ratio ($R_{E'mix}$) was calculated by the following formula (2), the loss modulus change ratio ($R_{\Delta E''}$) was calculated by the following formula (3) and the mixed loss modulus ratio ($R_{E''mix}$) was calculated by the following formula (4). The measuring conditions were the following (i) to (iv).

(i) The dynamic viscoelasticity measurement was carried out under the following conditions:
 Atmosphere: nitrogen
 Measuring apparatus: RSA-G2 (TA Instruments)
 Sample thickness: from 5 μm to 50 μm
 Measuring temperature range: −50 to 225° C.
 Temperature-elevating rate: 10° C./min
 Measuring frequency: 1 Hz
 Transform mode: sine wave tension mode (linear tension)
 Initial static tensile load: 0.5 N
 Initial gap distance (at 25° C.): 25 mm
 Auto strain adjustment: Enabled (range: 0.05 to 25% amplitude, 0.02 to 5 N sine wave load).

(ii) The static tensile load is the median value of the maximum stress and minimum stress for each periodic motion, and the sine wave load is the vibrational stress centered on the static tensile load.

(iii) Sine wave tension mode was measurement of the vibrational stress while carrying out periodic motion at a fixed amplitude of 0.2%, during which time the vibrational stress was measured while varying the gap distance and static tensile load so that the difference between the static tensile load and the sine wave load was within 20%. When the sine wave load was 0.02 N or lower, the vibrational stress was measured while amplifying the amplitude value so that the sine wave load was no greater than 5 N and the increase in the amplitude value was no greater than 25%.

(iv) The storage modulus and loss modulus were calculated from the relationship between the obtained sine wave load and amplitude value, and the following formulas:

$$\sigma^*=\sigma_0\cdot \mathrm{Exp}[i(\omega t+\delta)],$$

$$\varepsilon^*=\varepsilon_0\cdot \mathrm{Exp}(i\omega t),$$

$$\sigma^*=E^*\cdot\varepsilon^*$$

$$E^*=E'+iE''$$

{where σ*: vibrational stress, ε*: strain, i: imaginary number unit, ω: angular frequency, t: time, δ: phase difference between vibrational stress and strain, E*: complex modulus, E': storage modulus, E": loss modulus, vibrational stress: sine wave load/initial cross-sectional area static tensile load: load at minimum point of vibrational stress for each period (minimum point of gap distance for each period)

sine wave load: difference between measured vibrational stress and static tensile load}.

$E'_S$, $E'_j$ and $E''_S$, $E''_j$ were the average values in the dynamic viscoelasticity measurement data for each storage modulus or loss modulus at 160° C. to 220° C. $E'_a$, $E'_0$ and $E''_a$, $E''_0$ were the average values in the dynamic viscoelasticity measurement data for each storage modulus or loss modulus at 160° C. to 220° C.

$$R_{\Delta E'}=E'_S/E'_j \quad \text{(1) Comparison before and after loading into cell}$$

$$R_{E'mix}=E'_a/E'_0 \quad \text{(2) Comparison with and without silane crosslinking}$$

$$R_{\Delta E''}=E''_S/E''_j \quad \text{(3) Comparison before and after loading into cell}$$

$$R_{E''mix}=E''_a/E''_0 \quad \text{(4) Comparison with and without silane crosslinking}$$

FIG. 1 shows an example of a graph for illustration of the relationship between temperature and storage modulus. The storage modulus for a reference membrane (a separator for an electricity storage device not containing a silane-modified polyolefin) and for a crosslinked membrane within the temperature range of −50° C. to 225° C. were compared as shown in FIG. 1, and the transition temperature for the rubber plateau and crystal melt flow region of each can be seen in FIG. 1. Incidentally, the transition temperature is the temperature at the intersection between a straight line extending the baseline from the high-temperature end toward the low-temperature end, and the tangent line drawn at the point of inflection of the curve at the section of crystal melt transition.

Figure 2:
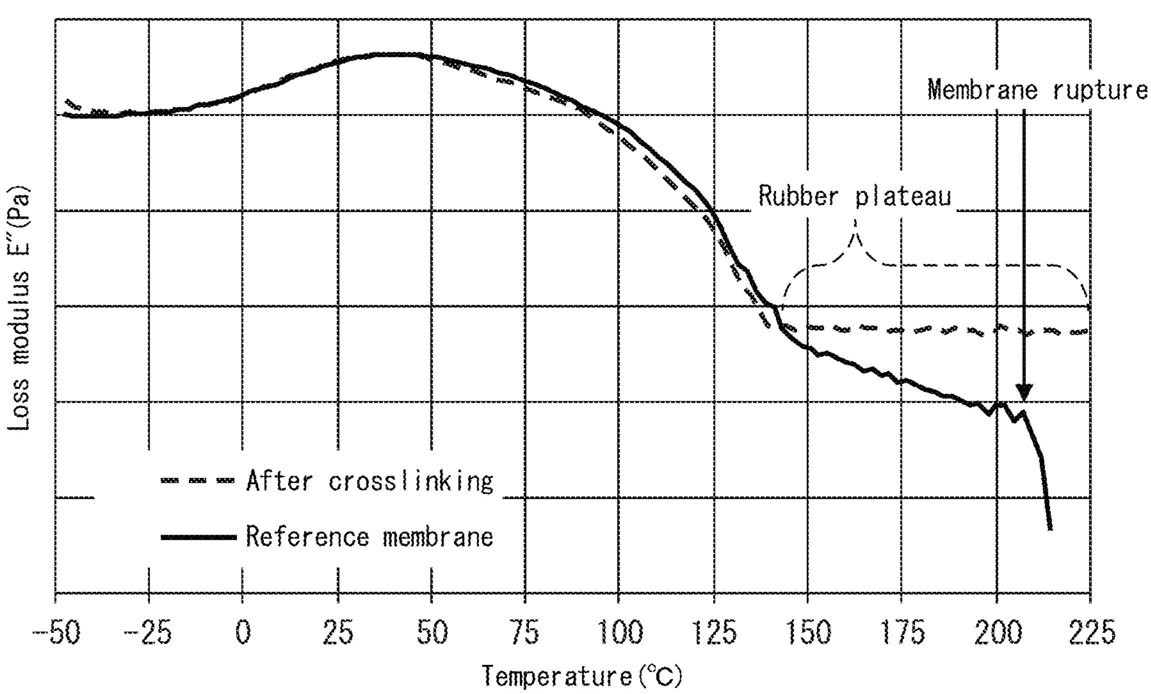
FIG. 2 shows an example of a graph illustrating the relationship between temperature and loss modulus, contrasting the loss modulus of a reference membrane and a crosslinked membrane in a temperature range of −50° C. to 225° C., and showing the transition temperature of the rubber plateau and crystal melt flow region.

FIG. 2 shows an example of a graph for illustration of the relationship between temperature and loss modulus. In FIG. 2, the loss modulus for a reference membrane (a separator for an electricity storage device not containing a silane-modified polyolefin) and for a crosslinked membrane within the temperature range of −50° C. to 220° C. are compared, and the transition temperature is shown as determined by the same method as FIG. 1. In the relevant technical field, the storage modulus and loss modulus are interchangeable as represented by the following formula:

$$\tan\delta=E''/E'$$

{where tan δ represents the loss tangent, E' represents the storage modulus and E" represents the loss modulus}.

For measurement of the mixed storage modulus ratio ($R_{E'mix}$) or mixed loss modulus ratio ($R_{E''mix}$), a non-silane-modified polyolefin microporous membrane with a gelation degree of about 0% was used, as a separator for an electricity storage device not containing a silane-modified polyolefin. When no sample rupture (abrupt reduction in elastic modulus) was observed at 160° C. to 220° C., $E'_a$, $E'_0$, $E''_a$ and $E''_0$ were calculated from the mean value for 160° C. to 220° C., and when sample rupture was observed at 160° C. to 220° C., they were calculated from the mean value from 160° C. to the rupture point temperature. For example, the reference membranes shown in FIGS. 1 and 2 exhibited rupture at 207° C.

<Transition Temperature for Storage Modulus and Loss Modulus (Version 2)>

Figure 9:
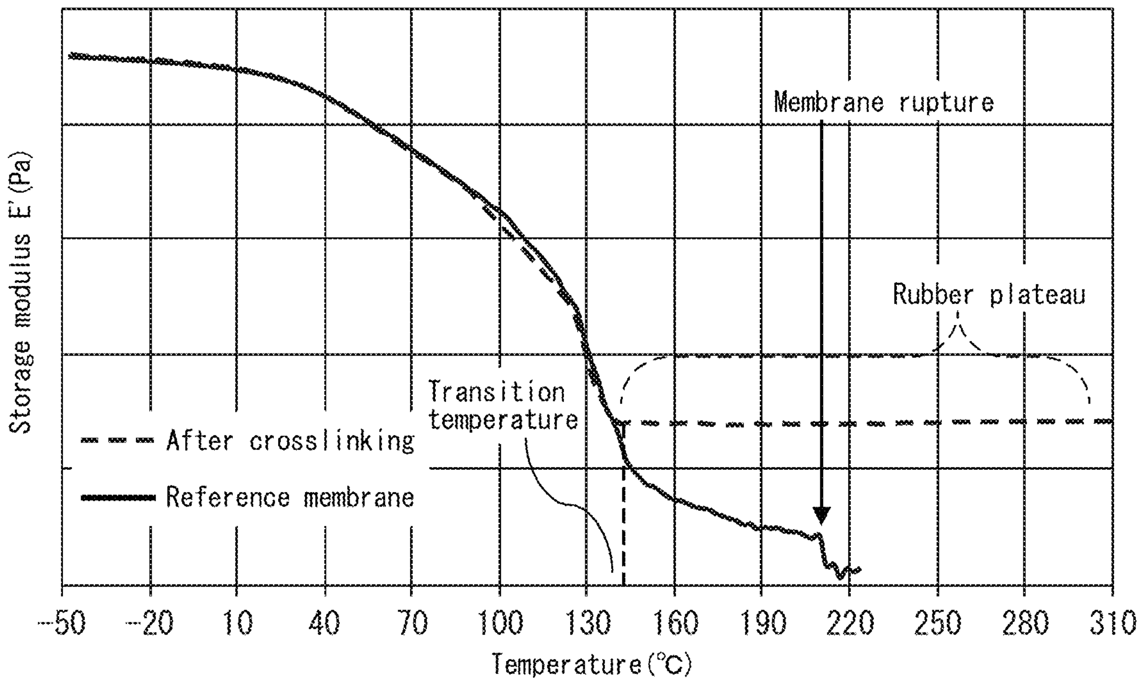
FIG. 9 shows an example of a graph illustrating the relationship between temperature and storage modulus, contrasting the storage modulus of a reference membrane and a crosslinked membrane in a temperature range of −50° C. to 310° C., and showing the transition temperature of the rubber plateau and crystal melt flow region.

Using a dynamic viscoelasticity measurement apparatus for dynamic viscoelasticity measurement of the separator, it is possible to calculate the storage modulus (E'), the loss modulus (E") and the transition temperature for the rubber plateau and crystal melt flow region. The storage modulus change ratio ($R_{\Delta E'x}$) was calculated by the following formula (1), the mixed storage modulus ratio ($R_{E'mix}$) was calculated by the following formula (2), the mixed loss modulus ratio ($R_{E''x}$) was calculated by the following formula (3) and the mixed loss modulus ratio ($R_{E''mix}$) was calculated by the following formula (4). As the measuring conditions for measurement of the storage modulus and loss modulus, an RSA-G2 dynamic viscoelasticity measurement apparatus by TA Instruments was used, with a measuring frequency of 1 Hz and a strain of 0.2%, under a nitrogen atmosphere and in a temperature range of −50° C. to 310° C., while the other conditions were according to version 1 described above. $E'_Z$, $E'_{Z0}$ and $E''_Z$, $E''_{Z0}$ were the average values in the dynamic viscoelasticity measurement data for each storage modulus or loss modulus at 160° C. to 300° C. E', $E'_0$ and E", $E''_0$ were the average values in the dynamic viscoelasticity measurement data for each storage modulus or loss modulus at 160° C. to 300° C.

$$R_{\Delta E'X}=E'_Z/E'_{Z0}$$ (1) Comparison before and after loading into cell $$R_{E'mix}=E'/E'_0$$ (2) Comparison with and without amorphous crosslinked structure $$R_{E''X}=E''_Z/E''_{Z0}$$ (3) Comparison before and after loading into cell $$R_{E''mix}=E''/E''_0$$ (4) Comparison with and without amorphous crosslinked structure FIG. 9 shows an example of a graph for illustration of the relationship between temperature and storage modulus. The storage modulus for a reference membrane (a separator for an electricity storage device without an amorphous crosslinked structure) and for a crosslinked membrane within the temperature range of −50° C. to 310° C. were compared as shown in FIG. 9, and the transition temperature for the rubber plateau and crystal melt flow region of each can be seen in FIG. 9. Incidentally, the transition temperature is the temperature at the intersection between a straight line extending the baseline from the high-temperature end toward the low-temperature end, and the tangent line drawn at the point of inflection of the curve at the section of crystal melt transition.

Figure 10:
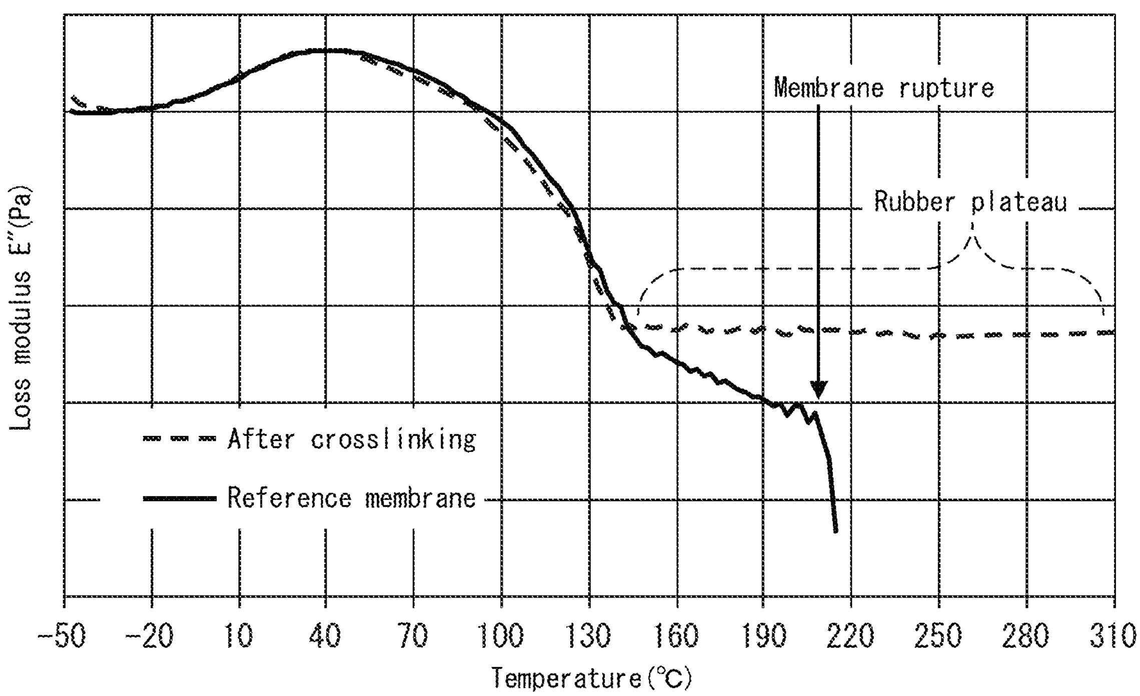
FIG. 10 shows an example of a graph illustrating the relationship between temperature and loss modulus, contrasting the loss modulus of a reference membrane and a crosslinked membrane in a temperature range of −50° C. to 310° C., and showing the transition temperature of the rubber plateau and crystal melt flow region.

FIG. 10 shows an example of a graph for illustration of the relationship between temperature and loss modulus. In FIG. 10, the loss modulus for a reference membrane (a separator for an electricity storage device not containing a silane-modified polyolefin) and for a crosslinked membrane within the temperature range of −50° C. to 310° C. are compared, and the transition temperature is shown as determined by the same method as FIG. 9. In the relevant technical field, the storage modulus and loss modulus are interchangeable as represented by the following formula:

$$\tan \delta=E''/E'$$

{where tan δ represents the loss tangent, E' represents the storage modulus and E" represents the loss modulus}.

For measurement of the mixed storage modulus ratio ($R_{E'mix}$) or mixed loss modulus ratio ($R_{E''mix}$), a polyolefin microporous membrane with a gelation degree of about 0% was used, as a separator for an electricity storage device without an amorphous crosslinked structure. When no sample rupture (abrupt reduction in elastic modulus) was observed at 160° C. to 300° C., E', $E'_0$, E" and $E''_0$ were calculated from the mean value for 160° C. to 300° C., and when sample rupture was observed at 160° C. to 300° C., they were calculated from the mean value from 160° C. to the rupture point temperature. For example, the reference membranes shown in Table 11 and Table 12 and in FIG. 9 and FIG. 10 exhibited rupture at 210° C.

For the purpose of the present specification, the separator for an electricity storage device without an amorphous crosslinked structure may be a separator produced using any type selected from the group consisting of polyethylene: X (viscosity-average molecular weight: 100,000 to 400,000), PE: Y (viscosity-average molecular weight: 400,000 to 800,000) and PE: Z (viscosity-average molecular weight: 800,000 to 9,000,000), or two, three or more types selected from the group consisting of X, Y and Z, in admixture in any proportion. A polyolefin composed entirely of the hydrocarbon backbone of low density polyethylene: LDPE, linear low-density polyethylene: LLDPE, polypropylene: PP or an olefin-based thermoplastic elastomer may also be added to the mixed composition. More specifically, the separator for an electricity storage device without an amorphous crosslinked structure may be a polyolefin microporous membrane having a solid content rate change (hereunder referred to as "gelation degree") of no greater than 10% before and after heating in a decalin solution at 160° C. During measurement of the gelation degree, the solid content is the resin portion alone, containing no other materials such as inorganic substances.

On the other hand, the gelation degree of a polyolefin microporous membrane with an amorphous crosslinked structure, such as a silane crosslinking structure, is preferably 30% or greater and more preferably 70% or greater.

<Membrane Softening Transition Temperature and Membrane Rupture Temperature for Storage Modulus and Loss Modulus (Version 3)>

Using a dynamic viscoelasticity measurement apparatus for solid viscoelasticity measurement of the separator, it is possible to calculate the storage modulus (F), the loss modulus (E") and the membrane softening transition temperature. The conditions for the solid viscoelasticity measurement were the following (i) to (iv).

(i) The dynamic viscoelasticity measurement is carried out under the following conditions:
  - Measuring apparatus: RSA-G2 (TA Instruments)
  - Sample thickness: 200 μm to 400 μm (when the membrane thickness of the sample alone was less than 200 μm, the dynamic viscoelasticity measurement was carried out with multiple samples stacked to a total thickness in the range of 200 μm to 400 μm)
  - Measuring temperature range: −50° C. to 250° C.
  - Temperature-elevating rate: 10° C./min
  - Measuring frequency: 1 Hz
  - Transform mode: sine wave tension mode (linear tension)
  - Initial static tensile load: 0.2 N
  - Initial gap distance (at 25° C.): 10 mm
  - Auto strain adjustment: Disabled.

(ii) The static tensile load is the median value of the maximum stress and minimum stress for each periodic motion, and the sine wave load is the vibrational stress centered on the static tensile load.

(iii) Sine wave tension mode is measurement of the vibrational stress while carrying out periodic motion at a fixed amplitude of 0.1%, wherein in sine wave tension mode, the vibrational stress is measured while varying the gap distance and static tensile load so that the difference between the static tensile load and the sine wave load is within 5%, and when the sine wave load is 0.1 N or lower, the vibrational stress is measured with the static tensile load fixed at 0.1 N.

(iv) The storage modulus (E') and loss modulus (E") are calculated from the relationship between the obtained sine wave load and amplitude value, and the following formulas:

$$\sigma^*=\sigma_0\cdot\text{Exp}[i(\omega t+\delta)],$$

$$\varepsilon^*=\varepsilon_0\cdot\text{Exp}(i\omega t),$$

$$\sigma^*=E^*\cdot\varepsilon^*$$

$$E^*=E'+iE''$$

{where σ*: vibrational stress, ε*: strain, i: imaginary number unit, ω: angular frequency, t: time, δ: phase difference between vibrational stress and strain, E*: complex modulus, E': storage modulus, E": loss modulus, vibrational stress: sine wave load/initial cross-sectional area static tensile load: load at minimum point of vibrational stress for each period (minimum point of gap distance for each period)

sine wave load: difference between measured vibrational stress and static tensile load}.

The average value of the maximum and minimum of E' is calculated as the average E' ($E'_{ave}$), and the mean value of the maximum and minimum of E" is calculated as the average E" ($E"_{ave}$).

Incidentally, for E' and E", the maximum and minimum were calculated for each storage modulus or loss modulus at −50° C. to 250° C. among the dynamic viscoelasticity measurement data. More specifically, when no sample rupture (abrupt reduction in elastic modulus) was observed at −50° C. to 250° C., the maximum and minimum at −50° C. to 250° C. were calculated, and the value at the temperature where sample rupture was observed at −50° C. to 250° C. was recorded as the minimum. In the relevant technical field, the storage modulus and loss modulus are interchangeable as represented by the following formula:

$$\tan \delta = E''/E'$$

{where tan δ represents the loss tangent, E' represents the storage modulus and E" represents the loss modulus}.

The membrane softening transition temperature is the minimum temperature among the dynamic viscoelasticity measurement data at which the curve for the gap distance of the sample is obtained as a first derivative. The membrane rupture temperature is the temperature at which sample rupture (abrupt reduction in elastic modulus) is observed, among the dynamic viscoelasticity measurement data, with the measurement limit temperature sometimes being established at 250° C. from the viewpoint of progression of the thermal decomposition reaction of the polyolefin resin. However, since the same phenomenon can be understood even with measurement at temperatures above 250° C., a separator for an electricity storage device with a membrane rupture temperature of 180° C. or higher can be produced for this embodiment.

<Membrane Rupture Temperature of Layer A>

Using a TMA50™ by Shimadzu Corp. in fixed-length mode, the environmental temperature was varied from 25 to 250° C. and the temperature at the moment that the load was fully released was established as the TMA membrane rupture temperature (the membrane rupture temperature of layer A, measured by TMA).

Specifically, a sample was taken from layer A at 3 mm in the TD and 14 mm in the MD, for use as a sample strip (a sample strip with the long side in the MD). Both ends of the sample strip in the MD were set on a dedicated probe with the chuck distance at 10 mm, and a load of 1.0 g was applied to the sample strip. The furnace in which the test piece had been mounted was increased in temperature, and the membrane rupture temperature (° C.) was recorded as the temperature at which the load was shown to be 0 g.

When measuring a sample strip TD with the long side in the TD, layer A is sampled to 14 mm in the TD and 3 mm in the MD and used as the sample strip, both ends in the TD of the sample are anchored with a chuck to a dedicated probe, the chuck distance is set to 10 mm, an initial load of 1.0 g is applied, and the same procedure as above is carried out.

<Heat Shrinkage Factor at 150° C.>

The laminated stack before formation of the crosslinked structure (the laminated stack comprising layer A and layer B) was sampled at 100 mm in the TD and 100 mm in the MD, for use as a sample strip. The sample strip was allowed to stand for 1 hour in an oven at 150° C. During this time, the sample strip was sandwiched between two sheets so that the warm air did not directly contact with the sample strip. After removing the sample strip from the oven and cooling it, the area of the sample strip was measured, and the heat shrinkage factor at 150° C. (T1) before formation of the crosslinked structure was calculated by the following formula.

$$\text{Heat shrinkage factor at } 150^\circ\text{ C. } (\%) = (10{,}000\ (\text{mm}^2) - \text{area of sample strip after heating } (\text{mm}^2)) \times 100/10{,}000$$

The laminated stack after formation of the crosslinked structure was also sampled to 100 mm in the TD and 100 mm in the MD to obtain a sample strip, and the same procedure as above was carried out, to calculate the heat shrinkage factor at 150° C. (T2) after formation of the crosslinked structure.

The heat shrinkage factor (T2) was divided by the heat shrinkage factor (T1) to obtain the ratio (T2/T1). The value of the ratio (T2/T1) corresponds to the change in the heat shrinkage factor at 150° C. (T2) after formation of the crosslinked structure with respect to the heat shrinkage factor at 150° C. (T1) before formation of the crosslinked structure.

<Battery Destruction Safety Test 1>

Battery destruction safety test 1 is a test in which a battery charged to 4.5 V is hit with an iron nail at a speed of 20 mm/sec and punctured to produce internal short circuiting. This test can measure time-dependent change behavior of voltage reduction of the battery due to internal short circuiting, and battery surface temperature increase behavior due to internal short circuiting, to elucidate these phenomena during internal short circuiting. Inadequate shutdown function of the separator during internal short circuiting or membrane rupture at low temperature can also result in sharp heat release of the battery, which may lead to ignition of the electrolyte solution and fuming and/or explosion of the battery.

(Fabrication of Battery to be Used in Battery Destruction Safety Test 1)

1a. Fabrication of Positive Electrode

A slurry was prepared by sampling 92.2 weight % of lithium cobalt composite oxide ($LiCoO_2$) as a positive electrode active material, 2.3 weight % each of flaky graphite and acetylene black as conductive materials and 3.2 weight % of polyvinylidene fluoride (PVDF) as a resin binder, and dispersing them in N-methylpyrrolidone (NMP). The slurry was coated using a die coater onto one side of a 20 m-thick aluminum foil as the positive electrode collector, and dried at 130° C. for 3 minutes, after which it was compression molded using a roll press. During this time, the active material coating amount on the positive electrode was adjusted to 250 g/m$^2$ and the active material bulk density was adjusted to 3.00 g/cm$^3$.

1b. Fabrication of Negative Electrode

A slurry was prepared by dispersing 96.9 weight % of artificial graphite as a negative electrode active material, 1.4 weight % of carboxymethyl cellulose ammonium salt as a resin binder and 1.7 weight % of styrene-butadiene copolymer latex in purified water. The slurry was coated using a die coater onto one side of a 12 m-thick copper foil as the negative electrode collector, and dried at 120° C. for 3 minutes, after which it was compression molded using a roll press. During this time, the active material coating amount on the negative electrode was adjusted to 106 g/m$^2$ and the active material bulk density was adjusted to 1.35 g/cm$^3$.

1c. Preparation of Nonaqueous Electrolyte Solution

A 1.0 mol/L portion of concentrated $LiPF_6$, as a solute, was dissolved in a mixed solvent of ethylene carbonate: ethylmethyl carbonate=1:2 (volume ratio), to prepare a nonaqueous electrolyte solution.

1d. Battery Assembly

A separator was cut out to 60 mm in the widthwise (TD) direction and 1000 mm in the lengthwise (MD) direction, the separator was folded in a hairpin fashion, and positive electrodes and negative electrodes were alternately stacked between the separator (12 positive electrodes, 13 negative electrodes). The positive electrodes used had areas of 30 mm×50 mm, and the negative electrodes had areas of 32 mm×52 mm. The laminated stack that had been folded in a hairpin fashion was inserted into a laminating bag, and then injected with the nonaqueous electrolyte solution obtained in c. above and sealed. After allowing it to stand at room temperature for 1 day, it was subjected to initial charge of the fabricated battery for a total of 6 hours, by a method of charging to a cell voltage of 4.2 V at a current value of 3 mA (0.5 C) in an atmosphere of 25° C. and, after reaching that voltage, beginning to draw out a current of 3 mA while maintaining 4.2 V. The battery was then discharged to a cell voltage of 3.0 V at a current value of 3 mA (0.5 C).

(Maximum Heat Release Rate)

After puncturing the obtained battery with an iron nail, the battery surface temperature was measured using a thermocouple for a period of 300 seconds and the resulting temperature change graph was used to determine the rate during which the change in temperature increase per second was greatest, as the maximum heat release rate.

(Voltage Reduction Time)

The time required for voltage reduction from 4.5 V to 3 V after puncturing the obtained battery with an iron nail was established as the voltage reduction time (3 V reduction time).

<Cycle Characteristic Evaluation and Battery Fabrication Method>

A battery for evaluation of cycle characteristics was fabricated by the same method as in 1a. to 1c. above for the method of fabricating a battery used in <Battery destruction safety test 1>, but with the assembly described in 1d-2. below.

1d-2. Battery Assembly

The separator was cut out to a circle with a diameter of 18 mm and the positive electrode and negative electrode to circles with diameters of 16 mm, and the positive electrode, separator and negative electrode were stacked in that order with the active material sides of the positive electrode and negative electrode facing each other, after which they were housed in a covered stainless steel metal container. The container and cover were insulated, with the container in contact with the negative electrode copper foil and the cover in contact with the positive electrode aluminum foil. The nonaqueous electrolyte solution obtained in 1c. under <Battery destruction safety test 1> above was injected into the container, which was then sealed. After allowing it to stand at room temperature for 1 day, it was subjected to initial charge of the fabricated battery for a total of 6 hours, by a method of charging to a cell voltage of 4.2 V at a current value of 3 mA (0.5 C) in an atmosphere of 25° C. and, after reaching that voltage, beginning to draw out a current of 3 mA while maintaining 4.2 V. The battery was then discharged to a cell voltage of 3.0 V at a current value of 3 mA (0.5 C).

Charge-discharge of the obtained battery was carried out for 100 cycles in an atmosphere of 60° C. Charging was for a total of 3 hours, by a method of charging to a cell voltage of 4.2 V at a current value of 6.0 mA (1.0 C) and, after reaching that voltage, beginning to draw out a current of 6.0 mA while maintaining 4.2 V. Discharge was to a cell voltage of 3.0 V at a current value of 6.0 mA (1.0 C).

(Cycle Characteristic Evaluation 1)

The capacity retention was calculated from the service capacity at the 100th cycle and the service capacity at the first cycle. A high capacity retention was evaluated as a satisfactory cycle characteristic.

(Cycle Characteristic Evaluation 2)

The capacity retention (%) was calculated from the service capacity at the 300th cycle and the service capacity at the first cycle, based on the following formula. A high capacity retention was evaluated as a satisfactory cycle characteristic.

Evaluation result (%)=(100×retention volume after 300 cycles/service capacity at first cycle)

<Fuse/Meltdown (F/MD) Characteristic>

(i) Pressure of 0.5 MPa and Temperature-Elevating Rate of 2° C./Min

A circular positive electrode, separator and negative electrode with diameters of 200 mm were cut out and stacked, and a nonaqueous electrolyte solution was added to the obtained laminated stack and allowed to thoroughly permeate it. The laminated stack is inserted between the center section of a circular aluminum heater with a diameter of 600 mm, and the aluminum heater is pressed vertically with a hydraulic jack to 0.5 MPa, thus completing preparation for the measurement. The laminated stack is heated with the aluminum heater at a temperature-elevating rate of 2° C./min while measuring the resistance (Ω) between the electrodes. Resistance between the electrodes increases with fusing of the separator, and the temperature when the resistance first exceeds 1000Ω is recorded as the fuse temperature (shutdown temperature). Heating is continued, and the temperature when the resistance falls below 1000Ω is recorded as the meltdown temperature (membrane rupture temperature).

(ii) Maximum Pressurization of 10 MPa and Temperature-Elevating Rate of 15° C./Min A circular positive electrode, separator and negative electrode with diameters of 200 mm were cut out and stacked, and a nonaqueous electrolyte solution was added to the obtained laminated stack and allowed to thoroughly permeate it. The laminated stack was inserted between the center section of a circular aluminum heater with a diameter of 600 mm, and the aluminum heater was pressed vertically with a hydraulic jack to a pressure of 10 MPa, thus completing preparation for the measurement. The laminated stack was heated with the aluminum heater at a temperature-elevating rate of 15° C./min while measuring the resistance (Q) between the electrodes. Resistance between the electrodes increased, and the temperature when the resistance first exceeded 1000Ω was recorded as the shutdown temperature (° C.). Heating was further continued, and the temperature when the resistance fell below 1000Ω was recorded as the meltdown temperature (° C.).

For the evaluations of both (i) and (ii), a resistance measurement wire was bonded with conductive silver paste behind the aluminum foil of the positive electrode fabricated according to "1a. Fabrication of positive electrode" under <Battery destruction safety test 1> above. In addition, a resistance measurement wire was bonded with conductive silver paste behind the negative electrode copper foil fabricated according to "1b. Fabrication of negative electrode"

under <Battery destruction safety test 1> above. An electrolyte-containing solution prepared according to "1c. Preparation of nonaqueous electrolyte solution" under <Battery destruction safety test 1> above was also used for the F/MD property test.

<Safety Test (Nail Penetration Test) 2>

2a. Fabrication of Positive Electrode

After mixing 90.4 weight % of a nickel, manganese and cobalt composite oxide (NMC) (Ni:Mn:Co=1:1:1 (element ratio), density: 4.70 g/cm$^3$), as the positive electrode active material, 1.6 weight % of graphite powder (KS6) (density: 2.26 g/cm$^3$, number-mean particle size: 6.5 μm) and 3.8 weight % of acetylene black powder (AB) (density: 1.95 g/cm$^3$, number-mean particle size: 48 nm), as conductive aids, and 4.2 weight % of PVDF (density: 1.75 g/cm$^3$) as a resin binder, the mixture was dispersed in NMP to prepare a slurry. The slurry was coated using a die coater onto one side of a 20 μm-thick aluminum foil sheet as the positive electrode collector, and dried at 130° C. for 3 minutes, after which it was compression molded using a roll press, to fabricate a positive electrode. The coating amount of the positive electrode active material was 109 g/m$^2$.

2b. Fabrication of Negative Electrode

In purified water there were dispersed 87.6 weight % of graphite powder A (density: 2.23 g/cm$^3$, number-mean particle size: 12.7 μm) and 9.7 weight % of graphite powder B (density: 2.27 g/cm$^3$, number-mean particle size: 6.5 μm) as negative electrode active materials, and 1.4 (solid) weight % of carboxymethyl cellulose ammonium salt (1.83 weight % solid concentration aqueous solution) and 1.7 (solid) weight % of diene rubber latex (40 weight % solid concentration aqueous solution) as resin binders, to prepare a slurry. The slurry was coated using a die coater onto one side of a 12 μm-thick copper foil sheet as the negative electrode collector, and dried at 120° C. for 3 minutes, after which it was compression molded using a roll press to fabricate a negative electrode. The coating amount of the negative electrode active material was 52 g/m$^2$.

2c. Preparation of Nonaqueous Electrolyte Solution

A 1.0 mol/L portion of concentrated $LiPF_6$, as a solute, was dissolved in a mixed solvent of ethylene carbonate:ethyl methyl carbonate=1:2 (volume ratio), to prepare a nonaqueous electrolyte solution.

2d. Fabrication of Battery

The positive electrode, negative electrode and nonaqueous electrolyte solution obtained in 2a to 2c above, and a separator (a separator of the Examples or a separator of the Comparative Examples) were used to fabricate a laminated secondary battery with a size of 100 mm×60 mm and a capacity of 3 Ah, which was charged with constant current, constant voltage (CCCV) over a period of 3 hours under conditions with a current value of 1 A (0.3 C) and a final cell voltage of 4.2 V.

2e. Nail Penetration Evaluation

The fabricated laminated secondary battery was set on a steel sheet in a temperature-adjustable explosion-proof booth. Setting the explosion-proof booth interior to a temperature of 40° C., the center section of the laminated secondary battery was punctured with an iron nail having a diameter of 3.0 mm at a speed of 2 mm/sec, and the nail was left in the punctured state. A thermocouple had been set inside the nail so as to allow measurement inside the laminated battery after puncturing with the nail, and its temperature was measured and the presence or absence of ignition was evaluated.

The evaluation was repeated using laminated secondary batteries newly fabricated by the same method, and the number of samples without ignition (no ignition) was calculated as a percentage value by the following formula.

$$\text{Evaluation result (\%)}=(100\times\text{number of samples without ignition}/\text{total number of samples})$$

The passing rate in the nail penetration evaluation is preferably 50% or greater with 200 cycles and 5% or greater with 1000 cycles.

Experiment Group I

[Silane Graft-Modified Polyolefin Production Method]

The polyolefin starting material to be used as the silane graft-modified polyolefin may be one with a viscosity-average molecular weight (Mv) of 100,000 to 1,000,000, a weight-average molecular weight (Mw) of 30,000 to 920,000, and a number-average molecular weight of 10,000 to 150,000, and it may be propylene or a butene-copolymerized α-olefin. After melt kneading the polyethylene starting material with an extruder while adding an organic peroxide (di-t-butyl peroxide) and generating radicals in the polymer chain of the α-olefin, it is filled with trimethoxyalkoxide-substituted vinylsilane and addition reaction is carried out to introduce alkoxysilyl groups into the α-olefin polymer, forming a silane-graft structure. A suitable amount of an antioxidant (pentaerythritoltetrakis[3-(3,5-di-t-butyl-4-hydroxyphenyl)propionate]) is simultaneously added to adjust the radical concentration in the system, thus inhibiting chain-style chain reaction (gelation) in the α-olefin. The obtained silane-grafted polyolefin molten resin is cooled in water and pelletized, after which it is heat-dried at 80° C. for 2 days and the water and unreacted trimethoxyalkoxide-substituted vinylsilane are removed. The residual concentration of the unreacted trimethoxyalkoxide-substituted vinylsilane in the pellets is about 10 to 1500 ppm.

The silane graft-modified polyolefin obtained by this method is used as the "Silane-modified polyethylene (B)" in Table 8.

Example I-1

To 79.2 weight % of polyethylene homopolymer (A) with a weight-average molecular weight of 500,000 there was added 19.8 weight % of silane-grafted polyethylene (silane-modified polyethylene (B)) with an MFR (190° C.) of 0.4 g/min, obtained using a polyolefin with a viscosity-average molecular weight of 20,000 as starting material and modification reaction with trimethoxyalkoxide-substituted vinylsilane (the respective contents of resin compositions (A) and (B) thus being 0.8 and 0.2), and 1 weight % of pentaerythrityl-tetrakis-[3-(3,5-di-t-butyl-4-hydroxyphenyl)propionate] as an antioxidant, and these were dry blended using a tumbler blender to obtain a mixture. The obtained mixture was supplied to a twin-screw extruder through a feeder, under a nitrogen atmosphere. Also, liquid paraffin (kinematic viscosity at 37.78° C.: $7.59\times10^{-5}$ m$^2$/s) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 weight % (i.e. a polymer concentration of 30 weight %). The melt kneading conditions were a preset temperature of 220° C., a screw rotational speed of 240 rpm and a discharge throughput of 18 kg/h.

The melt kneaded mixture was then extrusion cast through a T-die onto a cooling roll controlled to a surface temperature of 25° C., to obtain a gel sheet (molded sheet) with a raw membrane thickness of 1400 μm.

The molded sheet was then simultaneously fed into a biaxial tenter stretching machine for biaxial stretching, to obtain a stretched sheet. The stretching conditions were an MD factor of 7.0, a TD factor of 6.0 (i.e. a factor of 7×6), and a biaxial stretching temperature of 125° C.

The stretched gel sheet was subsequently fed into a methyl ethyl ketone tank and thoroughly immersed in the methyl ethyl ketone for extraction removal of the liquid paraffin, after which the methyl ethyl ketone was dried off to obtain a porous body.

The porous body to be subjected to heat setting (HS) was fed to a TD tenter and HS was carried out at a heat setting temperature of 125° C. and a stretch ratio of 1.8, after which relaxation was carried out to a factor of 0.5 in the TD direction (i.e. the HS relaxation factor was 0.5), to obtain a microporous membrane.

The obtained microporous membrane was then cut at the edges and wound up as a mother roll with a width of 1,100 mm and a length of 5,000 m.

During the evaluation, the microporous membrane wound out from the mother roll was slit as necessary for use as the evaluation separator A.

Examples I-2 to I-6

The microporous membranes listed in Table 8 were obtained by the same procedure as Example I-1, except for changing the quantity ratio of components A and B and the crosslinking method and conditions as shown in Table 8.

Comparative Examples I-1 and I-2

To 79.2 weight % of polyethylene homopolymer (A) with a weight-average molecular weight of 500,000 there was added 19.8 weight % of silane-grafted polyethylene (silane-modified polyethylene (B)) with an MFR (190° C.) of 0.4 g/min, obtained using a polyolefin with a viscosity-average molecular weight of 20,000 as starting material and modification reaction with trimethoxyalkoxide-substituted vinylsilane (the respective contents of resin compositions (A) and (B) thus being 0.8 and 0.2), and 1 weight % of pentaerythrityl-tetrakis-[3-(3,5-di-t-butyl-4-hydroxyphenyl)propionate] as an antioxidant, and these were dry blended using a tumbler blender to obtain a mixture. The obtained mixture was supplied to a twin-screw extruder through a feeder, under a nitrogen atmosphere. Also, liquid paraffin (kinematic viscosity at 37.78° C.: $7.59\times10^{-5}$ $m^2/s$) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 weight % (i.e. a polymer concentration of 30 weight %). The melt kneading conditions were a preset temperature of 220° C., a screw rotational speed of 240 rpm and a discharge throughput of 18 kg/h.

The melt kneaded mixture was then extrusion cast through a T-die onto a cooling roll controlled to a surface temperature of 25° C., to obtain a gel sheet (molded sheet) with a raw membrane thickness of 1400 μm.

The molded sheet was then simultaneously fed into a biaxial tenter stretching machine for biaxial stretching, to obtain a stretched sheet. The stretching conditions were an MD factor of 7.0, a TD factor of 6.0 (i.e. a factor of 7×6), and a biaxial stretching temperature of 125° C.

The stretched gel sheet was subsequently fed into a methyl ethyl ketone tank and thoroughly immersed in the methyl ethyl ketone for extraction removal of the liquid paraffin, after which the methyl ethyl ketone was dried off to obtain a porous body.

The porous body to be subjected to heat setting (HS) was fed to a TD tenter and HS was carried out at a heat setting temperature of 125° C. and a stretch ratio of 1.8, after which relaxation was carried out to a factor of 0.5 in the TD direction (i.e. the HS relaxation factor was 0.5).

It was also fed into an ethanol bath (affinity treatment tank) and immersed and retained for 60 seconds for affinity treatment of the heat-treated porous body to obtain an affinity-treated porous body.

Each affinity-treated porous body was also fed, immersed and retained for 60 seconds in a 25% aqueous caustic soda solution (temperature: 80° C., pH 8.5 to 14) for Comparative Example I-1 and in an aqueous 10% hydrochloric acid solution (temperature: 60° C., pH 1 to 6.5) for Comparative Example I-2, for crosslinking treatment of the affinity-treated porous body, to obtain a crosslinked porous body.

The crosslinked porous body was fed into water (washing treatment tank) and immersed and retained for 60 seconds for washing of the crosslinked porous body. It was then fed to a conveyor dryer and dried at 120° C. for 60 seconds to obtain a microporous membrane.

The obtained microporous membrane was then cut at the edges and wound up as a mother roll with a width of 1,100 mm and a length of 5,000 m.

During the evaluation, the microporous membrane wound out from the mother roll was slit as necessary for use as the evaluation separator A.

[Evaluation Results]

Figure 3:
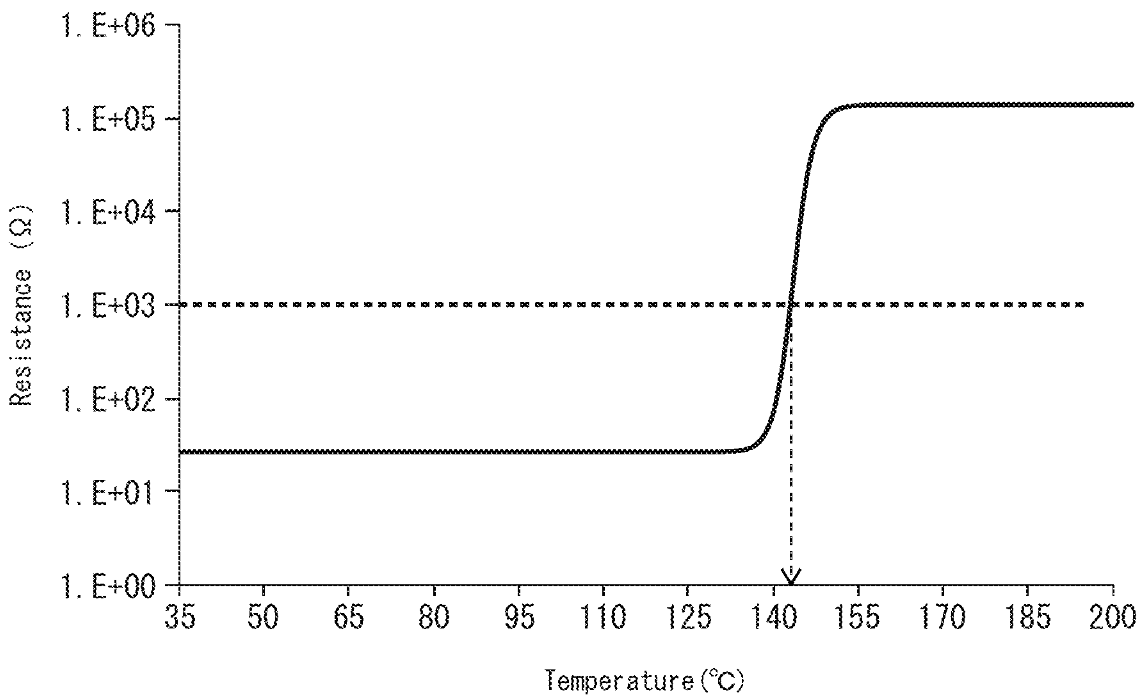
FIG. 3 is a graph showing the relationship between temperature and resistance for an electricity storage device comprising the separator obtained in Example I-1.

The microporous membranes and batteries obtained in Examples I-1 to I-6 and Comparative Examples I-1 and I-2 were evaluated by each of the evaluation methods described above, and the evaluation results are shown in Table 8. FIG. 3 shows the relationship between temperature and resistance for a battery comprising the microporous membrane obtained in Example I-1 as the separator. FIG. 3 and Table 8 show that the shutdown temperature of the separator obtained in Example I-1 is 143° C. and the membrane rupture temperature is 200° C. FIG. 13 shows an $^{1}$H and $^{13}$C-NMR chart (b) for the separator obtained in Example I-1, in the state before crosslinking.

TABLE 8

| | | | | Example I | | | | | | Comparative Example I | |
|---|---|---|---|---|---|---|---|---|---|---|---|
| | | | | 1 | 2 | 3 | 4 | 5 | 6 | 1 | 2 |
| Microporous membrane | Resin composition | Polyethylene(A) | Weight ratio | 0.8 | 0.94 | 0.62 | 0.96 | 0.58 | 0 | 0.8 | 0.8 |
| | | Silane-modified polyethylene(B) | Weight ratio | 0.2 | 0.06 | 0.38 | 0.04 | 0.42 | 1 | 0.2 | 0.2 |
| | Kneading temperature | | ° C. | 220 | 220 | 220 | 220 | 220 | 220 | 220 | 220 |
| | Crosslinking method | Method | | — | — | — | — | — | — | Alkali treatment | Acid treatment |
| | | Crosslinking reaction timing | | | | | | | | After pore formation | After pore formation |
| | | Reagent | | | | | | | | NaOHaq | HClaq |
| | | Temperature | ° C. | | | | | | | 80 | 60 |
| | | pH | | | | | | | | 8.5 to 14 | 1 to 6.5 |
| | Basic separator properties | Membrane thickness | um | 11 | 11 | 11 | 11 | 10.5 | 9 | 11 | 11 |
| | | Porosity (i) | % | 40 | 39 | 40 | 38 | 42 | 39 | 40 | 40 |
| | | Air permeability | sec/100 $cm^3$ | 160 | 170 | 163 | 161 | 180 | 195 | 160 | 160 |
| | Shutdown/rupture resistance | Shutdown temperature (i) | ° C. | 143 | 142 | 143 | 153 | 178 | 179 | 165 | 171 |
| | | Membrane rupture temperature (i) | ° C. | ≥200 | ≥200 | ≥200 | 160 | ≥200 | ≥200 | ≥200 | ≥200 |
| | Resin aggregates in separator | | /1000 $m^2$ | 2 | 3 | 2 | 1 | 562 | 890 | 2 | 2 |
| | Storage modulus change factor, ver. 1 | RΔE' | Factor | 2.1 | 1.7 | 16 | 1.1 | 23 | 23 | 22 | 25 |
| | | RE'mix | Factor | 8.5 | 2.1 | 15 | 1.1 | 23 | 23 | 21.5 | 24 |
| | Loss modulus change factor, ver. 1 | RΔE" | Factor | 1.9 | 1.6 | 15 | 1.1 | 22.5 | 22.5 | 21 | 24.5 |
| | | RE"mix | Factor | 6.2 | 3 | 13 | 1.1 | 22 | 22 | 20.3 | 22 |
| | Transition temperature calculated by storage modulus ver. 1 | | ° C. | 143 | 140 | 142 | 151 | 134 | 133 | 155 | 157 |
| Battery | Crosslinking method | | | Contact with electrolyte solution until initial charge-discharge | Contact with electrolyte solution until initial charge-discharge | Contact with electrolyte solution until initial charge-discharge | Contact with electrolyte solution until initial charge-discharge | Contact with electrolyte solution until initial charge-discharge | Contact with electrolyte solution until initial charge-discharge | — | — |
| | Battery cycle stability 1 | | % | 98 | 97 | 98 | 78 | 75 | 70 | 65 | 63 |
| | Battery destruction safety 1 | Internal maximum heat release rate | ° C./sec | 6 | 9 | 8 | 12 | 13 | 15 | 27 | 29 |
| | | Voltage reduction (3 V reduction time) | sec | >300 | >300 | >300 | 210 | 224 | 232 | 3 | 1 |

The "silane-modified polyethylene (B)" in Table 8 is a silane-modified polyethylene with a density of 0.95 g/cm$^3$ and a melt mass flow rate (MFR) of 0.4 g/min at 190° C., obtained by modification reaction with a trimethoxyalkoxide-substituted vinylsilane, using a polyolefin with a viscosity-average molecular weight of 20,000 as the starting material.

Experiment Group IIa

[Silane Graft-Modified Polyolefin Production Method]

The polyolefin starting material to be used as the silane graft-modified polyolefin may be one with a viscosity-average molecular weight (Mv) of 100,000 to 1,000,000, a weight-average molecular weight (Mw) of 30,000 to 920,000, and a number-average molecular weight of 10,000 to 150,000, and it may be ethylene homopolymer, or a copolymerized α-olefin of ethylene and propylene or butene. After melt kneading the polyethylene starting material with an extruder while adding an organic peroxide (di-t-butyl peroxide) and generating radicals in the polymer chain of the α-olefin, it is filled with trimethoxyalkoxide-substituted vinylsilane and addition reaction is carried out to introduce alkoxysilyl groups into the α-olefin polymer, forming a silane-graft structure. A suitable amount of an antioxidant (pentaerythritoltetrakis[3-(3,5-di-t-butyl-4-hydroxyphenyl) propionate]) is simultaneously added to adjust the radical concentration in the system, thus inhibiting chain-style chain reaction (gelation) in the α-olefin. The obtained silane-grafted polyolefin molten resin is cooled in water and pelletized, after which it is heat-dried at 80° C. for 2 days and the water and unreacted trimethoxyalkoxide-substituted vinylsilane are removed. The residual concentration of the unreacted trimethoxyalkoxide-substituted vinylsilane in the pellets is about 1500 ppm or lower.

The silane graft-modified polyethylene obtained by this method is used as the "Silane-modified polyethylene (B)" in Table 9.

Example II-1

To 80 weight % of polyethylene homopolymer with a weight-average molecular weight of 700,000 (polyethylene (A)) there was added 20 weight % of silane-grafted polyethylene (silane-modified polyethylene (B)) with an MFR (190° C.) of 0.4 g/min, obtained using a polyolefin with a viscosity-average molecular weight of 10,000 as starting material and modification reaction with trimethoxyalkoxide-substituted vinylsilane (the respective contents of resin compositions (A) and (B) thus being 80% and 20%), and 1 weight % of pentaerythrityl-tetrakis-[3-(3,5-di-t-butyl-4-hydroxyphenyl)propionate] as an antioxidant, and these were dry blended using a tumbler blender to obtain a mixture. The obtained mixture was supplied to a twin-screw extruder through a feeder, under a nitrogen atmosphere. Also, liquid paraffin (kinematic viscosity at 37.78° C.: $7.59\times10^{-5}$ m$^2$/s) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 weight % (i.e. a polymer concentration of 30 weight %). The melt kneading conditions were a preset temperature of 220° C., a screw rotational speed of 240 rpm and a discharge throughput of 18 kg/h.

The melt kneaded mixture was then extrusion cast through a T-die onto a cooling roll controlled to a surface temperature of 25° C., to obtain a gel sheet (molded sheet) with a raw membrane thickness of 1100 μm.

The molded sheet was simultaneously fed into a biaxial tenter stretching machine for biaxial stretching, to obtain a stretched sheet. The stretching conditions were an MD factor of 7.0, a TD factor of 6.2 and a biaxial stretching temperature of 120° C.

The stretched gel sheet was then fed into a dichloromethane tank and thoroughly immersed in the dichloromethane for extraction removal of the liquid paraffin, after which the dichloromethane was dried off to obtain a porous body.

The porous body to be subjected to heat setting (HS) was fed to a TD tenter and HS was carried out at a heat setting temperature of 133° C. and a stretch ratio of 2.1, after which relaxation was carried out to a factor of 2.0 in the TD direction.

The obtained microporous membrane was then cut at the edges and wound up as a mother roll with a width of 1,100 mm and a length of 5,000 m.

During the evaluation, the microporous membrane wound out from the mother roll was slit as necessary for use as the evaluation separator A.

Examples II-2 to II-8 and Comparative Examples II-1 to II-3

The microporous membranes listed in Table 9 were obtained by the same procedure as Example II-1, except for changing the quantity ratio of components A and B, the other resin (C) as an additional component, the membrane properties and the crosslinking method and conditions as shown in Table 9. As component "PP" in Table 9 there was used non-silane-modified polypropylene having an MFR of 2.5 g/10 min or lower and a density of 0.89 g/cm$^3$ or greater, as measured under conditions with a temperature of 230° C. and a weight of 2.16 kg. For the "alkali treatment crosslinking" as the crosslinking method in Table 9, the sample was treated with a 25% aqueous caustic soda solution (temperature: 80° C., pH 8.5 to 14).

[Evaluation Results]

Figure 4:
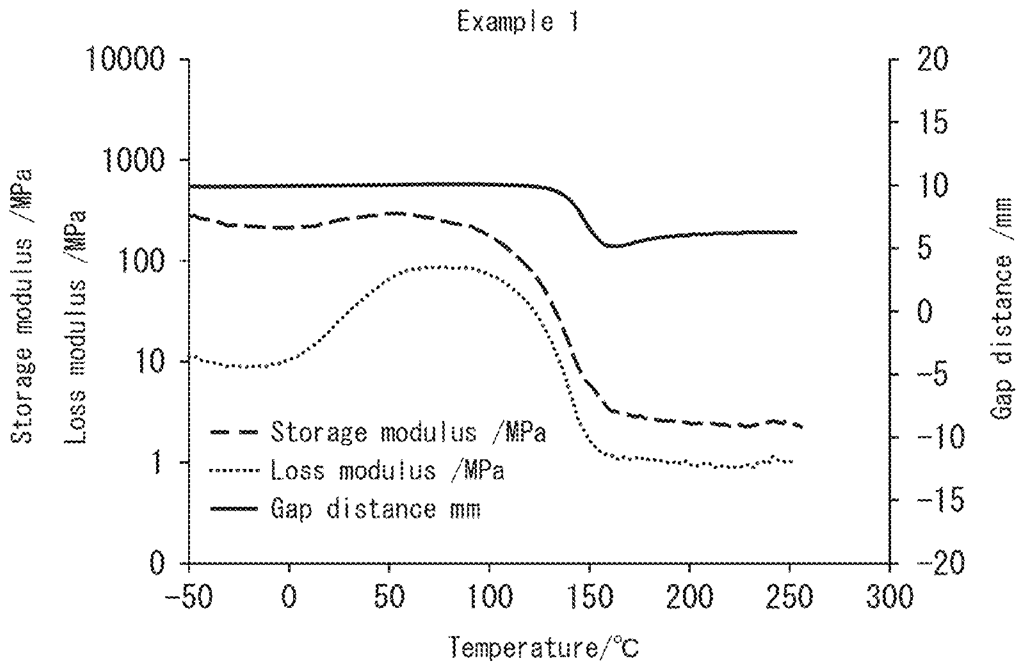
FIG. 4 is a graph illustrating the relationship between the temperature, gap distance, storage modulus and loss modulus in viscoelasticity measurement of a separator for an electricity storage device, with graph (a) for Example II-1 and graph (b) for Comparative Example II-1.
Figure 4:
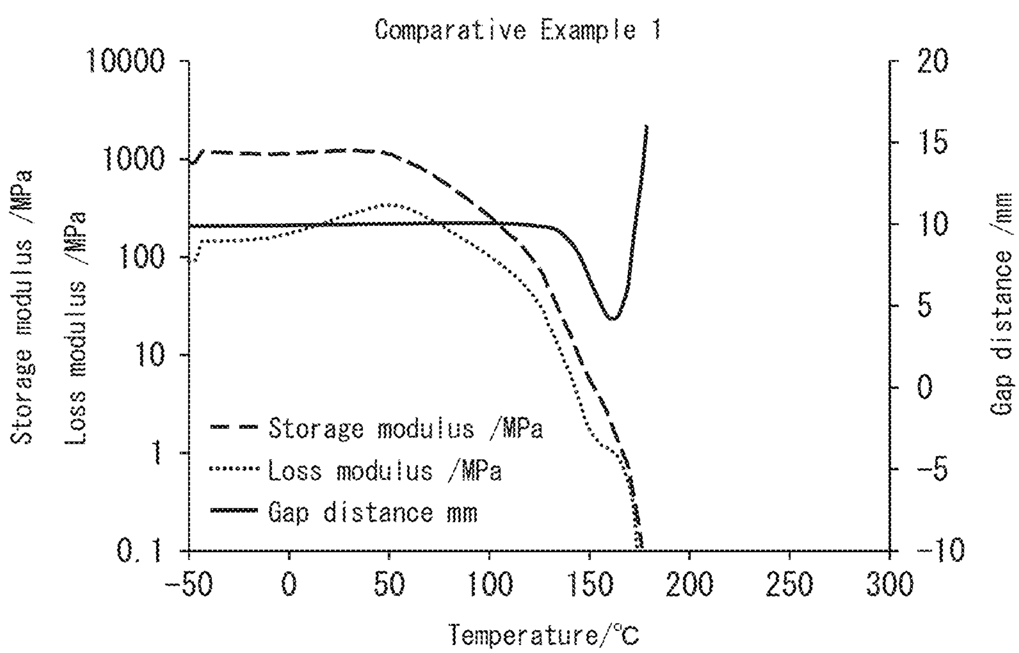
Figure 5:
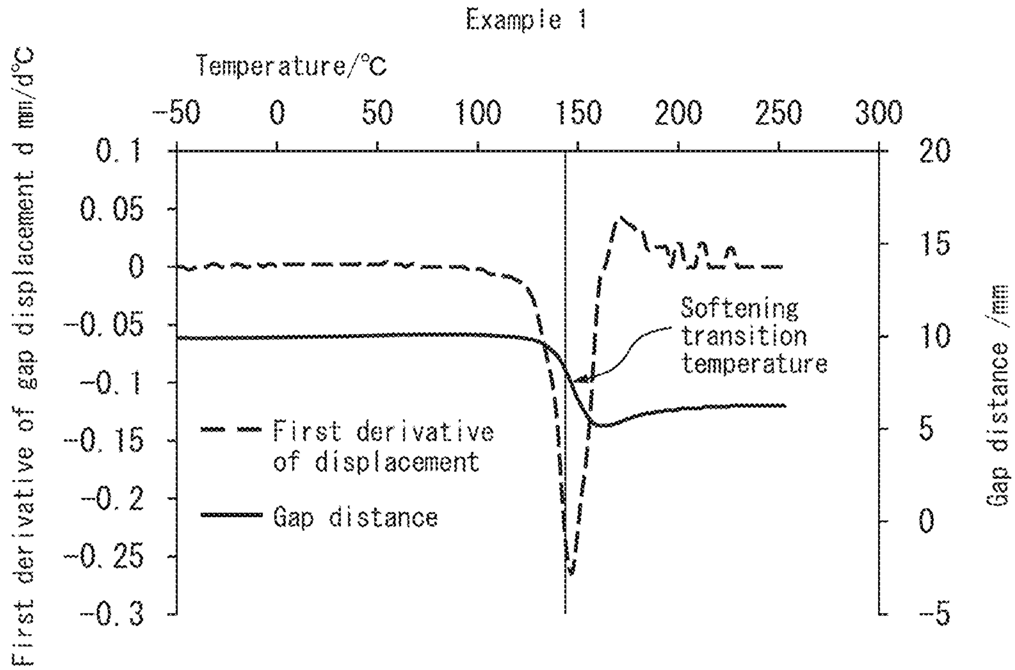
FIG. 5 is a graph for determining the membrane softening transition temperature in viscoelasticity measurement of a separator for an electricity storage device, based on temperature, gap distance and first derivative of gap displacement, with graph (a) for Example II-1 and graph (b) for Comparative Example II-1.
Figure 5:
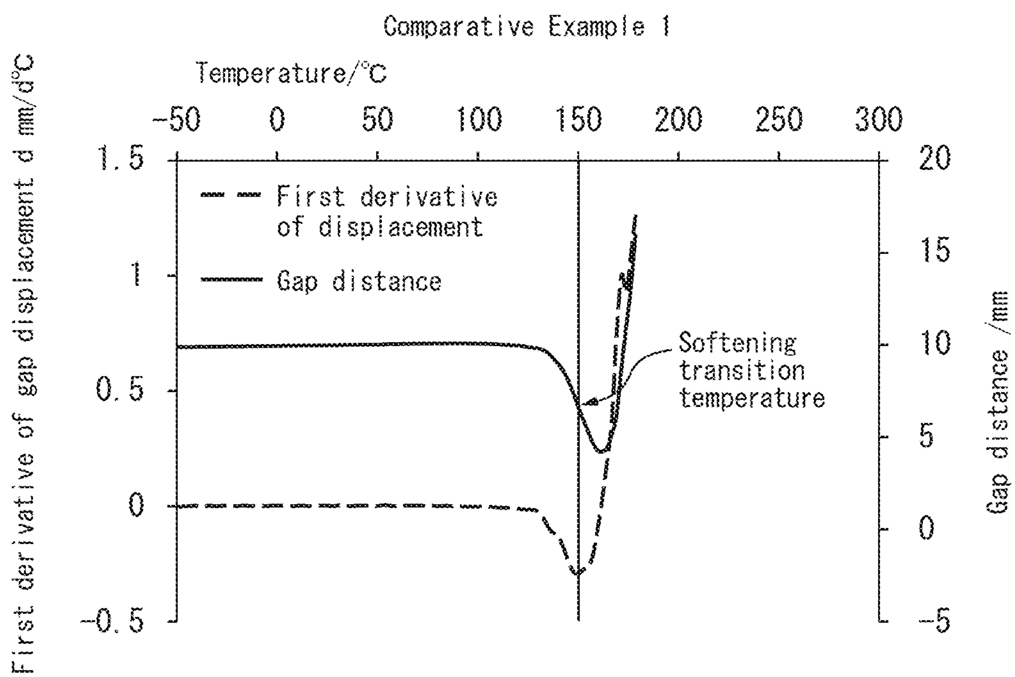

The microporous membranes and batteries obtained in Examples II-1 to 11-8 and Comparative Examples II-1 and 11-3 were evaluated by each of the evaluation methods described above, and the evaluation results are shown in Table 9. Viscoelasticity measurement was carried out using the obtained microporous membrane as the separator for an electricity storage device, and the relationship between temperature, gap distance, storage modulus and loss modulus is shown in FIG. 4(*a*) for Example II-1 and in FIG. 4(*b*) for Comparative Example II-1, while the membrane softening transition temperature determined based on temperature, gap distance and first derivative of the gap displacement is shown in FIG. 5(*a*) for Example II-1 and FIG. 5(*b*) for Comparative Example II-1. In Example II-1 to 11-8 and Comparative Example II-3, no membrane rupture was observed at a measurement limit temperature of 250° C. In Example II-1 and Comparative Example II-1, the storage modulus, loss modulus, membrane softening transition temperature and membrane rupture temperature were measured using 26 membranes each with a thickness of 8 μm, stacked for a total sample membrane thickness of 208 μm.

TABLE 9

| | | | | | Example II | | | | | | | | Comparative Example II | | |
|---|---|---|---|---|---|---|---|---|---|---|---|---|---|---|---|
| | | | | | 1 | 2 | 3 | 4 | 5 | 6 | 7 | 8 | 1 | 2 | 3 |
| Microporous membrane | Resin composition | Polyethvlene(A) | | weight % | 80 | 20 | 99 | 80 | 80 | 12 | 35 | 80 | 100 | 100 | 2 |
| | | Silane-modified polyethylene(B) | | weight % | 20 | 80 | 1 | 20 | 20 | 83 | 40 | 20 | 0 | 0 | 70 |
| | | Other resin (C) | | weight % | 0 | 0 | 0 | 0 | 0 | PP/5 | PP/25 | 0 | 0 | 0 | PP/28 |
| | Basic separator properties | Membrane thickness | | μm | 8 | 11 | 8 | 8 | 12 | 8 | 12 | 8 | 8 | 8 | 10 |
| | | Porosity (i) | | % | 40 | 38 | 35 | 39 | 35 | 41 | 32 | 40 | 39 | 42 | 33 |
| | | Air permeability | | sec/100 $cm^3$ | 150 | 156 | 155 | 120 | 122 | 117 | 121 | 150 | 155 | 152 | 175 |
| | Separator solid viscoelasticity ver. 3 data | Maximum elastic modulus, −50 to 250° C. | Storage modulus (E') | MPa | 295 | 9,500 | 310 | 271 | 7,500 | 233 | 7,700 | 305 | 1,230 | 17,500 | 18,000 |
| | | | Loss modulus (E") | MPa | 87 | 3,200 | 75 | 56 | 5,300 | 74 | 4,850 | 88 | 338 | 10,100 | 10,150 |
| | | Minimum elastic modulus, −50 to 250° C. | Storage modulus (E') | MPa | 2.28 | 1.80 | 2.30 | 1.18 | 1.77 | 1.15 | 3.32 | 2.21 | 0.11 | 0.10 | 23.00 |
| | | | Loss modulus (E") | MPa | 0.89 | 0.40 | 0.70 | 0.80 | 0.91 | 0.53 | 1.63 | 1.02 | 0.07 | 0.06 | 12.70 |
| | | Maximum elastic modulus, membrane softening transition temperature to 250° C. | Storage modulus (E') | MPa | 7.17 | 7.30 | 35.50 | 6.80 | 8.20 | 32.20 | 27.40 | 7.30 | 6.94 | 6.80 | 83.00 |
| | | | Loss modulus (E") | MPa | 2.16 | 2.11 | 11.20 | 2.03 | 3.23 | 12.80 | 11.20 | 2.21 | 2.19 | 2.11 | 53.50 |
| | | Minimum elastic modulus, membrane softening transition temperature to 250° C. | Storage modulus (E') | MPa | 2.28 | 1.80 | 2.30 | 1.18 | 1.77 | 1.15 | 3.32 | 2.35 | 0.11 | 0.10 | 23.00 |
| | | | Loss modulus (E") | MPa | 0.89 | 0.40 | 0.70 | 0.80 | 0.91 | 0.53 | 1.63 | 0.75 | 0.07 | 0.06 | 12.70 |
| | | Membrane softening transition temperature | | ° C. | 147 | 149 | 149 | 132 | 155 | 131 | 154 | 146 | 148 | 148 | 155 |
| | | Membrane rupture temperature | | ° C. | No membrane rupture at 250 | No membrane rupture at 250 | No membrane rupture at 250 | No membrane rupture at 250 | No membrane rupture at 250 | No membrane rupture at 250 | No membrane rupture at 250 | No membrane rupture at 250 | 176 | 178 | No membrane rupture at 250 |
| | Resin aggregates in separator | | | /1000 $m^2$ | 0 | 1 | 0 | 5 | 3 | 8 | 7 | 0 | 0 | 330 | 553 |

TABLE 9-continued

| | | | | | Example II | | | | | | | | Comparative Example II | | |
|---|---|---|---|---|---|---|---|---|---|---|---|---|---|---|---|
| | | | | | 1 | 2 | 3 | 4 | 5 | 6 | 7 | 8 | 1 | 2 | 3 |
| Battery | Crosslinking method | | | | Contact with electrolyte solution until initial charge-discharge | Contact with electrolyte solution until initial charge-discharge | Contact with electrolyte solution until initial charge-discharge | Contact with electrolyte solution until initial charge-discharge | Contact with electrolyte solution until initial charge-discharge | Contact with electrolyte solution until initial charge-discharge | Contact with electrolyte solution until initial charge-discharge | Alkali treatment crosslinking | | | |
| | Battery cycle stability 1 | | | % | 99 | 97 | 98 | 93 | 91 | 81 | 72 | 99 | 87 | 42 | 56 |
| | Passing rate in battery safety test 1 | | | % | 95 | 96 | 87 | 83 | 81 | 72 | 75 | 93 | 0 | 0 | 38 |
| Microporous membrane | Separator solid viscoelasticity ver. 3 data | Membrane softening transition temperature to 250° C. | Mean storage modulus ($E'_{ave}$) | MPa | 4.725 | 4.550 | 18.90 | 3.99 | 4.985 | 16.675 | 15.36 | 4.825 | 3.525 | 3.45 | 53 |
| | | | Mean loss modulus ($E''_{ave}$) | MPa | 1.525 | 1.255 | 5.95 | 1.415 | 2.07 | 6.665 | 6.415 | 1.48 | 1.13 | 1.085 | 33.1 |

Experiment Series IIb

[Reference Membrane]

As a separator for an electricity storage device not containing a silane-modified polyolefin (hereunder referred to as "reference membrane") there was used a non-silane-graft-modified polyolefin microporous membrane having a solid content rate change (hereunder referred to as "gelation degree") of about 0%, before and after heating in a decalin solution at 160° C. During measurement of the gelation degree, the solid content is the resin portion alone, containing no other materials such as inorganic substances.

For the purpose of the present specification, the separator for an electricity storage device not containing a silane graft-modified polyolefin may be one produced using any type selected from the group consisting of polyethylene (PE): X (viscosity-average molecular weight: 100,000 to 400,000), PE: Y (viscosity-average molecular weight: 400,000 to 800,000) and PE: Z (viscosity-average molecular weight: 800,000 to 9,000,000), or two, three or more types selected from the group consisting of X, Y and Z, in admixture in any proportion. A polyolefin composed entirely of the hydrocarbon backbone of low density polyethylene: LDPE, linear low-density polyethylene: LLDPE, polypropylene: PP or an olefin-based thermoplastic elastomer may also be added to the mixed composition.

[Crosslinked Membrane]

As a separator for an electricity storage device after silane crosslinking reaction (hereunder referred to as "crosslinked membrane") there was used the polyolefin microporous membrane of Example II-1 after contact with the electrolyte solution as described above, or the polyolefin microporous membrane of Example II-1 that had been removed from the cell after initial charge-discharge and dried. The gelation degree of the crosslinked membrane was 30% or 70%.

[Viscoelastic Behavior]

A reference membrane and crosslinked membrane were subjected to the measurement described above under <Membrane softening transition temperature and membrane rupture temperature for storage modulus and loss modulus (version 3)>. The measurement results are shown in Table 10.

TABLE 10

| | | | Viscoelasticity (ver. 3) behavior | E', MPa | E", MPa | tanδ |
|---|---|---|---|---|---|---|
| Reference membrane | Temperature ° C. | 147.89 | Softening | 6.94 | 2.189 | 0.32 |
| | | 176.27 | Rupture | 0.107 | 0.068 | 0.64 |
| Crosslinked membrane | Temperature ° C. | 146.8 | Softening | 7.17 | 2.16 | 0.30 |
| | | 222.5 | Slight reduction in elastic modulus | 2.34 | 0.91 | 0.39 |
| | | 253.7 | No rupture, measurement completed | 2.38 | 1.04 | 0.44 |

Experiment Group III

[Silane Graft-Modified Polyolefin Production Method]

The polyolefin starting material to be used as the silane graft-modified polyolefin may be one with a viscosity-average molecular weight (Mv) of 100,000 to 1,000,000, a weight-average molecular weight (Mw) of 30,000 to 920,000, and a number-average molecular weight of 10,000 to 150,000, and it may be propylene or a butene-copolymerized α-olefin. After melt kneading the polyethylene starting material with an extruder while adding an organic peroxide (di-t-butyl peroxide) and generating radicals in the polymer chain of the α-olefin, it is filled with trimethoxyalkoxide-substituted vinylsilane and addition reaction is carried out to introduce alkoxysilyl groups into the α-olefin polymer, forming a silane-graft structure. A suitable amount of an antioxidant (pentaerythritoltetrakis[3-(3,5-di-t-butyl-4-hydroxyphenyl)propionate]) is simultaneously added to adjust the radical concentration in the system, thus inhibiting chain-style chain reaction (gelation) in the α-olefin. The obtained silane-grafted polyolefin molten resin is cooled in water and pelletized, after which it is heat-dried at 80° C. for 2 days and the water and unreacted trimethoxyalkoxide-substituted vinylsilane are removed. The residual concentration of the unreacted trimethoxyalkoxide-substituted vinylsilane in the pellets is about 1000 to 1500 ppm.

The silane graft-modified polyolefins obtained by this method are shown as the "Silane-modified polyethylene" in Table 11 and Table 12.

[Method for Producing Modified PE with Functional Groups Other than Silane-Modified PE, and its Copolymer]

Modified PE with functional groups other than silane-modified PE, and its copolymer, were produced by the following method.

All of the starting materials used were adjusted in molecular weight to an MI in the range of 0.5 to 10. Hydroxyl group-containing modified PE was produced by saponification and neutralization of an EVA copolymer. For an amine-modified or oxazoline-modified resin, a tungsten-based catalyst is allowed to react with the terminal vinyl groups of PE polymerized using a chromium catalyst, in the presence of hydrogen peroxide, for conversion of the vinyl groups to epoxy groups. Known functional group-converting organic reactions were then used to convert the respective reactive sites to the target functional groups, obtaining different modified PE molecules. For amine-modified PE, for example, modified PE with epoxy groups is melt kneaded in an extruder at 200° C. while loading a primary or secondary amine in a liquid, and reaction is carried out. The unreacted amine is then removed through a pressure reducing valve and the obtained amine-modified resin is extruded into a strand and cut into pellets.

The modified PE obtained by this method is indicated as "modified PE or copolymer (B)" in Table 11 and Table 12.

Example III-1

To 79.2 weight % of polyethylene homopolymer (A) with a weight-average molecular weight of 500,000 there was added 19.8 weight % of silane-grafted polyethylene (PE (B)) with an MFR of 0.4 g/min, obtained using a polyolefin with a viscosity-average molecular weight of 20,000 as starting material and modification reaction with trimethoxyalkoxide-substituted vinylsilane (the respective contents of resin compositions (A) and (B) thus being 0.8 and 0.2), and 1 weight % of pentaerythrityl-tetrakis-[3-(3,5-di-t-butyl-4-hydroxyphenyl)propionate] as an antioxidant, and these were dry blended using a tumbler blender to obtain a mixture. The obtained mixture was supplied to a twin-screw extruder through a feeder, under a nitrogen atmosphere. Also, liquid paraffin (kinematic viscosity at 37.78° C.: $7.59\times10^{-5}$ $m^2/s$) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 weight % (i.e. a polymer concentration of 30 weight %). The melt kneading conditions were a preset temperature of 220° C., a screw rotational speed of 240 rpm and a discharge throughput of 18 kg/h.

The melt kneaded mixture was then extrusion cast through a T-die onto a cooling roll controlled to a surface temperature of 25° C., to obtain a gel sheet (molded sheet) with a raw membrane thickness of 1400 μm.

The molded sheet was then simultaneously fed into a biaxial tenter stretching machine for biaxial stretching, to obtain a stretched sheet. The stretching conditions were an MD factor of 7.0, a TD factor of 6.0 (i.e. a factor of 7×6), and a biaxial stretching temperature of 125° C.

The stretched gel sheet was subsequently fed into a methyl ethyl ketone tank and thoroughly immersed in the methyl ethyl ketone for extraction removal of the liquid paraffin, after which the methyl ethyl ketone was dried off to obtain a porous body.

The porous body to be subjected to heat setting (HS) was fed to a TD tenter and HS was carried out at a heat setting temperature of 125° C. and a stretch ratio of 1.8, after which relaxation was carried out to a factor of 0.5 in the TD direction (i.e. the HS relaxation factor was 0.5), to obtain a microporous membrane.

The obtained microporous membrane was then cut at the edges and wound up as a mother roll with a width of 1,100 mm and a length of 5,000 m.

During the evaluation, the microporous membrane wound out from the mother roll was slit as necessary for use as the evaluation separator A.

Separators and batteries for evaluation were evaluated by the evaluation methods described above, and the evaluation results are shown in Table 11.

Examples III-2 to III-18

The microporous membranes and batteries listed in Table 11 and Table 12 were obtained by the same procedure as Example III-1, except for changing the types and quantity ratio of resins A and B and the crosslinking method and conditions, as shown in Table 11 and Table 12.

The obtained microporous membranes and batteries were subjected to each evaluation by the evaluation methods described above, and the evaluation results are shown in Table 11 and Table 12. For loading of the electrolyte solutions in Examples 111-8 to III-10 and 111-15 to 111-18, solutions of the additives listed in Table 11 and Table 12 dissolved in suitable amounts of electrolyte solutions were used.

Comparative Examples III-1 and III-2

The microporous membranes listed in Table 12 were obtained by the same procedure as Example III-1, except for changing the types and quantity ratio of resins A and B and the crosslinking method and conditions as shown in Table 12. The obtained microporous membranes were used for electron beam crosslinking by irradiation at a prescribed radiation dose. The obtained electron beam-crosslinked microporous membranes and batteries were evaluated by each of the evaluation methods described above, and the evaluation results are shown in Table 12.

FIG. 8 shows a strain-crystal fragmentation rate graph for Comparative Example III-2 and Example III-1, where the change in X-ray crystal structure during a tensile rupture fracture test was observed. In FIG. 8, the microporous membrane of Comparative Example 111-2 is represented as the dotted line “EB crosslinked”, and the microporous membrane of Example III-1 is represented as the solid line “before chemical crosslinking” and the dashed line “after chemical crosslinking”.

TABLE 11

| | | | | Example III | | | | |
|---|---|---|---|---|---|---|---|---|
| | | | | 1 | 2 | 3 | 4 | 5 |
| Microporous membrane | Resin composition (weight %) | PE (A) | | 80 | 80 | 80 | 80 | 80 |
| | | Modified PE or copolymer (B)* | Silane-modified polyethylene | 20 | — | — | — | — |
| | | | —COOH modified PE | — | 20 | 10 | — | — |
| | | | -oxazoline-modified PE | — | — | — | — | 10 |
| | | | -oxazoline, —OH modified PE | — | — | — | 20 | — |
| | | | —OH modified PE | — | — | 10 | — | 10 |
| | | | —OH, —NH— modified PE | — | — | — | — | — |
| | | | —OH, amine-modified PE | — | — | — | — | — |
| | Crosslinking | Method | | — | — | — | — | — |
| | | Timing | | | | | | |
| | | Apparatus/conditions | | | | | | |
| | Basic separator properties | Membrane thickness | μm | 11 | 11 | 11 | 11 | 11 |
| | | Porosity (i) | % | 40 | 39 | 39 | 40 | 40 |
| | | Air permeability | sec/100 $cm^3$ | 160 | 170 | 170 | 153 | 153 |
| | Resin aggregates in separator | | /1000 $m^2$ | 2 | 3 | 3 | 7 | 7 |
| | Storage modulus change factor, ver. 2 | $R_{Ex}$ | Factor | 2.2 | 2.5 | 2.5 | 2.3 | 2.3 |
| | | $R_{Emix}$ | Factor | 8.4 | 7.5 | 7.5 | 7.5 | 7.6 |
| | Loss modulus change factor, ver. 2 | $R_{E''x}$ | Factor | 2 | 2.4 | 2.4 | 0.21 | 2.1 |
| | | $R_{E''mix}$ | Factor | 6.1 | 6.5 | 6.5 | 6.5 | 6.9 |
| | F/MD property (i) | Fuse temperature | ° C. | 141 | 142 | 142 | 143 | 143 |
| | | Meltdown temperature | ° C. | >200 | >200 | >200 | >200 | >200 |
| Battery | Crosslinking | Method** | | I | II | II | II | II |
| | | Reaction/bonding | | Dehydrating condensation | Esterification | Esterification | Amide bond, ether bond | Amide bond, ether bond |
| | | Timing | | Contact with electrolyte solution until initial charge-discharge | Contact with electrolyte solution until initial charge-discharge | Contact with electrolyte solution until initial charge-discharge | Contact with electrolyte solution until initial charge-discharge | Contact with electrolyte solution until initial charge-discharge |
| | | Functional group of microporous membrane | A | silanol group | —OH | —OH | oxazoline | oxazoline |
| | | | B | — | —COOH | —COOH | —OH | —OH |
| | | Reactive species | | — | — | — | — | — |
| | | Catalyst type | | HF | — | — | — | — |
| | | Molten metal species | | — | — | — | — | — |
| | | Additive**** | | — | — | — | — | — |
| | Battery cycle stability 1 | | % | 98 | 97 | 97 | 93 | 93 |
| | Battery destruction safety 1 | Internal maximum heat release rate | ° C./sec | 5 | 6 | 6 | 5 | 5 |
| | | Voltage reduction (3 V reduction time) | sec | >300 | >300 | >300 | >300 | >300 |

TABLE 11-continued

| | | | | | | | | |
|---|---|---|---|---|---|---|---|---|
| Separator solid viscoelasticity ver. 3 data | Maximum elastic modulus at −50 to 250° C. | Storage modulus (E') | MPa | 280 | 350 | 550 | 9300 | 2350 |
| | | Loss modulus (E") | MPa | 75 | 52 | 200 | 23 | 230 |
| | Minimum elastic modulus, −50 to 250° C. | Storage modulus (E') | MPa | 2.21 | 3.5 | 3.1 | 2.5 | 5.2 |
| | | Loss modulus (E") | MPa | 0.88 | 1.3 | 1.2 | 1.2 | 1.7 |
| | Maximum elastic modulus, membrane softening transition temperature to 250° C. | Storage modulus (E') | MPa | 7.2 | 8.1 | 11 | 15 | 9.2 |
| | | Loss modulus (E") | MPa | 2.15 | 6.2 | 7.6 | 3.5 | 3.1 |
| | Minimum elastic modulus, membrane softening transition temperature to 250° C. | Storage modulus (E') | MPa | 2.21 | 3.5 | 3.1 | 2.5 | 5.2 |
| | | Loss modulus (E") | MPa | 0.88 | 1.3 | 1.2 | 1.2 | 1.7 |
| | Membrane softening transition temperature - membrane rupture temperature | Mean storage modulus (E'ave) | MPa | 4.7 | 5.8 | 7.1 | 8.8 | 7.2 |
| | | Mean loss modulus (E"ave) | MPa | 1.5 | 3.8 | 4.4 | 2.4 | 2.4 |
| | Membrane softening transition temperature | | ° C. | 147 | 149 | 148 | 146 | 146 |
| | Membrane rupture temperature | | ° C. | No membrane rupture at 250 | No membrane rupture at 250 | No membrane rupture at 250 | No membrane rupture at 250 | No membrane rupture at 250 |

| | | | | Example III | | | | |
|---|---|---|---|---|---|---|---|---|
| | | | | 6 | 7 | 8 | 9 | 10 |
| Microporous membrane | Resin composition (weight %) | PE (A) | | 80 | 80 | 80 | 80 | 80 |
| | | Modified PE or copolymer (B)* | Silane-modified polyethylene | — | — | — | — | — |
| | | | —COOH modified PE | — | — | — | — | — |
| | | | -oxazoline-modified PE | — | — | — | — | — |
| | | | -oxazoline, —OH modified PE | — | — | — | — | — |
| | | | —OH modified PE | 20 | — | — | 20 | 20 |
| | | | —OH, —NH— modified PE | — | 20 | — | — | — |
| | | | —OH, amine-modified PE | — | — | 20 | — | — |
| | Crosslinking | Method Timing Apparatus/conditions | | — | — | — | — | — |
| | Basic separator properties | Membrane thickness | μm | 11 | 11 | 11 | 11 | 11 |
| | | Porosity (i) | % | 42 | 41 | 38 | 39 | 40 |
| | | Air permeability | sec/100 $cm^3$ | 166 | 158 | 162 | 172 | 150 |
| | Resin aggregates in separator | | /1000 $m^2$ | 5 | 3 | 2 | 5 | 2 |
| | Storage modulus change factor, ver. 2 | $R_{E'x}$ | Factor | 2.6 | 3.4 | 3.5 | 2 2 | 2.2 |
| | | $R_{E'mix}$ | Factor | 8.1 | 6.4 | 6.4 | 7.5 | 7.5 |
| | Loss modulus change factor, ver. 2 | $R_{E''x}$ | Factor | 2.3 | 3.1 | 3.3 | 2.1 | 2.1 |
| | | $R_{E''mix}$ | Factor | 7.8 | 5.6 | 5.6 | 6.4 | 6.4 |
| | F/MD property (i) | Fuse temperature | ° C. | 143 | 144 | 143 | 142 | 141 |
| | | Meltdown temperature | ° C. | >200 | >200 | >200 | >200 | >200 |

TABLE 11-continued

| Battery | Crosslinking | Method** | | III | III | IV | IV | IV |
|---|---|---|---|---|---|---|---|---|
| | | Reaction/bonding | | Chain condensation —O—CO—O— | Chain condensed tertiaiy amine | Nucleophilic substitution | Nucleophilic addition | Epoxy ring opening |
| | | Timing | | Contact with electrolyte solution | Contact with electrolyte solution | Contact with electrolyte solution until initial charge-discharge | Contact with electrolyte solution until initial charge-discharge | Contact with electrolyte solution until initial charge-discharge |
| | | Functional group of microporous membrane | A | —OH | —NH— | —NH2 | —OH | —OH |
| | | | B | — | — | — | — | — |
| | | Reactive species | | EC*** | EC*** | — | — | — |
| | | Catalyst type | | — | — | — | — | — |
| | | Molten metal species | | — | — | — | — | — |
| | | Additive**** | | — | — | BS $(PEG)_5$ | diisocyanate | diepoxy compound |
| | Battery cycle stability 1 | | % | 92 | 91 | 92 | 96 | 95 |
| | Battery destruction safety 1 | Internal maximum heat release rate | ° C./sec | 7 | 5 | 6 | 8 | 4 |
| | | Voltage reduction (3 V reduction time) | sec | >300 | >300 | >300 | >300 | >300 |
| Separator solid viscoelasticity ver. 3 data | Maximum elastic modulus at −50 to 250° C. | Storage modulus (E') | MPa | 3330 | 4860 | 81 | 250 | 2570 |
| | | Loss modulus (E") | MPa | 71 | 1080 | 14 | 24 | 108 |
| | Minimum elastic modulus, −50 to 250° C. | Storage modulus (E') | MPa | 4.6 | 2.24 | 3.5 | 7.5 | 7.2 |
| | | Loss modulus (E") | MPa | 1.1 | 1.4 | 1.1 | 5.5 | 6.6 |
| | Maximum elastic modulus, membrane softening transition temperature to 250° C. | Storage modulus (E') | MPa | 11.1 | 17.3 | 8.5 | 9 | 13.1 |
| | | Loss modulus (E") | MPa | 1.27 | 2.1 | 5.1 | 8.1 | 9.1 |
| | Minimum elastic modulus, membrane softening transition temperature to 250° C. | Storage modulus (E') | MPa | 4.6 | 2.24 | 3.5 | 7.5 | 7.2 |
| | | Loss modulus (E") | MPa | 1.1 | 1.4 | 1.1 | 5.5 | 6.6 |
| | Membrane softening transition temperature - membrane rupture temperature | Mean storage modulus (E'ave) | MPa | 7.9 | 9.8 | 6.0 | 8.3 | 10.2 |
| | | Mean loss modulus (E"ave) | MPa | 1.2 | 1.8 | 3.1 | 6.8 | 7.9 |
| | Membrane softening transition temperature | | ° C. | 145 | 148 | 149 | 147 | 145 |
| | Membrane rupture temperature | | ° C. | No membrane rupture at 250 | No membrane rupture at 250 | No membrane rupture at 250 | No membrane rupture at 250 | No membrane rupture at 250 |

TABLE 12

| | | | | Example III | | | | | |
|---|---|---|---|---|---|---|---|---|---|
| | | | | 11 | 12 | 13 | 14 | 15 | 16 |
| Microporous membrane | Resin composition (weight %) | PE (A) | | 80 | 80 | 99 | 10 | 99 | 10 |
| | | Modified PE or copolymer (B)* | Silane-modified polyethylene | — | — | 1 | 90 | — | — |
| | | | —COOH modified PE | 20 | 20 | — | — | — | — |
| | | | -oxazoline-modified PE | — | — | — | — | — | — |
| | | | -oxazoline, —OH modified PE | — | — | — | — | — | — |
| | | | —OH modified PE | — | — | — | — | 1 | 90 |
| | | | —OH, —NH— modified PE | — | — | — | — | — | — |
| | | | —OH, amine-modified PE | — | — | — | — | — | — |
| | Crosslinking | Method | | — | — | — | — | — | — |
| | | Timing | | | | | | | |
| | | Apparatus/conditions | | | | | | | |
| | Basic separator properties | Membrane thickness | µm | 11 | 11 | 11 | 11 | 11 | 11 |
| | | Porosity (i) | % | 40 | 41 | 42 | 41 | 37 | 39 |
| | | Air permeability | sec/100 $cm^3$ | 136 | 153 | 155 | 161 | 148 | 153 |
| | Resin aggregates in separator | | /1000 $m^2$ | 3 | 4 | 1 | 30 | 2 | 38 |
| | Storage modulus change factor, ver. 2 | $R_{Ex}$ | Factor | 2.3 | 2.4 | 1.6 | 18 | 2 | 18.3 |
| | | $R_{Emix}$ | Factor | 7.8 | 7.5 | 2.5 | 19 | 2.3 | 19.5 |
| | Loss modulus change factor, ver. 2 | $R_{E''x}$ | Factor | 2.1 | 2.2 | 1.6 | 17.3 | 1.9 | 17.8 |
| | | $R_{E''mix}$ | Factor | 6.3 | 6.2 | 2.3 | 18.6 | 2.1 | 18.6 |
| | F/MD property (i) | Fuse temperature | ° C. | 142 | 141 | 145 | 148 | 146 | 148 |
| | | Meltdown temperature | ° C. | >200 | >200 | >200 | >200 | >200 | >200 |
| Battery | Crosslinking | Method** | | V | V | I | I | IV | IV |
| | | Reaction/bonding | | Coordination bondins | Coordination bonding | Dehydrating condensation | Dehydrating condensation | Nucleophilic addition | Nucleophilic addition |
| | | Timing | | Contact with electrolyte solution until initial charge-discharge | Contact with electrolyte solution until initial charge-discharge | Contact with electrolyte solution until initial charge-discharge | Contact with electrolyte solution until initial charge-discharge | Contact with electrolyte solution until initial charge-discharge | Contact with electrolyte solution until initial charge-discharge |
| | | Functional group of microporous membrane | A | —OH | —OH | silanol group | silanol group | —OH | —OH |
| | | | B | —COOH | —COOH | — | — | — | — |
| | | Reactive species | | — | — | — | — | — | — |
| | | Catalyst type | | HF, $H_2O$ | HF, $H_2O$ | HF | HF | — | — |
| | | Molten metal species | | $N^{2+}$ | $Li^+$ | — | — | — | — |
| | | Additive**** | | — | — | — | — | Diisocyanate | Diisocyanate |
| | Battery cycle stability 1 | | % | 97 | 91 | 82 | 83 | 76 | 79 |
| | Battery destruction safety 1 | Internal maximum heat release rate | ° C./sec | 5 | 7 | 23 | 7 | 26 | 6 |
| | | Voltage reduction (3 V reduction time) | sec | >300 | >300 | 280 | >300 | 285 | >300 |

TABLE 12-continued

| | | | | | | | | | | |
|---|---|---|---|---|---|---|---|---|---|---|
| Separator solid viscoelasticity ver. 3 data | Maximum elastic modulus at −50 to 250° C. | Storage modulus (E') | MPa | | 9,680 | 225 | 120 | 230 | 112 | 8650 |
| | | Loss modulus (E") | MPa | | 7,880 | 15 | 23 | 35 | 15 | 7250 |
| | Minimum elastic modulus, −50 to 250° C. | Storage modulus (E') | MPa | | 1.2 | 9.1 | 3.2 | 9.6 | 9.2 | 9.8 |
| | | Loss modulus (E") | MPa | | 0.2 | 0.5 | 1.3 | 7.3 | 4.1 | 8.5 |
| | Maximum elastic modulus, membrane softening transition temperature to 250° C. | Storage modulus (E') | MPa | | 5.3 | 14.4 | 6.6 | 13.5 | 16.2 | 13.7 |
| | | Loss modulus (E") | MPa | | 3.2 | 1.3 | 3.1 | 9.4 | 5.6 | 10.3 |
| | Minimum elastic modulus, membrane softening transition temperature to 250° C. | Storage modulus (E') | MPa | | 1.2 | 9.1 | 3.2 | 9.6 | 9.2 | 9.8 |
| | | Loss modulus (E") | MPa | | 0.2 | 0.5 | 1.3 | 7.3 | 4.1 | 8.5 |
| | Membrane softening transition temperature - membrane rupture temperature | Mean storage modulus (E'ave) | MPa | | 3.3 | 11.8 | 4.9 | 11.6 | 12.7 | 11.8 |
| | | Mean loss modulus (E"ave) | MPa | | 1.7 | 0.9 | 2.2 | 8.4 | 4.9 | 9.4 |
| | Membrane softening transition temperature | | ° C. | | 146 | 148 | 147 | 147 | 144 | 141 |
| | Membrane rupture temperature | | ° C. | | No membrane rupture at 250 | No membrane rupture at 250 | 179 | No membrane rupture at 250 | 178 | No membrane rupture at 250 |

| | | | | Example III | | Comparative Example III | |
|---|---|---|---|---|---|---|---|
| | | | | 17 | 18 | 1 | 2 |
| Microporous membrane | Resin composition (weight %) | PE (A) | | 99.7 | 0.03 | 100 | 100 |
| | | Modified PE or copolymer (B)* | Silane-modified polyethylene | — | — | — | — |
| | | | —COOH modified PE | — | — | — | — |
| | | | -oxazoline-modified PE | — | — | — | — |
| | | | -oxazoline, —OH modified PE | — | — | — | — |
| | | | —OH modified PE | 0.3 | 99.7 | — | — |
| | | | —OH, —NH— modified PE | — | — | — | — |
| | | | —OH, amine-modified PE | — | — | — | — |
| | Crosslinking | Method | | — | — | Electron beam irradiation | Electron beam irradiation |
| | | Timing | | | | After membrane formation - before battery assembly | After membrane formation - before battery assembly |
| | | Apparatus/conditions | | | | EB apparatus/ 20 kGv | EB apparatus/ 120 kGv |
| | Basic separator properties | Membrane thickness | μm | 11 | 11 | 11 | 11 |
| | | Porosity (i) | % | 29 | 37 | 37 | 37 |
| | | Air permeability | sec/100 $cm^3$ | 156 | 181 | 162 | 163 |
| | Resin aggregates in separator | | /1000 $m^2$ | 11 | 203 | 2 | 2 |
| | Storage modulus change factor, ver. 2 | $R_{E'x}$ | Factor | 1.2 | 21 | 1.1 | 21.5 |
| | | $R_{E'mix}$ | Factor | 1.4 | 22 | 1.1 | 22 |
| | Loss modulus change factor, ver. 2 | $R_{E''x}$ | Factor | 1.1 | 21 | 1.1 | 21 |
| | | $R_{E''mix}$ | Factor | 1.2 | 22.5 | 1.1 | 21.5 |
| | F/MD property (i) | Fuse temperature | ° C. | 146 | 148 | 155 | 182 |
| | | Meltdown temperature | ° C. | >200 | >200 | 158 | >200 |

TABLE 12-continued

| | | | | | | | |
|---|---|---|---|---|---|---|---|
| Battery | Crosslinking | Method** | | IV | IV | — | — |
| | | Reaction/bonding | | Nucleophilic addition | Nucleophilic addition | | |
| | | Timing | | Contact with electrolyte solution until initial charge-discharge | Contact with electrolyte solution until initial charge-discharge | | |
| | | Functional group of microporous membrane | A | —OH | —OH | | |
| | | | B | — | — | | |
| | | Reactive species | | — | — | | |
| | | Catalyst type | | — | — | | |
| | | Molten metal species | | — | — | | |
| | | Additive**** | | Diisocyanate | Diisocyanate | | |
| | Battery cycle stability 1 | | % | 63 | 61 | 54 | 43 |
| | Battery destruction safety 1 | Internal maximum heat release rate | ° C./sec | 35 | 38 | 127 | 57 |
| | | Voltage reduction (3 V reduction time) | sec | 253 | 222 | 3 | 12 |
| Separator solid viscoelasticity ver. 3 data | Maximum elastic modulus at −50 to 250° C. | Storage modulus (E') | MPa | 9,700 | 124 | 87 | 13,820 |
| | | Loss modulus (E") | MPa | 7,890 | 13 | 8.3 | 10,135 |
| | Minimum elastic modulus, −50 to 250° C. | Storage modulus (E') | MPa | 9.6 | 9.7 | 0.8 | 20.8 |
| | | Loss modulus (E") | MPa | 0.2 | 6.9 | 0.09 | 17.3 |
| | Maximum elastic modulus, membrane softening transition temperature to 250° C. | Storage modulus (E') | MPa | 15.2 | 16.6 | 0.1 | 23 |
| | | Loss modulus (E") | MPa | 1.4 | 14.1 | 0.03 | 20.8 |
| | Minimum elastic modulus, membrane softening transition temperature to 250° C. | Storage modulus (E') | MPa | 9.6 | 9.7 | 0.8 | 20.8 |
| | | Loss modulus (E") | MPa | 0.2 | 6.9 | 0.09 | 17.3 |
| | Membrane softening transition temperature - membrane rupture temperature | Mean storage modulus (E'ave) | MPa | 12.4 | 13.2 | 0.5 | 21.9 |
| | | Mean loss modulus (E"ave) | MPa | 0.8 | 10.5 | 0.1 | 19.1 |
| | Membrane softening transition temperature | | ° C. | 145 | 149 | 151 | 156 |
| | Membrane rupture temperature | | ° C. | 185 | No membrane rupture at 250 | 161 | No membrane rupture at 250 |

Explanation of abbreviations in Table 11 and Table 12

*The "silane-modified polyethylene" is a silane-modified polyethylene with a density of 0.95 g/$cm^3$ and a melt mass flow rate (MFR) of 0.4 g/min at 190° C., obtained by modification reaction with a trimethoxyalkoxide-substituted vinylsilane, using a polyolefin with a viscosity-average molecular weight of 20,000 as the starting material.

The abbreviations "—COOH modified PE", "-oxazoline modified PE", "-oxazoline, —OH modified PE", "—OH modified PE", "—OH, —NH— modified PE" and "—OH, amine modified PE" are the modified PE molecules obtained by the [Method for producing modified PE with functional groups other than silane-modified PE, and its copolymer], above.

**(I) Condensation reaction between multiple identical functional groups (II) Reaction between multiple different functional groups (III) Chain condensation reaction between functional groups and electrolyte solution (IV) Reaction between functional groups and additives (V) Reaction in which multiple identical functional groups are crosslinked by coordination bonding with eluting metal ions

***EC: Ethylene carbonate

****BS$(PEG)_5$: Both terminal succinimides, EO unit repeats: 5

Diisocyanate: Compound with both terminal isocyanates linked with hexane units linked via urethane bonding Diepoxy compound: Compound with both terminal epoxide groups and butane units linked

Experiment Group IV

Example IV-1

<Fabrication of Layer A>

(Production of Silane Graft-Modified Polyolefin)

Using polyethylene with a viscosity-average molecular weight of 120,000 as the polyethylene, the polyethylene starting material was melt kneaded with an extruder while adding an organic peroxide (di-t-butyl peroxide) and generating radicals in the polymer chain of the α-olefin, and then it was filled with trimethoxyalkoxide-substituted vinylsilane and addition reaction was carried out to introduce alkoxysilyl groups into the α-olefin polymer, forming a silane-graft structure. A suitable amount of an antioxidant (pentaerythritoltetrakis[3-(3,5-di-t-butyl-4-hydroxyphenyl) propionate]) was simultaneously added to the reaction system to adjust the radical concentration in the system, thus inhibiting chain-style chain reaction (gelation) in the α-olefin. The obtained silane-grafted polyolefin molten resin was cooled in water and pelletized, after which it was heat-dried at 80° C. for 2 days and the water and unreacted trimethoxyalkoxide-substituted vinylsilane were removed. The residual concentration of the unreacted trimethoxyalkoxide-substituted vinylsilane in the pellets was about 1500 ppm or lower.

Modification reaction of the trimethoxyalkoxide-substituted vinylsilane in this manner yielded a silane-modified polyethylene with an MFR (190° C.) of 0.4 g/min.

(Fabrication of Layer A)

After combining 35 weight % of the previously obtained silane-modified polyethylene obtained with 65 weight % of polyethylene homopolymer with a weight-average molecular weight of 800,000 to obtain a resin blend, 1 weight % of pentaerythrityl-tetrakis-[3-(3,5-di-t-butyl-4-hydroxyphenyl) propionate] was added to the blend as an antioxidant, and a tumbler blender was used for dry blending to obtain a mixture. The obtained mixture was supplied to a twin-screw extruder through a feeder, under a nitrogen atmosphere. Also, liquid paraffin (kinematic viscosity at 37.78° C.: $7.59\times10^{-5}$ $m^2$/s) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 weight % (i.e. a polymer concentration of 30 weight %). The melt kneading conditions were a preset temperature of 220° C., a screw rotational speed of 240 rpm and a discharge throughput of 18 kg/h. The melt kneaded mixture was then extrusion cast through a T-die onto a cooling roll controlled to a surface temperature of 25° C., to obtain a gel sheet (molded sheet) with a raw membrane thickness of 1400 μm.

The molded sheet was then simultaneously fed into a biaxial tenter stretching machine for biaxial stretching, to obtain a stretched sheet. The stretching conditions were an MD factor of 7.0, a TD factor of 6.3 (i.e. a factor of 7×6.3), and a biaxial stretching temperature of 122° C.

The stretched gel sheet was then fed into a dichloromethane tank and thoroughly immersed in the dichloromethane for extraction removal of the liquid paraffin, after which the dichloromethane was dried off to obtain a porous body.

The porous body to be subjected to heat setting (HS) was fed to a TD tenter and HS was carried out at a heat setting temperature of 133° C. and a stretch ratio of 1.8, after which relaxation was carried out to a factor of 1.7 in the TD direction to obtain a microporous membrane.

The obtained microporous membrane was then cut at the edges and wound up as a mother roll with a width of 1,100 mm and a length of 5,000 m.

During the evaluation, the microporous membrane wound out from the mother roll was slit as necessary for use as the evaluation layer A.

The membrane thickness, air permeability and porosity were measured for the obtained evaluation layer A, and they are shown in Table 13.

<Fabrication of Layer B>

A dispersion was prepared by evenly dispersing 95 parts by weight of aluminum hydroxide oxide (mean particle size: 1.4 μm) as inorganic particles and 0.4 part by (solid) weight of an aqueous ammonium polycarboxylate solution (SN dispersant 5468 by San Nopco, Ltd., 40% solid concentration) as an ionic dispersing agent, in 100 parts by weight of water. The obtained dispersion was shredded with a bead mill (cell volume: 200 cc, zirconia bead diameter: 0.1 mm, filling volume: 80%), and the particle size distribution of the inorganic particles was adjusted to D50=1.0 μm, to prepare an inorganic particle-containing slurry.

The microporous membrane was then continuously wound out from the microporous membrane mother roll and one side of the microporous membrane was coated with the inorganic particle-containing slurry using a gravure reverse coater, after which it was dried with a dryer at 60° C. to remove the water and wound up to obtain a separator mother roll.

During the evaluation, the separator was wound out from the mother roll and slit as necessary for use as the evaluation separator.

Examples IV-2 to IV-5 and Comparative Examples IV-1 to IV-2

With the physical properties listed in Table 13 as the target, one or more from among the weight-average molecular weight of the polyethylene homopolymer, the set stretching conditions, the heat setting conditions and the relaxation conditions were changed. The composition of layer B was also changed as shown in Table 13.

Separators were fabricated by the same method as Example IV-1 except for these changes, and the obtained separators were used for the evaluation described above. The evaluation results are shown in Table 13.

tration of the unreacted trimethoxyalkoxide-substituted vinylsilane in the pellets is about 10 to 1500 ppm.

The silane graft-modified polyolefins obtained by this method are used as the "Silane-modified polyethylene (B)" in Tables 14 to 16. The silane graft-modified polyolefins used here have a density of 0.94 g/cm$^3$ and an MFR of 0.65 g/min.

TABLE 13

| | | | | Example IV | | | | | Comparative Example IV | |
|---|---|---|---|---|---|---|---|---|---|---|
| | | | | 1 | 2 | 3 | 4 | 5 | 1 | 2 |
| Separator | Layer A | Polyethylene | weight % | 65 | 40 | 95 | 65 | 65 | 95 | 40 |
| | | Silane-modified polyolefin | weight % | 35 | 60 | 5 | 35 | 35 | 5 | 60 |
| | | Thickness (TA) | um | 11.0 | 3.0 | 11.0 | 16.0 | 3.0 | 16.0 | 3.0 |
| | | Porosity (iii) | % | 40 | 38 | 42 | 43 | 52 | 42 | 40 |
| | | Air permeability | sec/cm$^3$ | 155 | 105 | 107 | 200 | 215 | 205 | 189 |
| | | Puncture strength | gf/20 um | 490 | 380 | 505 | 168 | 168.5 | 168 | 168.5 |
| | Layer B | Inorganic particles Weight ratio | wt % | 95.00 | 94.00 | 35.00 | 98.00 | 88.00 | 98.00 | 99.00 |
| | | Type | — | AlO(OH) | AlO(OH) | AlO(OH) | AlO(OH) | AlO(OH) | AlO(OH) | AlO(OH) |
| | | Thickness (TB) | um | 3.5 | 12 | 3.5 | 0.5 | 20 | 0.5 | 20 |
| | Ratio (TA/TB) | | — | 3.14 | 0.25 | 3.14 | 32.00 | 0.15 | 32.00 | 0.15 |
| | Total thickness (TA + TB) | | um | 14.5 | 15 | 14.5 | 16.50 | 23.00 | 16.50 | 23.00 |
| | TMA test | Membrane rupture temperature | ° C. | 210.00 | 211.00 | 207.00 | 168.00 | 158.00 | 168.00 | 158.00 |
| | F/MD test (ii) | Shutdown temperature | ° C. | 143 | 140 | 143 | 138 | 139 | 136 | 158 |
| | | Meltdown temperature | ° C. | 219 | 220 | 220 | 182 | 217 | 182 | 217 |
| | 150° C. heat shrinkage factor | Before formation of crosslinked structure | % | 56 | 63 | 55 | 65 | 38 | 65 | 43 |
| | | After formation of crosslinked structure | % | 7 | 1.2 | 48 | 58 | 32 | 60 | 0.5 |
| | | Change factor | Factor | 0.13 | 0.02 | 0.87 | 0.892 | 0.842 | 0.923 | 0.012 |
| Battery | Battery cycle stability 2 (300 cycles) | | % | 98 | 81 | 93 | 67 | 66 | 67 | 66 |
| | Passing rate in safety test 2 | 200 cycles | % | 97 | 83 | 97 | 50 | 51 | 49 | 50 |
| | | 1000 cycles | % | 90 | 60 | 83 | 5 | 7 | 7 | 9 |

Experiment Group V

[Silane Graft-Modified Polyolefin Production Method]

The polyolefin starting material to be used as the silane graft-modified polyolefin may be one with a viscosity-average molecular weight (Mv) of 100,000 to 1,000,000, a weight-average molecular weight (Mw) of 30,000 to 920,000, and a number-average molecular weight of 10,000 to 150,000, and it may be propylene or a butene-copolymerized α-olefin. After melt kneading the polyethylene starting material with an extruder while adding an organic peroxide (di-t-butyl peroxide) and generating radicals in the polymer chain of the α-olefin, it is filled with trimethoxyalkoxide-substituted vinylsilane and addition reaction is carried out to introduce alkoxysilyl groups into the α-olefin polymer, forming a silane-graft structure. A suitable amount of an antioxidant (pentaerythritoltetrakis[3-(3,5-di-t-butyl-4-hydroxyphenyl)propionate]) is simultaneously added to adjust the radical concentration in the system, thus inhibiting chain-style chain reaction (gelation) in the α-olefin. The obtained silane-grafted polyolefin molten resin is cooled in water and pelletized, after which it is heat-dried at 80° C. for 2 days and the water and unreacted trimethoxyalkoxide-substituted vinylsilane are removed. The residual concen-

Example V-1

(Formation of Microporous Membrane)

To 79.2 wt % of polyethylene homopolymer with a weight-average molecular weight of 500,000 (A) there was added 19.8 wt % of silane-grafted polyethylene (silane-modified polyethylene (B)) with an MFR (190° C.) of 0.4 g/min, obtained using a polyolefin with a viscosity-average molecular weight of 20,000 as starting material and modification reaction with trimethoxyalkoxide-substituted vinylsilane (the respective contents of resin compositions (A) and (B) thus being 80% and 20%), and 1 wt % of pentaerythrityl-tetrakis-[3-(3,5-di-t-butyl-4-hydroxyphenyl)propionate] as an antioxidant, and these were dry blended using a tumbler blender to obtain a mixture. The obtained mixture was supplied to a twin-screw extruder through a feeder, under a nitrogen atmosphere. Also, liquid paraffin (kinematic viscosity at 37.78° C.: $7.59\times10^{-5}$ m$^2$/s) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 wt % (i.e. a polymer concentration of 30 wt %). The melt kneading conditions were a preset temperature of 220° C., a screw rotational speed of 240 rpm and a discharge throughput of 18 kg/h.

The melt kneaded mixture was then extrusion cast through a T-die onto a cooling roll controlled to a surface temperature of 25° C., to obtain a gel sheet (molded sheet) with a raw membrane thickness of 1400 μm.

The molded sheet was then simultaneously fed into a biaxial tenter stretching machine for biaxial stretching, to obtain a stretched sheet. The stretching conditions were an MD factor of 7.0, a TD factor of 6.0 (i.e. a factor of 7×6), and a biaxial stretching temperature of 125° C.

The stretched gel sheet was subsequently fed into a methyl ethyl ketone tank and thoroughly immersed in the methyl ethyl ketone for extraction removal of the liquid paraffin, after which the methyl ethyl ketone was dried off to obtain a porous body.

The porous body to be subjected to heat setting (HS) was fed to a TD tenter and HS was carried out at a heat setting temperature of 125° C. and a stretch ratio of 1.8, after which relaxation was carried out to a factor of 0.5 in the TD direction (i.e. the HS relaxation factor was 0.5), to obtain a microporous membrane.

The obtained microporous membrane was then cut at the edges and wound up as a microporous membrane mother roll with a width of 1,100 mm and a length of 5,000 m.

(Method for Producing Acrylic Latex)

The acrylic latex to be used as the resin binder is produced by the following method.

Into a reactor equipped with a stirrer, reflux condenser, drip tank and thermometer there were loaded 70.4 parts by weight of ion-exchanged water, 0.5 part by weight of "AQUALON KH1025" (registered trademark of Dai-ichi Kogyo Seiyaku Co., Ltd., 25% aqueous solution) as an emulsifier, and 0.5 part by weight of "ADEKA REASOAP SR1025" (registered trademark of Adeka Corp., 25% aqueous solution). The internal temperature of the reactor was then raised to 80° C., and 7.5 parts by weight of a 2% aqueous solution of ammonium persulfate was added while keeping the temperature at 80° C., to obtain an initial mixture. Five minutes after addition of the ammonium persulfate aqueous solution was completed, the emulsified liquid was added dropwise from the drip tank into the reactor over a period of 150 minutes.

The emulsified liquid was prepared by forming a mixture of 70 parts by weight of butyl acrylate; 29 parts by weight of methyl methacrylate; 1 part by weight of methacrylic acid; 3 parts by weight of "AQUALON KH1025" (registered trademark of Dai-ichi Kogyo Seiyaku Co., Ltd., 25% aqueous solution) and 3 parts by weight "ADEKA REASOAP SR1025" (registered trademark of Adeka Corp., 25% aqueous solution) as emulsifiers; 7.5 parts by weight of a 2% aqueous solution of ammonium persulfate; and 52 parts by weight of ion-exchanged water, and mixing it with a homomixer for 5 minutes.

Upon completion of the dropwise addition of the emulsified liquid, the internal temperature of the reactor was kept at 80° C. for a period of 90 minutes, after which it was cooled to room temperature. The obtained emulsion was adjusted to a pH of 8.0 with a 25% aqueous ammonium hydroxide solution, and then a small amount of water was added to obtain an acrylic latex with a solid content of 40%. The obtained acrylic latex had a number-mean particle size of 145 nm and a glass transition temperature of −23° C.

(Formation of Inorganic Porous Layer)

A dispersion was prepared by evenly dispersing 95 parts by weight of aluminum hydroxide oxide (mean particle size: 1.4 μm) as inorganic particles and 0.4 part by (solid) weight of an aqueous ammonium polycarboxylate solution (SN dispersant 5468 by San Nopco, Ltd., 40% solid concentration) as an ionic dispersing agent, in 100 parts by weight of water. The obtained dispersion was shredded with a bead mill (cell volume: 200 cc, zirconia bead diameter: 0.1 mm, filling volume: 80%), and the particle size distribution of the inorganic particles was adjusted to D50=1.0 μm. To the particle size distribution-adjusted dispersion there was added 4.6 parts by (solid) weight of an acrylic latex (solid concentration: 40%, mean particle size: 145 nm, glass transition temperature: −23° C., constituent monomers: butyl acrylate, methyl methacrylate, methacrylic acid) as a resin binder to prepare an inorganic particle-containing slurry.

The microporous membrane was then continuously wound out from the microporous membrane mother roll and one side of the microporous membrane was coated with the inorganic particle-containing slurry using a gravure reverse coater, after which it was dried with a dryer at 60° C. to remove the water and wound up to obtain a separator mother roll.

During the evaluation, the separator was wound out from the mother roll and slit as necessary for use as the evaluation separator.

Examples V-2 to V-12 and Comparative Example V-2

The microporous membranes listed in Tables 14 to 16 were obtained by the same procedure as Example V-1, except for changing the quantity ratio of components A and B, the presence or absence of the inorganic layer and the crosslinking method and conditions, as shown in Tables 14 to 16.

Comparative Example V-1

To 79.2 wt % of polyethylene homopolymer with a weight-average molecular weight of 500,000 (A) there was added 19.8 wt % of silane-grafted polyethylene (silane-modified polyethylene (B)) with an MFR (190° C.) of 0.4 g/min, obtained using a polyolefin with a viscosity-average molecular weight of 20,000 as starting material and modification reaction with trimethoxyalkoxide-substituted vinylsilane (the respective contents of resin compositions (A) and (B) thus being 80% and 20%), and 1 wt % of pentaerythrityl-tetrakis-[3-(3,5-di-t-butyl-4-hydroxyphenyl)propionate] as an antioxidant, and these were dry blended using a tumbler blender to obtain a mixture. The obtained mixture was supplied to a twin-screw extruder through a feeder, under a nitrogen atmosphere. Also, liquid paraffin (kinematic viscosity at 37.78° C.: $7.59\times10^{-5}$ $m^2/s$) was injected into the extruder cylinder by a plunger pump.

The mixture was melt kneaded with liquid paraffin in an extruder, and adjusted with a feeder and pump so that the quantity ratio of liquid paraffin in the extruded polyolefin composition was 70 wt % (i.e. a polymer concentration of 30 wt %). The melt kneading conditions were a preset temperature of 220° C., a screw rotational speed of 240 rpm and a discharge throughput of 18 kg/h.

The melt kneaded mixture was then extrusion cast through a T-die onto a cooling roll controlled to a surface temperature of 25° C., to obtain a gel sheet (molded sheet) with a raw membrane thickness of 1400 μm.

The molded sheet was then simultaneously fed into a biaxial tenter stretching machine for biaxial stretching, to obtain a stretched sheet. The stretching conditions were an MD factor of 7.0, a TD factor of 6.0 (i.e. a factor of 7×6), and a biaxial stretching temperature of 125° C.

The stretched gel sheet was subsequently fed into a methyl ethyl ketone tank and thoroughly immersed in the methyl ethyl ketone for extraction removal of the liquid paraffin, after which the methyl ethyl ketone was dried off to obtain a porous body.

The porous body to be subjected to heat setting (HS) was fed to a TD tenter and HS was carried out at a heat setting temperature of 125° C. and a stretch ratio of 1.8, after which relaxation was carried out to a factor of 0.5 in the TD direction (i.e. the HS relaxation factor was 0.5).

In order to use the heat-treated porous body as the separator in Comparative Example V-1, the obtained porous body was cut at the edges and wound up as a mother roll with a width of 1,100 mm and a length of 5,000 m.

During the evaluation for Comparative Example V-1, the microporous membrane wound out from the mother roll was slit as necessary for use as the evaluation separator.

[Evaluation Results]

The microporous membranes and batteries obtained in Examples V-1 to V-12 and Comparative Examples V-1 and V-2 were evaluated by each of the evaluation methods described above, and the evaluation results are shown in Tables 14 to 16.

TABLE 14

| | | | | Example V-1 | Example V-2 | Example V-3 |
|---|---|---|---|---|---|---|
| Separator | Resin composition | Polyethylene (A) | wt % | 80% | 80% | 80% |
| | | Silane-modified polyethylene (B) | wt % | 20% | 20% | 20% |
| | Kneading temperature | | ° C. | 220 | 220 | 220 |
| | Inorganic layer composition | Inorganic particles | Weight ratio | 95% | 95% | 95% |
| | | | Type | AlO(OH) | AlO(OH) | AlO(OH) |
| | | Resin binder | Tg (° C.) | −23 | −23 | −23 |
| | Crosslinking method | Method | | — | — | — |
| | | Crosslinking reaction timing | | | | |
| | | Reagent | | | | |
| | | Temperature | ° C. | | | |
| | | pH | | | | |
| | Basic properties of resinous microporous membrane | Membrane thickness | um | 11 | 11 | 11 |
| | | Porosity (ii) | % | 40 | 40 | 40 |
| | | Air permeability | sec/100 cm$^3$ | 160 | 160 | 160 |
| | Inorganic layer thickness | | um | 2 | 0.5 | 5 |
| | Shutdown/rupture resistance | Shutdown temperature (i) | ° C. | 143 | 143 | 143 |
| | | Membrane rupture temperature (i) | ° C. | ≥200 | ≥200 | ≥200 |
| | Resin aggregates in microporous membrane | | /1000 m$^2$ | 2 | 2 | 2 |
| | Storage modulus change factor, ver. 1 | $R_{\Delta E'}$ | Factor | 2.1 | 2.1 | 2.1 |
| | | $R_{E'mix}$ | Factor | 8.5 | 8.5 | 8.5 |
| | Loss modulus change factor, ver. 1 | $R_{\Delta E''}$ | Factor | 1.9 | 1.9 | 1.9 |
| | | $R_{E''mix}$ | Factor | 6.2 | 6.2 | 6.2 |
| | Transition temperature calculated by storage modulus, ver.1 | | ° C. | 143 | 143 | 143 |
| Battery | Crosslinking method | | | Contact with electrolyte solution until initial charge-discharge | Contact with electrolyte solution until initial charge-discharge | Contact with electrolyte solution until initial charge-discharge |
| | Battery cycle stability 1 | | % | 98 | 96 | 95 |
| | Battery destruction safety 1 | Internal maximum heat release rate | ° C./sec | 5 | 7 | 5 |
| | | Voltage reduction (3 V reduction time) | sec | >300 | >300 | >300 |

| | | | | Example V-4 | Example V-5 | Example V-6 |
|---|---|---|---|---|---|---|
| Separator | Resin composition | Polyethylene (A) | wt % | 80% | 80% | 80% |
| | | Silane-modified polyethylene (B) | wt % | 20% | 20% | 20% |
| | Kneading temperature | | ° C. | 220 | 220 | 220 |
| | Inorganic layer composition | Inorganic particles | Weight ratio | 6% | 98% | 3% |
| | | | Type | AlO(OH) | AlO(OH) | AlO(OH) |
| | | Resin binder | Tg (° C.) | −23 | −23 | −23 |
| | Crosslinking method | Method | | — | — | — |
| | | Crosslinking reaction timing | | | | |
| | | Reagent | | | | |
| | | Temperature | ° C. | | | |
| | | pH | | | | |
| | Basic properties of resinous microporous membrane | Membrane thickness | um | 11 | 11 | 11 |
| | | Porosity (ii) | % | 40 | 40 | 40 |
| | | Air permeability | sec/100 cm$^3$ | 160 | 160 | 160 |
| | Inorganic layer thickness | | um | 4 | 4 | 4 |
| | Shutdown/rupture resistance | Shutdown temperature (i) | ° C. | 143 | 143 | 143 |
| | | Membrane rupture temperature (i) | ° C. | ≥200 | ≥200 | ≥200 |

TABLE 14-continued

| | | | | | | |
|---|---|---|---|---|---|---|
| | Resin aggregates in microporous membrane | | /1000 $m^2$ | 2 | 2 | 2 |
| | Storage modulus | $R_{\Delta E'}$ | Factor | 2.1 | 2.1 | 2.1 |
| | change factor, ver. 1 | $R_{E'mix}$ | Factor | 8.5 | 8.5 | 8.5 |
| | Loss modulus | $R_{\Delta E''}$ | Factor | 1.9 | 1.9 | 1.9 |
| | change factor, ver. 1 | $R_{E''mix}$ | Factor | 6.2 | 6.2 | 6.2 |
| | Transition temperature calculated by storage modulus, ver.1 | | ° C. | 143 | 143 | 143 |
| Battery | Crosslinking method | | | Contact with electrolyte solution until initial charge-discharge | Contact with electrolyte solution until initial charge-discharge | Contact with electrolyte solution until initial charge-discharge |
| | Battery cycle stability 1 | | % | 98 | 94 | 81 |
| | Battery destruction safety 1 | Internal maximum heat release rate | ° C./sec | 9 | 5 | 16 |
| | | Voltage reduction (3 V reduction time) | sec | 293 | >300 | 265 |

TABLE 15

| | | | | Example V-7 | Example V-8 | Example V-9 |
|---|---|---|---|---|---|---|
| Separator | Resin composition | Polyethylene (A) | wt % | 80% | 94% | 62% |
| | | Silane-modified polyethylene (B) | wt % | 20% | 6% | 38% |
| | Kneading temperature | | ° C. | 220 | 220 | 220 |
| | Inorganic layer composition | Inorganic particles | Weight ratio | 99.5% | 95% | 95% |
| | | | Type | AlO(OH) | AlO(OH) | AlO(OH) |
| | | Resin binder | Tg (° C.) | −23 | −23 | −23 |
| | Crosslinking method | Method | | — | — | — |
| | | Crosslinking reaction timing | | | | |
| | | Reagent | | | | |
| | | Temperature | ° C. | | | |
| | | pH | | | | |
| | Basic properties of resinous microporous membrane | Membrane thickness | um | 11 | 11 | 11 |
| | | Porosity (ii) | % | 40 | 39 | 42 |
| | | Air permeability | sec/100 $cm^3$ | 160 | 167 | 173 |
| | Inorganic layer thickness | | um | 4 | 4 | 4 |
| | Shutdown/rupture resistance | Shutdown temperature (i) | ° C. | 143 | 142 | 143 |
| | | Membrane rupture temperature (i) | ° C. | ≥200 | ≥200 | ≥200 |
| | Resin aggregates in microporous membrane | | /1000 $m^2$ | 2 | 7 | 18 |
| | Storage modulus | $R_{\Delta E'}$ | Factor | 2.1 | 1.7 | 16 |
| | change factor, ver. 1 | $R_{E'mix}$ | Factor | 8.5 | 2.1 | 15 |
| | Loss modulus | $R_{\Delta E''}$ | Factor | 1.9 | 1.6 | 15 |
| | change factor, ver. 1 | $R_{E''mix}$ | Factor | 6.2 | 3 | 13 |
| | Transition temperature calculated by storage modulus, ver.1 | | ° C. | 143 | 140 | 142 |
| Battery | Crosslinking method | | | Contact with electrolyte solution until initial charge-discharge | Contact with electrolyte solution until initial charge-discharge | Contact with electrolyte solution until initial charge-discharge |
| | Battery cycle stability 1 | | % | 73 | 91 | 85 |
| | Battery destruction safety 1 | Internal maximum heat release rate | ° C./sec | 5 | 9 | 8 |
| | | Voltage reduction (3 V reduction time) | sec | >300 | >300 | >300 |

| | | | | Example V-10 | Example V-11 | Example V-12 |
|---|---|---|---|---|---|---|
| Separator | Resin composition | Polyethylene (A) | wt % | 96% | 58% | 0% |
| | | Silane-modified polyethylene (B) | wt % | 4% | 42% | 100% |
| | Kneading temperature | | ° C. | 220 | 220 | 220 |
| | Inorganic layer composition | Inorganic particles | Weight ratio | 95% | 95% | 95% |
| | | | Type | AlO(OH) | AlO(OH) | AlO(OH) |
| | | Resin binder | Tg (° C.) | −23 | −23 | −23 |
| | Crosslinking method | Method | | — | — | — |
| | | Crosslinking reaction timing | | | | |
| | | Reagent | | | | |
| | | Temperature | ° C. | | | |
| | | pH | | | | |

TABLE 15-continued

| | | | | | | |
|---|---|---|---|---|---|---|
| | Basic properties of resinous microporous membrane | Membrane thickness | um | 11 | 10.5 | 9 |
| | | Porosity (ii) | % | 38 | 42 | 39 |
| | | Air permeability | sec/100 cm$^3$ | 161 | 180 | 195 |
| | Inorganic layer thickness | | um | 4 | 4 | 4 |
| | Shutdown/rupture resistance | Shutdown temperature (i) | ° C. | 153 | 178 | 179 |
| | | Membrane rupture temperature (i) | ° C. | 160 | ≥200 | ≥200 |
| | Resin aggregates in microporous membrane | | /1000 m$^2$ | 1 | 562 | 890 |
| | Storage modulus change factor, ver. 1 | $R_{\Delta E'}$ | Factor | 1.1 | 23 | 23 |
| | | $R_{E'mix}$ | Factor | 1.1 | 23 | 23 |
| | Loss modulus change factor, ver. 1 | $R_{\Delta E''}$ | Factor | 1.1 | 22.5 | 22.5 |
| | | $R_{E''mix}$ | Factor | 1.1 | 22 | 22 |
| | Transition temperature calculated by storage modulus, ver.1 | | ° C. | 151 | 134 | 133 |
| Battery | Crosslinking method | | | Contact with electrolyte solution until initial charge-discharge | Contact with electrolyte solution until initial charge-discharge | Contact with electrolyte solution until initial charge-discharge |
| | Battery cycle stability 1 | | % | 78 | 75 | 70 |
| | Battery destruction safety 1 | Internal maximum heat release rate | ° C./sec | 25 | 21 | 19 |
| | | Voltage reduction (3 V reduction time) | sec | 210 | 224 | 232 |

TABLE 16

| | | | | Comparative Example V-1 | Comparative Example V-2 |
|---|---|---|---|---|---|
| Separator | Resin composition | Polyethylene (A) | wt % | 80% | 100% |
| | | Silane-modified polyethylene (B) | wt % | 20% | 0% |
| | Kneading temperature | | ° C. | 220 | 220 |
| | Inorganic layer composition | Inorganic particles | Weight ratio | — | 95% |
| | | | Type | | AlO (OH) |
| | | Resin binder | Tg (° C.) | | −23 |
| | Crosslinking method | Method | | — | — |
| | | Crosslinking reaction timing | | | |
| | | Reagent | | | |
| | | Temperature | ° C. | | |
| | | pH | | | |
| | Basic properties of resinous microporous membrane | Membrane thickness | um | 11 | 9.5 |
| | | Porosity (ii) | % | 40 | 38 |
| | | Air permeability | sec/100 cm$^3$ | 160 | 172 |
| | Inorganic layer thickness | | um | — | 4 |
| | Shutdown/rupture resistance | Shutdown temperature (i) | ° C. | 143 | 143 |
| | | Membrane rupture temperature (i) | ° C. | ≥200 | 151 |
| | Resin aggregates in microporous membrane | | /1000 m$^2$ | 2 | 3 |
| | Storage modulus change factor, ver. 1 | $R_{\Delta E'}$ | Factor | 2.1 | — |
| | | $R_{E'mix}$ | Factor | 8.5 | — |
| | Loss modulus change factor, ver. 1 | $R_{\Delta E''}$ | Factor | 1.9 | — |
| | | $R_{E''mix}$ | Factor | 6.2 | — |
| | Transition temperature calculated by storage modulus, ver. 1 | | ° C. | 143 | — |
| Battery | Crosslinking method | | | Contact with electrolyte solution until initial charge-discharge | — |
| | Battery cycle stability 1 | | % | 55 | 96 |
| | Battery destruction safety 1 | Internal maximum heat release rate | ° C./sec | 122 | 235 |
| | | Voltage reduction (3 V reduction time) | sec | 6 | 2 |

Experiment Group VI

Porous membranes were formed in the same manner as Examples 1 to 3 and Comparative Examples 2 to 3 described in PTL 5 (Japanese Unexamined Patent Publication No. 2001-176484), and were provided as porous membranes V-1 to V-5, respectively. Porous membranes V-1 to V-5 were evaluated for gel fraction (%), heat-resistant temperature (° C.) and needle puncture strength (gf/25 μm) by the methods described in PTL 5, and the rates of change in the storage modulus and loss modulus RAF' and RAF" of the porous membrane V-4 before and after contact with the electrolyte solution were measured according to <Transition temperature for storage modulus and loss modulus (version 1)> in the present specification. The results are shown in Table 17.

TABLE 17

| Porous Membrane Example | PTL 5 Example No. | Gel fraction (%) | Heat-resistant temperature (° C.) | Needle puncture strength (gf/25 μm) | Storage modulus change factor $R_{\Delta E'}$ before and after contact with electrolyte solution (ver. 1) | Loss modulus change factor $R_{\Delta E''}$ before and after contact with electrolyte solution (ver. 1) |
|---|---|---|---|---|---|---|
| V-1 | Example 1 | 68 | 185 | 450 | — | — |
| V-2 | Example 2 | 69 | 205 | 680 | — | — |
| V-3 | Example 3 | 42 | 170 | 460 | — | — |
| V-4 | Comparative Example 2 | 36 | 155 | 440 | Remained at 1 | Remained at 1 |
| V-5 | Comparative Example 3 | 80 | 200 | 260 | — | — |

The following is clear from Table 17.

(a) Since the rate of change in the elastic modulus remained at 1 even with porous membrane V-4 which had the lowest gel fraction (Comparative Example 2 of PTL 5, gel fraction: 36%), this demonstrated that porous membranes V-1 to V-5 had already exhausted crosslinking reaction, and there was no self-crosslinking (uncrosslinked portions) in the porous membranes described in PTL 5.

(b) Incidentally, Comparative Example 1 of PTL 5 is a non-silane-modified product.

(c) The separator of the seventh embodiment of the invention described above has value for selective chemical crosslinking of the amorphous zones between the crystal portions. When mixed crystals of a non-silane-modified polyolefin and a silane-modified polyolefin are formed, and the modified units are pushed out into the amorphous portions and become randomly diffused, the adjacent crosslinking units come into contact and crosslinking reaction proceeds.

When the multiple crosslinking units become separated from each other, however, they cannot contribute to crosslinking reaction despite the presence of the crosslinking units. In particular, if (all of) the reaction conditions are satisfied, then crosslinking reaction from silanol to siloxane in the porous membrane proceeds immediately, resulting in full crosslinking of the units that are able to participate in crosslinking, thus making it impossible for any further crosslinking to proceed with the residual units in the battery comprising the porous membrane.

Therefore, even if residual silanol groups remain in porous membranes V-1 to V-5, crosslinking reaction does not take place inside the membrane-containing battery so long as crosslinking treatment has been carried out during the step of producing the membranes (that is, the remaining silanol groups cannot contribute to the crosslinked structure).

(d) For the separator according to seventh embodiment of the invention, adjustments were made to the molecular weights of the resin starting materials, the copolymer concentrations and the mixing ratios, and a stretching membrane formation step was also combined, to experimentally discover crystal structures with intercrystal distances and crosslinking unit dispersion distributions that allowed crosslinking reaction of the crosslinking units to proceed with high probability. It was thus possible to improve the battery fracture resistance and heat-resistant safety, and to also inhibit deterioration in battery cycle performance due to residual hetero functional groups.

What is claimed is:

1. A separator for an electricity storage device, comprising 5 to 40 weight % of a silane-modified polyolefin and 60 to 95 weight % of a polyolefin other than the silane-modified polyolefin, wherein the storage modulus change ratio ($R_{\Delta E'}$) is 1.5 to 20, as defined by the following formula (1):

$$R_{\Delta E'}=E'_S/E'_j) \quad (1)$$

where $E'_j$ is the storage modulus measured at 160° C. to 220° C. for the separator for an electricity storage device before crosslinking reaction of the silane-modified polyolefin, $E'_S$ is the storage modulus measured at 160° C. to 220° C. for the separator for an electricity storage device after crosslinking reaction of the silane-modified polyolefin, and the measuring conditions for the storage modulus E' ($E'_j$ or $E'_S$) are specified by the following (i) to (iv):

(i) the dynamic viscoelasticity measurement is carried out under the following conditions:
Measuring apparatus: RSA-G2 (TA Instruments)
Sample thickness: from 5 μm to 50 μm
Measuring temperature range: −50 to 225° C.
Temperature-elevating rate: 10° C./min
Measuring frequency: 1 Hz
Transform mode: sine wave tension mode (linear tension)
Initial static tensile load: 0.5 N
Initial gap distance (at 25° C.): 25 mm
Auto strain adjustment: Enabled (range: 0.05 to 25% amplitude, 0.02 to 5 N sine wave load);

(ii) the static tensile load is the median value of the maximum stress and minimum stress for each periodic motion, and the sine wave load is the vibrational stress centered on the static tensile load;

(iii) the sine wave tension mode is measurement of the vibrational stress while carrying out periodic motion at a fixed amplitude of 0.2%, wherein in sine wave tension mode, the vibrational stress is measured while varying the gap distance and static tensile load so that the difference between the static tensile load and the sine wave load is within 20%, and when the sine wave load is 0.02 N or lower, the vibrational stress is measured while amplifying the amplitude value so that the sine wave load is no greater than 5 N and the increase in the amplitude value is no greater than 25%; and (iv) the storage modulus E' is calculated from the relationship between the obtained sine wave load and amplitude value, and the following formulas:

$$\sigma^*=\sigma_0\cdot \mathrm{Exp}[i(\omega t+\delta)],$$

$$\varepsilon^*=\varepsilon_0\cdot \mathrm{Exp}(i\omega t),$$

$$\sigma^*=E^*\cdot\varepsilon^*$$

$$E^*=E'+iE''$$

where $\sigma^*$: vibrational stress, $\varepsilon^*$: strain, i: imaginary number unit, $\omega$: angular frequency, t: time, $\delta$: phase difference between vibrational stress and strain, E*: complex modulus, E': storage modulus, E": loss modulus, vibrational stress: sine wave load/initial cross-sectional area static tensile load: load at minimum point of vibrational stress for each period (minimum point of gap distance for each period), and sine wave load: difference between measured vibrational stress and static tensile load.

2. An electricity storage device comprising an electrode, the separator for an electricity storage device according to claim 1, and a nonaqueous electrolyte solution.

3. A method for producing the separator for an electricity storage device according to claim 1, wherein the method comprises the following steps:

(1) a sheet-forming step in which a mixture of a silane-modified polyolefin, polyethylene and a plasticizer is extruded, cooled to solidification and cast into a sheet to obtain a sheet;

(2) a stretching step in which the sheet is stretched at least in a uniaxial direction to obtain a stretched sheet;

(3) a porous body-forming step in which the plasticizer is extracted from the stretched sheet in the presence of an extraction solvent, forming pores in the stretched sheet to form a porous body; and (4) a heat treatment step in which the porous body is subjected to heat treatment.

4. An electricity storage device assembly kit comprising the following two elements:

(1) an exterior body housing a laminated stack or wound body of electrodes and the separator for an electricity storage device according to claim 1; and (2) a container housing a nonaqueous electrolyte solution.

5. The electricity storage device assembly kit according to claim 4, wherein the nonaqueous electrolyte solution includes a fluorine (F)-containing lithium salt.

6. The electricity storage device assembly kit according to claim 5, wherein the nonaqueous electrolyte solution includes lithium hexafluorophosphate ($LiPF_6$).

7. The electricity storage device assembly kit according to claim 6, wherein the nonaqueous electrolyte solution is an acid solution and/or a base solution.

8. The electricity storage device assembly kit according to claim 5, wherein the nonaqueous electrolyte solution is an acid solution and/or a base solution.

9. The electricity storage device assembly kit according to claim 4, wherein the nonaqueous electrolyte solution includes lithium hexafluorophosphate ($LiPF_6$).

10. The electricity storage device assembly kit according to claim 9, wherein the nonaqueous electrolyte solution is an acid solution and/or a base solution.

11. The electricity storage device assembly kit according to claim 4, wherein the nonaqueous electrolyte solution is an acid solution and/or a base solution.

12. A method for producing an electricity storage device comprising the following steps:

a step of preparing the electricity storage device assembly kit according to claim 4, and a step of contacting the separator for an electricity storage device in element (1) of the electricity storage device assembly kit with the nonaqueous electrolyte solution in element (2), to initiate silane crosslinking reaction of the silane-modified polyolefin.

13. The method for producing an electricity storage device according to claim 12, which further comprises the following steps:

a step of connecting lead terminals to the electrodes of element (1), and a step of carrying out at least one cycle of charge-discharge.

14. A separator for an electricity storage device, comprising 5 to 40 weight % of a silane-modified polyolefin and 60 to 95 weight % of a polyolefin other than the silane-modified polyolefin, wherein the loss modulus change ratio ($R_{\Delta E''}$) is 1.5 to 20, as defined by the following formula (3):

$$R_{\Delta E''}=E''_S/E''_j \tag{3}$$

where $E''_j$ is the loss modulus measured at 160° C. to 220° C. for the separator for an electricity storage device before crosslinking reaction of the silane-modified polyolefin, E"s is the loss modulus measured at 160° C. to 220° C. for the separator for an electricity storage device after crosslinking reaction of the silane-modified polyolefin, and the measuring conditions for the loss modulus E" ($E''_j$ or $E''_S$) are specified by the following (i) to (iv):

(i) the dynamic viscoelasticity measurement is carried out under the following conditions:

Measuring apparatus: RSA-G2 (TA Instruments)

Sample thickness: from 5 μm to 50 μm

Measuring temperature range: −50 to 225° C.

Temperature-elevating rate: 10° C./min

Measuring frequency: 1 Hz

Transform mode: sine wave tension mode (linear tension)

Initial static tensile load: 0.5 N

Initial gap distance (at 25° C.): 25 mm

Auto strain adjustment: Enabled (range: 0.05 to 25% amplitude, 0.02 to 5 N sine wave load);

(ii) the static tensile load is the median value of the maximum stress and minimum stress for each periodic motion, and the sine wave load is the vibrational stress centered on the static tensile load;

(iii) the sine wave tension mode is measurement of the vibrational stress while carrying out periodic motion at a fixed amplitude of 0.2%, wherein in sine wave tension mode, the vibrational stress is measured while varying the gap distance and static tensile load so that the difference between the static tensile load and the sine wave load is within 20%, and when the sine wave load is 0.02 N or lower, the vibrational stress is measured while amplifying the amplitude value so that the sine wave load is no greater than 5 N and the increase in the amplitude value is no greater than 25%; and (iv) the loss modulus E" is calculated from the obtained sine wave load and amplitude value, and the following formulas:

$$\sigma^*=\sigma_0\cdot\mathrm{Exp}[i(\omega t+\delta)],$$

$$\varepsilon^*=\varepsilon_0\cdot\mathrm{Exp}(i\omega t),$$

$$\sigma^*=E^*\cdot\varepsilon^*$$

$$E^*=E'+iE''$$

where $\sigma^*$: vibrational stress, $\varepsilon^*$: strain, i: imaginary number unit, $\omega$: angular frequency, t: time, $\delta$: phase difference between vibrational stress and strain, E*: complex modulus, E": storage modulus, E": loss modulus, vibrational stress: sine wave load/initial cross-sectional area static tensile load: load at minimum point of vibrational stress for each period (minimum point of gap distance for each period), and sine wave load: difference between measured vibrational stress and static tensile load.

15. A separator for an electricity storage device, comprising 5 to 40 weight % of a silane-modified polyolefin and 60 to 95 weight % of a polyolefin other than the silane-modified polyolefin, wherein the mixed storage modulus ratio ($R_{E'mix}$) is 1.5 to 20, as defined by the following formula (2):

$$R_{E'mix}=E'_a/E'_0 \quad (2)$$

{where $E'_a$ is the storage modulus measured at 160° C. to 220° C. for the separator for an electricity storage device, $E'_0$ is the storage modulus measured at 160° C. to 220° C. for a separator for an electricity storage device not containing the silane-modified polyolefin, and the measuring conditions for the storage modulus E' ($E'_a$ or $E'_0$) are specified by the following (i) to (iv):

(i) the dynamic viscoelasticity measurement is carried out under the following conditions:

Measuring apparatus: RSA-G2 (TA Instruments)

Sample thickness: from 5 μm to 50 μm

Measuring temperature range: −50 to 225° C.

Temperature-elevating rate: 10° C./min

Measuring frequency: 1 Hz

Transform mode: sine wave tension mode (linear tension)

Initial static tensile load: 0.5 N

Initial gap distance (at 25° C.): 25 mm

Auto strain adjustment: Enabled (range: 0.05 to 25% amplitude, 0.02 to 5 N sine wave load);

(ii) the static tensile load is the median value of the maximum stress and minimum stress for each periodic motion, and the sine wave load is the vibrational stress centered on the static tensile load;

(iii) the sine wave tension mode is measurement of the vibrational stress while carrying out periodic motion at a fixed amplitude of 0.2%, wherein in sine wave tension mode, the vibrational stress is measured while varying the gap distance and static tensile load so that the difference between the static tensile load and the sine wave load is within 20%, and when the sine wave load is 0.02 N or lower, the vibrational stress is measured while amplifying the amplitude value so that the sine wave load is no greater than 5 N and the increase in the amplitude value is no greater than 25%;

(iv) the storage modulus E' is calculated from the relationship between the obtained sine wave load and amplitude value, and the following formulas:

$$\sigma^*=\sigma_0\cdot \mathrm{Exp}[i(\omega t+\delta)],$$

$$\varepsilon^*=\varepsilon_0\cdot \mathrm{Exp}(i\omega t),$$

$$\sigma^*=E^*\cdot\varepsilon^*$$

$$E^*=E'+iE''$$

where σ*: vibrational stress, ε*: strain, i: imaginary number unit, ω: angular frequency, t: time, δ: phase difference between vibrational stress and strain, E*: complex modulus, E': storage modulus, E": loss modulus, vibrational stress: sine wave load/initial cross-sectional area static tensile load: load at minimum point of vibrational stress for each period (minimum point of gap distance for each period), and sine wave load: difference between measured vibrational stress and static tensile load.

16. The separator for an electricity storage device according to claim 15, wherein the separator for an electricity storage device not containing a silane-modified polyolefin is a non-silane-modified polyolefin microporous membrane with a gelation degree of 0% to 10%.

17. A separator for an electricity storage device, comprising 5 to 40 weight % of a silane-modified polyolefin and 60 to 95 weight % of a polyolefin other than the silane-modified polyolefin, wherein the mixed loss modulus ratio ($R_{E''mix}$) is 1.5 to 20.0, as defined by the following formula (4):

$$R_{E''mix}=E''_a/E''_0 \quad (4)$$

where $E''_a$ is the loss modulus measured at 160° C. to 220° C. for the separator for an electricity storage device, $E''_0$ is the loss modulus measured at 160° C. to 220° C. for a separator for an electricity storage device not containing the silane-modified polyolefin, and the measuring conditions for the loss modulus E" ($E''_a$ or $E''_0$) are specified by the following (i) to (iv):

(i) the dynamic viscoelasticity measurement is carried out under the following conditions:

Measuring apparatus: RSA-G2 (TA Instruments)

Sample thickness: from 5 μm to 50 μm

Measuring temperature range: −50 to 225° C.

Temperature-elevating rate: 10° C./min

Measuring frequency: 1 Hz

Transform mode: sine wave tension mode (linear tension)

Initial static tensile load: 0.5 N

Initial gap distance (at 25° C.): 25 mm

Auto strain adjustment: Enabled (range: 0.05 to 25% amplitude, 0.02 to 5 N sine wave load);

(ii) the static tensile load is the median value of the maximum stress and minimum stress for each periodic motion, and the sine wave load is the vibrational stress centered on the static tensile load;

(iii) the sine wave tension mode is measurement of the vibrational stress while carrying out periodic motion at a fixed amplitude of 0.2%, wherein in sine wave tension mode, the vibrational stress is measured while varying the gap distance and static tensile load so that the difference between the static tensile load and the sine wave load is within 20%, and when the sine wave load is 0.02 N or lower, the vibrational stress is measured while amplifying the amplitude value so that the sine wave load is no greater than 5 N and the increase in the amplitude value is no greater than 25%;

(iv) the loss modulus E" is calculated from the obtained sine wave load and amplitude value, and the following formulas:

$$\sigma^*=\sigma_0\cdot \mathrm{Exp}[i(\omega t+\delta)],$$

$$\varepsilon^*=\varepsilon_0\cdot \mathrm{Exp}(i\omega t),$$

$$\sigma^*=E^*\cdot\varepsilon^*$$

$$E^*=E'+iE''$$

where σ*: vibrational stress, ε*: strain, i: imaginary number unit, ω: angular frequency, t: time, δ: phase difference between vibrational stress and strain, E*: complex modulus, E": storage modulus, E": loss modulus, vibrational stress: sine wave load/initial cross-sectional area static tensile load: load at minimum point of vibrational stress for each period (minimum point of gap distance for each period), and sine wave load: difference between measured vibrational stress and static tensile load.

18. The separator for an electricity storage device according to claim 17, wherein the separator for an electricity storage device not containing a silane-modified polyolefin is a non-silane-modified polyolefin microporous membrane with a gelation degree of 0% to 10%.

19. A separator for an electricity storage device comprising 5 to 40 weight % of a silane-modified polyolefin and 60 to 95 weight % of a polyolefin other than the silane-modified polyolefin, wherein the transition temperature is 135° C. to 150° C. for the rubber plateau and the crystal melt flow region, in the temperature-dependent change of the storage modulus of the separator for an electricity storage device.

* * * * *